US010353471B2

(12) United States Patent
Da Costa et al.

(10) Patent No.: US 10,353,471 B2
(45) Date of Patent: Jul. 16, 2019

(54) HAPTIC SPATIALIZATION SYSTEM

(71) Applicant: Immersion Corporation, San Jose, CA (US)

(72) Inventors: Henry Da Costa, Montreal (CA); Robert Lacroix, Saint-Lambert (CA); Danny Grant, Laval (CA); Stephen D. Rank, San Jose, CA (US); David Birnbaum, Oakland, CA (US); William Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/812,072

(22) Filed: Nov. 14, 2017

(65) Prior Publication Data

US 2018/0074589 A1   Mar. 15, 2018

Related U.S. Application Data

(63) Continuation of application No. 14/874,622, filed on Oct. 5, 2015, now Pat. No. 9,891,710, which is a
(Continued)

(51) Int. Cl.
*G06F 3/01* (2006.01)
*A63F 13/22* (2014.01)
(Continued)

(52) U.S. Cl.
CPC .............. *G06F 3/016* (2013.01); *A63F 13/22* (2014.09); *A63F 13/23* (2014.09); *A63F 13/285* (2014.09); *A63F 13/60* (2014.09)

(58) Field of Classification Search
CPC ......... A63F 13/22; A63F 13/23; A63F 13/285
See application file for complete search history.

(56) References Cited

U.S. PATENT DOCUMENTS 5,473,126 A   12/1995  Wu
5,959,613 A    9/1999  Rosenberg et al.
(Continued)

FOREIGN PATENT DOCUMENTS

CN    1983125 A     6/2007
CN  102822772 A    12/2012
(Continued)

OTHER PUBLICATIONS

Conan Hughes, "Turn Off Wii Remote's Rumble Feature", Apr. 9, 2011, XP055172295, http://www.conanhughes.com/2011/04/turn-off-wii-remotes-rumble-feature.html.
(Continued)

*Primary Examiner* — Reginald A Renwick
(74) *Attorney, Agent, or Firm* — Miles & Stockbridge P.C.

(57) ABSTRACT

A system is provided that controls a haptic effect experienced at a peripheral device. The system receives a haptic effect definition including haptic data. The system further receives spatialization data including: a distance of the haptic effect; a direction of the haptic effect; or a flow of the haptic effect. The system further includes modifying the haptic effect definition based on the received spatialization data. The system further includes sending a haptic instruction and the modified haptic effect definition to the peripheral device. The system further includes causing one or more haptic output devices to produce one or more haptic effects based on the modified haptic effect definition at the peripheral device in response to the haptic instruction.

20 Claims, 43 Drawing Sheets

Related U.S. Application Data continuation of application No. 14/539,122, filed on Nov. 12, 2014, now Pat. No. 9,164,587.

(60) Provisional application No. 61/904,342, filed on Nov. 14, 2013.

(51) Int. Cl.
    *A63F 13/23*     (2014.01)
    *A63F 13/60*     (2014.01)
    *A63F 13/285*     (2014.01)

(56) References Cited

U.S. PATENT DOCUMENTS

| | | |
|---|---|---|
| 6,005,551 A | 12/1999 | Osborne et al. |
| 6,169,540 B1 | 1/2001 | Rosenberg et al. |
| 6,184,868 B1 | 2/2001 | Shahoian et al. |
| 6,343,349 B1 | 1/2002 | Braun et al. |
| 6,424,356 B2 | 7/2002 | Chang et al. |
| 6,468,158 B1 | 10/2002 | Ootori et al. |
| 6,563,487 B2 | 5/2003 | Martin et al. |
| 6,710,764 B1 | 3/2004 | Burgel et al. |
| 7,182,691 B1 * | 2/2007 | Schena .................. A63F 13/06 345/161 |
| 7,194,287 B2 | 3/2007 | Usuki et al. |
| 7,196,688 B2 | 3/2007 | Schena |
| 7,336,260 B2 | 2/2008 | Martin et al. |
| 7,791,588 B2 | 9/2010 | Tierling et al. |
| 7,808,488 B2 | 10/2010 | Martin et al. |
| 7,965,276 B1 | 6/2011 | Martin et al. |
| 7,979,146 B2 | 7/2011 | Ullrich et al. |
| 7,979,797 B2 | 7/2011 | Schena |
| 8,000,825 B2 | 8/2011 | Ullrich et al. |
| 8,159,461 B2 | 4/2012 | Martin et al. |
| 8,164,573 B2 | 4/2012 | Da Costa et al. |
| 8,210,942 B2 | 7/2012 | Shimabukuro et al. |
| 8,378,964 B2 | 2/2013 | Ullrich et al. |
| 8,384,316 B2 | 2/2013 | Houston et al. |
| 8,723,820 B1 | 5/2014 | Han |
| 8,754,757 B1 | 6/2014 | Ullrich et al. |
| 8,754,758 B1 | 6/2014 | Ullrich et al. |
| 9,164,587 B2 | 10/2015 | Da Costa et al. |
| 9,171,437 B2 * | 10/2015 | Nakamura ............... G06F 3/016 |
| 9,174,134 B1 | 11/2015 | Grant et al. |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,514,620 B2 | 12/2016 | Bhatia |
| 9,519,346 B2 | 12/2016 | Lacroix et al. |
| 9,557,830 B2 | 1/2017 | Grant |
| 9,619,029 B2 | 4/2017 | Lacroix et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,753,542 B2 | 9/2017 | Chizeck et al. |
| 9,760,166 B2 | 9/2017 | Ammi et al. |
| 9,811,854 B2 | 11/2017 | Lucido |
| 9,814,974 B2 | 11/2017 | Grant et al. |
| 9,849,379 B2 | 12/2017 | Alghooneh et al. |
| 9,851,799 B2 | 12/2017 | Keller et al. |
| 9,852,590 B2 | 12/2017 | Bhatia |
| 9,933,851 B2 | 4/2018 | Goslin et al. |
| 9,948,885 B2 | 4/2018 | Kurzweil |
| 10,185,396 B2 | 1/2019 | Rihn |
| 10,226,697 B2 | 3/2019 | Schmitz et al. |
| 10,254,838 B2 | 4/2019 | Venkatesan et al. |
| 2002/0024503 A1 | 2/2002 | Armstrong |
| 2002/0080112 A1 | 6/2002 | Braun et al. |
| 2003/0030619 A1 * | 2/2003 | Martin .................. G06F 3/011 345/156 |
| 2004/0056840 A1 | 3/2004 | Goldenberg et al. |
| 2005/0134561 A1 | 6/2005 | Tierling et al. |
| 2005/0151720 A1 | 7/2005 | Cruz-Hernandez et al. |
| 2006/0109256 A1 | 5/2006 | Grant et al. |
| 2006/0290662 A1 | 12/2006 | Houston et al. |
| 2007/0013677 A1 | 1/2007 | Rosenberg et al. |
| 2007/0182708 A1 | 8/2007 | Poupyrev et al. |
| 2007/0265077 A1 | 11/2007 | Tom et al. |
| 2007/0290988 A1 | 12/2007 | Nogami et al. |
| 2008/0223627 A1 | 9/2008 | Lacroix et al. |
| 2008/0294984 A1 | 11/2008 | Ramsay et al. |
| 2009/0033624 A1 | 2/2009 | Rosenberg et al. |
| 2009/0088659 A1 | 4/2009 | Graham et al. |
| 2009/0122006 A1 | 5/2009 | Nielsen et al. |
| 2010/0122006 A1 | 5/2010 | Kanaya |
| 2010/0148943 A1 | 6/2010 | Rosenberg et al. |
| 2010/0151948 A1 | 6/2010 | Vance et al. |
| 2010/0173686 A1 | 7/2010 | Grant et al. |
| 2010/0231541 A1 | 9/2010 | Cruz-Hernandez et al. |
| 2011/0006888 A1 | 1/2011 | Bae et al. |
| 2011/0018697 A1 | 1/2011 | Birnbaum |
| 2011/0163860 A1 | 7/2011 | Ryu et al. |
| 2011/0202155 A1 | 8/2011 | Ullrich et al. |
| 2011/0215913 A1 | 9/2011 | Ullrich et al. |
| 2011/0244963 A1 | 10/2011 | Grant et al. |
| 2011/0264491 A1 | 10/2011 | Birnbaum et al. |
| 2012/0068970 A1 | 3/2012 | Pemberton-Pigott |
| 2012/0206246 A1 | 8/2012 | Cruz-Hernandez et al. |
| 2012/0206247 A1 | 8/2012 | Bhatia et al. |
| 2012/0306631 A1 | 12/2012 | Hughes |
| 2013/0131851 A1 | 5/2013 | Ullrich et al. |
| 2013/0147610 A1 | 6/2013 | Grant et al. |
| 2013/0194085 A1 | 8/2013 | Grant et al. |
| 2013/0207792 A1 | 8/2013 | Lim et al. |
| 2013/0207917 A1 | 8/2013 | Cruz-Hernandez et al. |
| 2013/0222311 A1 | 8/2013 | Pesonen |
| 2013/0265286 A1 | 10/2013 | Da Costa et al. |
| 2013/0267321 A1 | 10/2013 | Burgess et al. |
| 2013/0324254 A1 | 12/2013 | Huang et al. |
| 2013/0335209 A1 | 12/2013 | Cruz-Hernandez et al. |
| 2014/0002386 A1 | 1/2014 | Rosenberg et al. |
| 2014/0064516 A1 | 3/2014 | Cruz-Hernandez et al. |
| 2014/0118125 A1 | 5/2014 | Bhatia |
| 2014/0315642 A1 | 10/2014 | Grant et al. |
| 2015/0070146 A1 | 3/2015 | Cruz-Hernandez et al. |
| 2015/0070147 A1 | 3/2015 | Cruz-Hernandez et al. |
| 2015/0070148 A1 | 3/2015 | Cruz-Hernandez et al. |
| 2015/0070260 A1 | 3/2015 | Saboune et al. |
| 2015/0070261 A1 | 3/2015 | Saboune et al. |
| 2015/0070265 A1 | 3/2015 | Cruz-Hernandez et al. |
| 2015/0352437 A1 | 12/2015 | Koseki et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0132114 A1 | 5/2016 | Rihn |
| 2016/0132116 A1 | 5/2016 | Grant et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore |
| 2016/0171860 A1 | 6/2016 | Hannigan et al. |
| 2016/0171908 A1 | 6/2016 | Moore et al. |
| 2016/0175703 A1 | 6/2016 | Venkatesan et al. |
| 2016/0179220 A1 | 6/2016 | Venkatesan et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203207 A1 | 7/2017 | Lacroix et al. |
| 2017/0203221 A1 | 7/2017 | Goslin et al. |

(56) References Cited

U.S. PATENT DOCUMENTS

| | | |
|---|---|---|
| 2017/0203225 A1 | 7/2017 | Goslin |
| 2017/0206709 A1 | 7/2017 | Goslin et al. |
| 2017/0212591 A1 | 7/2017 | Churikov et al. |
| 2017/0214782 A1 | 7/2017 | Brinda |
| 2017/0257270 A1 | 9/2017 | Goslin et al. |
| 2017/0333788 A1 | 11/2017 | Grant et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0074589 A1 | 3/2018 | Da Costa et al. |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |
| 2018/0188812 A1 | 7/2018 | Grant et al. |

FOREIGN PATENT DOCUMENTS

| | | |
|---|---|---|
| CN | 102906667 A | 1/2013 |
| CN | 103365415 A | 10/2013 |
| CN | 104107539 A | 10/2014 |
| EP | 0864144 A2 | 9/1998 |
| EP | 0875819 A1 | 11/1998 |
| EP | 2039404 A2 | 3/2009 |
| EP | 2648071 A1 | 10/2013 |
| EP | 2796965 A2 | 10/2014 |
| JP | 2001-137553 A | 5/2001 |
| JP | 2003-199974 A | 7/2003 |
| JP | 2003534620 A | 11/2003 |
| JP | 2005-056267 A | 3/2005 |
| JP | 2008173186 A | 7/2008 |
| JP | 2009-233108 A | 10/2009 |
| JP | 2009-535694 A | 10/2009 |
| JP | 2010-165383 A | 7/2010 |
| JP | 2013-524351 A | 6/2013 |
| JP | 2013-164845 A | 8/2013 |
| JP | 2013218327 A | 10/2013 |
| JP | 2014180572 A | 9/2014 |
| KR | 10-2013-0040853 | 4/2013 |
| WO | 2003032289 A1 | 4/2003 |
| WO | 2010065207 A1 | 6/2010 |
| WO | 2013116247 A1 | 8/2013 |

OTHER PUBLICATIONS

Mkwone, "Move FAQ—Playstation Forum", Sep. 3, 2010, XP055172297, http://community.eu.playstation.com/t5/PlayStation-Move/Move-Faq/td-p/11447251.

Any information that are not included with this Information Disclosure Statement can be found in U.S. Appl. No. 14/539,122 and/or U.S. Appl. No. 14/874,622.

* cited by examiner

HAPTIC SPATIALIZATION SYSTEM

CROSS-REFERENCE TO RELATED APPLICATIONS

This application is a continuation of application Ser. No. 14/874,622 filed on Oct. 5, 2015, which is a continuation of application Ser. No. 14/539,122 filed on Nov. 12, 2014, which claims priority of U.S. Provisional Patent Application Ser. No. 61/904,342, filed on Nov. 14, 2013, the disclosures of all of which are hereby incorporated by reference in their entirety.

FIELD

One embodiment is directed generally to a device, and more particularly, to a device that produces haptic effects.

BACKGROUND

Video games and video game systems have become extremely popular. Video game devices or controllers typically use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify a user's interaction with a video game controller, or other electronic device. Specifically, vibration effects, or vibrotactile haptic effects, may be useful in providing cues to users of video game controllers or other electronic devices to alert the user to specific events, or provide realistic feedback to create greater sensory immersion within a simulated or virtual environment.

Other devices, such as medical devices, automotive controls, remote controls, and other similar devices where a user interacts with a user input element to cause an action, also benefit from haptic feedback or haptic effects. For example, and not by way of limitation, user input elements on medical devices may be operated by a user outside the body of a patient at a proximal portion of a medical device to cause an action within the patient's body at a distal end of the medical device. Haptic feedback or haptic effects may be employed to alert the user to specific events, or provide realistic feedback to the user regarding an interaction of the medical device with the patient at the distal end of the medical device.

SUMMARY

One embodiment is a system that controls a haptic effect experienced at a peripheral device. The system receives a haptic effect definition including haptic data. The system further receives spatialization data including: a distance of the haptic effect; a direction of the haptic effect; or a flow of the haptic effect. The system further includes modifying the haptic effect definition based on the received spatialization data. The system further includes sending a haptic instruction and the modified haptic effect definition to the peripheral device. The system further includes causing one or more haptic output devices to produce one or more haptic effects based on the modified haptic effect definition at the peripheral device in response to the haptic instruction.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
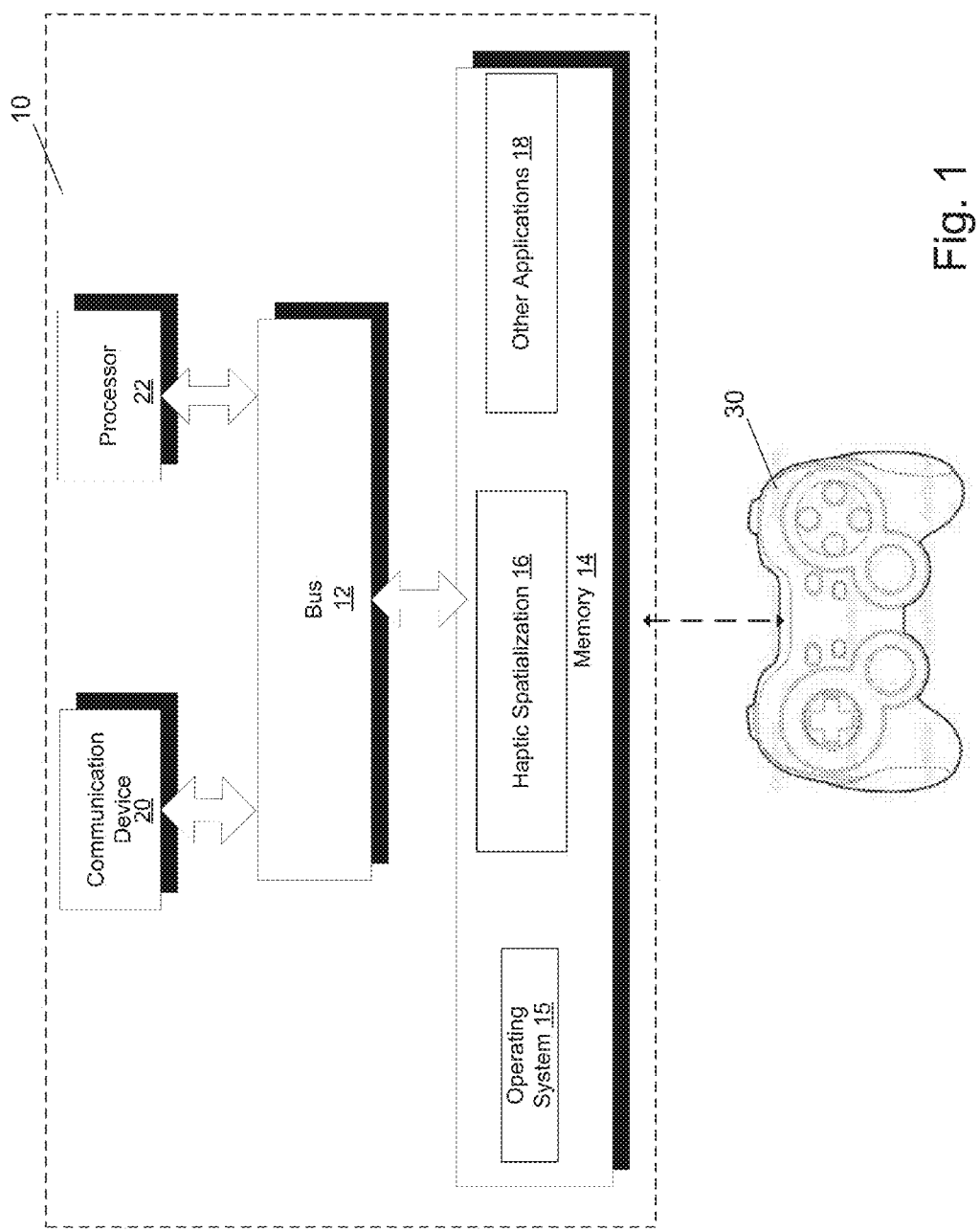
FIG. 1 illustrates a block diagram of a system in accordance with one embodiment of the invention.

One embodiment is a system that provides haptic feedback that is experienced at a peripheral device, such as a game controller or gamepad. In an embodiment, a spatialization engine can receive haptic data, such as a haptic effect definition, and can modify the haptic data based on spatialization data, where spatialization data can include one or more parameters. Thus, the spatialization engine can localize or spatialize haptic effects. More specifically, the spatialization engine can produce a haptic effect that conveys a position, distance, velocity, flow, and/or direction of the haptic effect by scaling or attenuating the haptic effect on an actuator or motor based on the position, distance, velocity, flow, and/or direction of the haptic effect. As one of ordinary skill in the relevant art would appreciate, by "attenuating" a haptic effect, the spatialization engine can reduce a magnitude, frequency, and/or duration of the haptic effect based on an intended position, distance, velocity, flow, and/or direction of the haptic effect. The spatialization engine can further produce a haptic effect that conveys movement on a controller, gamepad, or other peripheral device by delaying a playback of the haptic effect, or scaling the haptic effect, on different actuators or motors. The spatialization engine can be a component of an API or library, or can be implemented in firmware for a controller, gamepad, or other peripheral device.

In one embodiment, a spatialization engine can receive a haptic effect definition. The spatialization engine can modify the haptic effect definition based on one or more spatialization parameters, where the modified haptic effect definition can be identified as a spatialization haptic effect definition. In one embodiment, the spatialization haptic effect definition can be divided into a plurality of spatialization haptic effect definition components, where each spatialization haptic effect definition component can be sent to a separate actuator or motor of a peripheral device, where each actuator or motor can cause a component of the overall spatialization haptic effect to be experienced at a user input element of the peripheral device or otherwise within the peripheral device. The spatialization engine can scale or delay one or more of the spatialization haptic effect components based on spatialization data, such as one or more spatialization parameters. In another embodiment, the spatialization haptic effect definition can be sent to each actuator or motor of the peripheral device, where each actuator or motor can cause a spatialization haptic effect to be experienced at a user input element of the peripheral device or otherwise within the peripheral device. The spatialization engine can further scale or delay one or more of the spatialization haptic effects based on spatialization data, such as one or more spatialization parameters. Such spatialization parameters can include one or more parameters that define a position, distance, velocity, flow, and/or direction of a haptic effect. In one embodiment, the spatialization data (e.g., the one or more spatialization parameters) can be modified based on a detected motion and/or position of the peripheral device. For example, when the peripheral device is rotated or shaken, or when the peripheral device is moved to a different location, the spatialization data (e.g., the one or more spatialization parameters) are modified. Based on the modified spatialization data, the spatialization data can further modify the haptic effect definition, so that the user experiences modified spatialization haptic effects. Examples of modified spatialization haptic effects can include spatialization haptic effects with a modified attenuation, scaling, or delay.

In one embodiment, a haptic effect definition can be authored to include a plurality of haptic effect definition components. The spatialization engine can modify the haptic effect definition, where the haptic effect definition can be divided into the authored plurality of haptic effect definition components, where each authored haptic effect definition component can be sent to a separate actuator or motor of a peripheral device, where each actuator or motor can cause a component of the overall haptic effect to be experienced at a user input element of the peripheral device or otherwise within the peripheral device. This way, the haptic effect can convey a sense of spatialization. In an alternate embodiment, rather than sending a spatialization haptic effect definition (or a multiple spatialization haptic effect definition components) to multiple actuators or motors of a peripheral device, the spatialization engine can send the spatialization haptic effect definition (or multiple spatialization haptic effect definition components) to multiple peripheral devices. In an alternate embodiment, a peripheral device can be a wearable haptic device, rather than a controller or gamepad, where a wearable haptic device is a device that a user may wear on a body or that can be held by a user, such as a wrist band, headband, eyeglasses, ring, leg band, an array integrated into clothing, and that includes a mechanism to generate haptic effects.

FIG. 1 illustrates a block diagram of a system 10 in accordance with one embodiment of the invention. In one embodiment, system 10 is part of a device (e.g., a personal computer or console, such as a video game console), and system 10 provides a haptic trigger control functionality for the device. In another embodiment, system 10 is separate from the device (e.g., personal computer or console), and remotely provides the aforementioned functionality for the device. Although shown as a single system, the functionality of system 10 can be implemented as a distributed system. System 10 includes a bus 12 or other communication mechanism for communicating information, and a processor 22 operably coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer-readable medium.

A computer-readable medium may be any available medium that can be accessed by processor 22 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of an overall device in one embodiment. The modules further include a haptic spatialization module 16 that generates a spatialization haptic effect experienced at a peripheral device. In certain embodiments, haptic spatialization module 16 can comprise a plurality of modules, where each module provides specific individual functionality for generating a spatialization haptic effect experienced at a peripheral device. System 10 will typically include one or more additional application modules 18 to include additional functionality, such as peripheral firmware which can provide control functionality for a peripheral device, such as a controller 30.

System 10, in embodiments that transmit and/or receive data from remote sources, further includes a communication device 20, such as a network interface card, to provide mobile wireless network communication, such as infrared, radio, Wi-Fi, or cellular network communication. In other embodiments, communication device 20 provides a wired network connection, such as an Ethernet connection or a modem.

System 10 is operably connected to controller 30. Controller 30 is a peripheral device used to provide input to system 10. Controller 30 can be operably connected to system 10 using either a wireless connection or a wired connection. Controller 30 can further include a local processor which can communicate with system 10 using either a wireless connection or a wired connection. Alternatively, controller 30 may be configured to not include a local processor, and all input signals and/or output signals associated with controller 30 can be handled and processed directly by processor 22 of system 10.

Controller 30 can further include one or more digital buttons, one or more analog buttons, one or more bumpers, one or more directional pads, one or more analog or digital sticks, one or more driving wheels, and/or one or more user input elements that can be interacted with by a user, and that can provide input to system 10. Controller 30 can also include one or more analog or digital trigger buttons (or "triggers") that can further be interacted with by the user, and that can further provide input to system 10. As is described below in greater detail, controller 30 can further include a motor, or another type of actuator or haptic output device, configured to exert a bi-directional push/pull force on at least one trigger of controller 30.

Controller 30 can also include one or more actuators, or other types of haptic output devices. The local processor of controller 30, or, processor 22 in embodiments where controller 30 does not include a local processor, may transmit a haptic signal associated with a haptic effect to at least one actuator of controller 30. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 30. Alternatively, the haptic effects can be experienced at an outer surface of controller 30. The actuator includes an actuator drive circuit. The actuator may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. An actuator is an example of a haptic output device, where a haptic output device is a device configured to output haptic effects, such as vibrotactile haptic effects, electrostatic friction haptic effects, kinesthetic haptic effects, or deformation haptic effects, in response to a drive signal. In alternate embodiments, the one or more actuators within controller 30 can be replaced by some other type of haptic output device.

Controller 30 can further include one or more speakers. The local processor of controller 30, or, processor 22 in embodiments where controller 30 does not include a local processor, may transmit an audio signal to at least one speaker of controller 30, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 30 can further include one or more sensors. A sensor can be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor can further be configured to convert the detected energy, or other physical property, into an electrical signal, or any signal that represents virtual sensor information, and controller 30 can send the converted signal to the local processor of controller 30, or, processor 22 in embodiments where controller 30 does not include a local processor. The sensor can be any device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense $CPS^2$ 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor.

Figure 2:
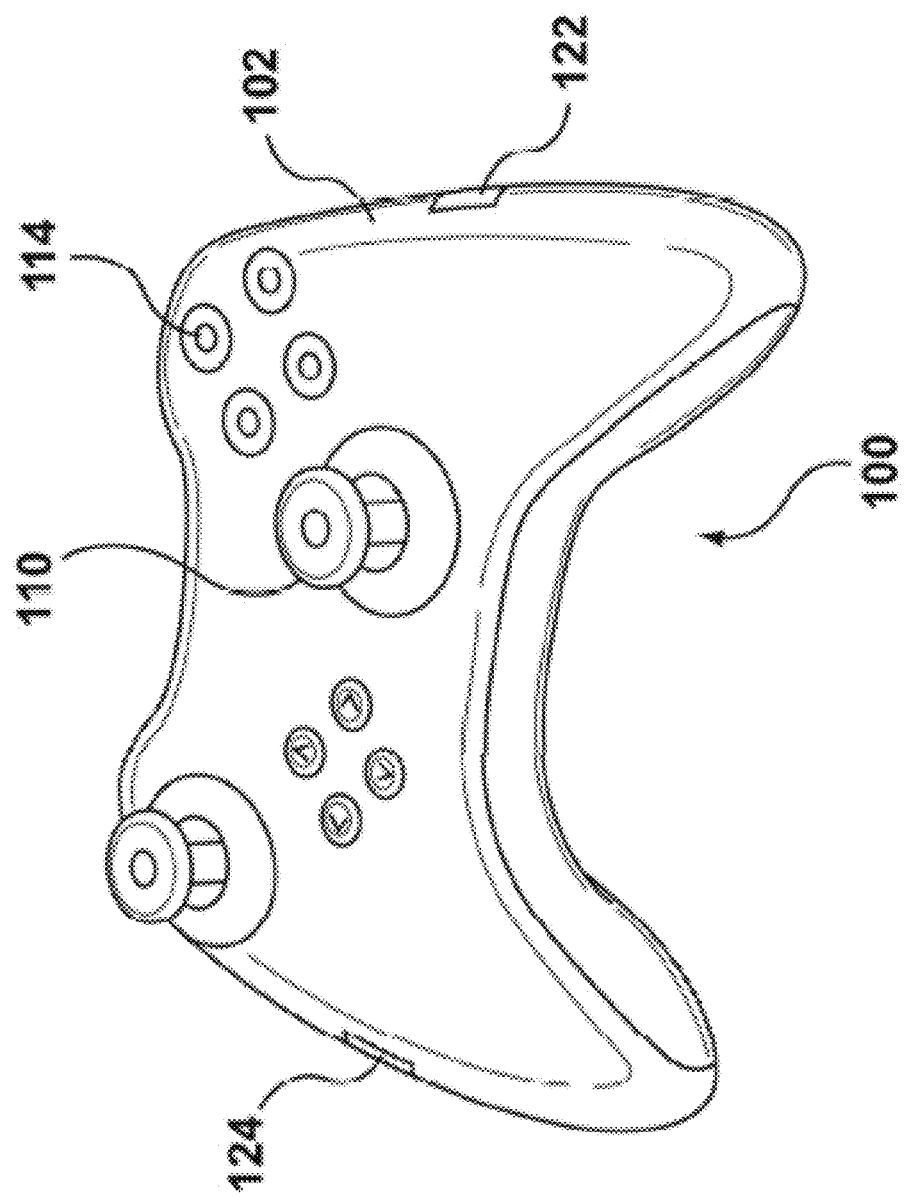
FIG. 2 illustrates a controller, according to an embodiment of the invention.
Figure 3:
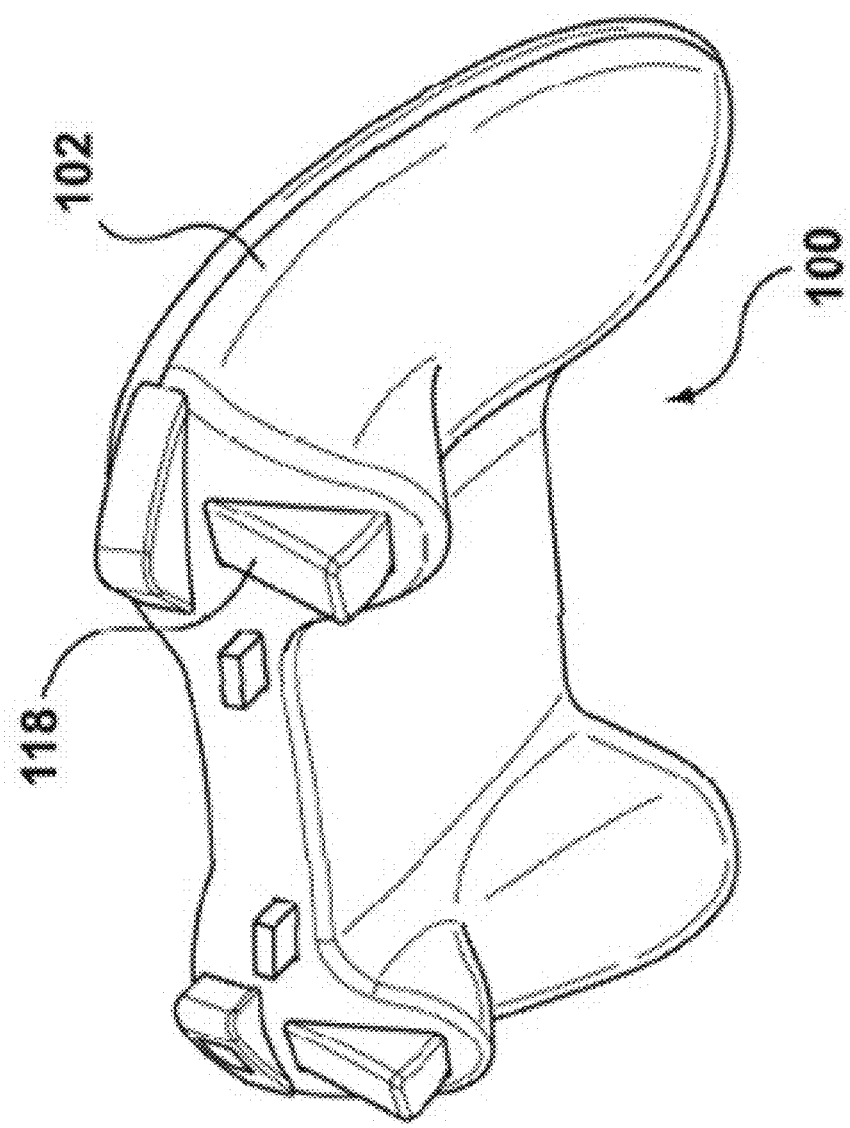
FIG. 3 illustrates another view of the controller of FIG. 2, according to an embodiment of the invention.

FIG. 2 illustrates a controller 100, according to an embodiment of the invention. In one embodiment, controller 100 is identical to controller 30 of FIG. 1. Further, FIG. 3 illustrates another view of controller 100. Controller 100 may be generally used with a gaming system that may be connected to a computer, mobile phone, television, or other similar device. Components of controller 100 illustrated in FIGS. 2 and 3 (i.e., housing 102, analog or digital stick 110, button 114, trigger 118, and rumble actuators 122 and 124) are further described below in greater detail in conjunction with FIG. 4.

Figure 4:
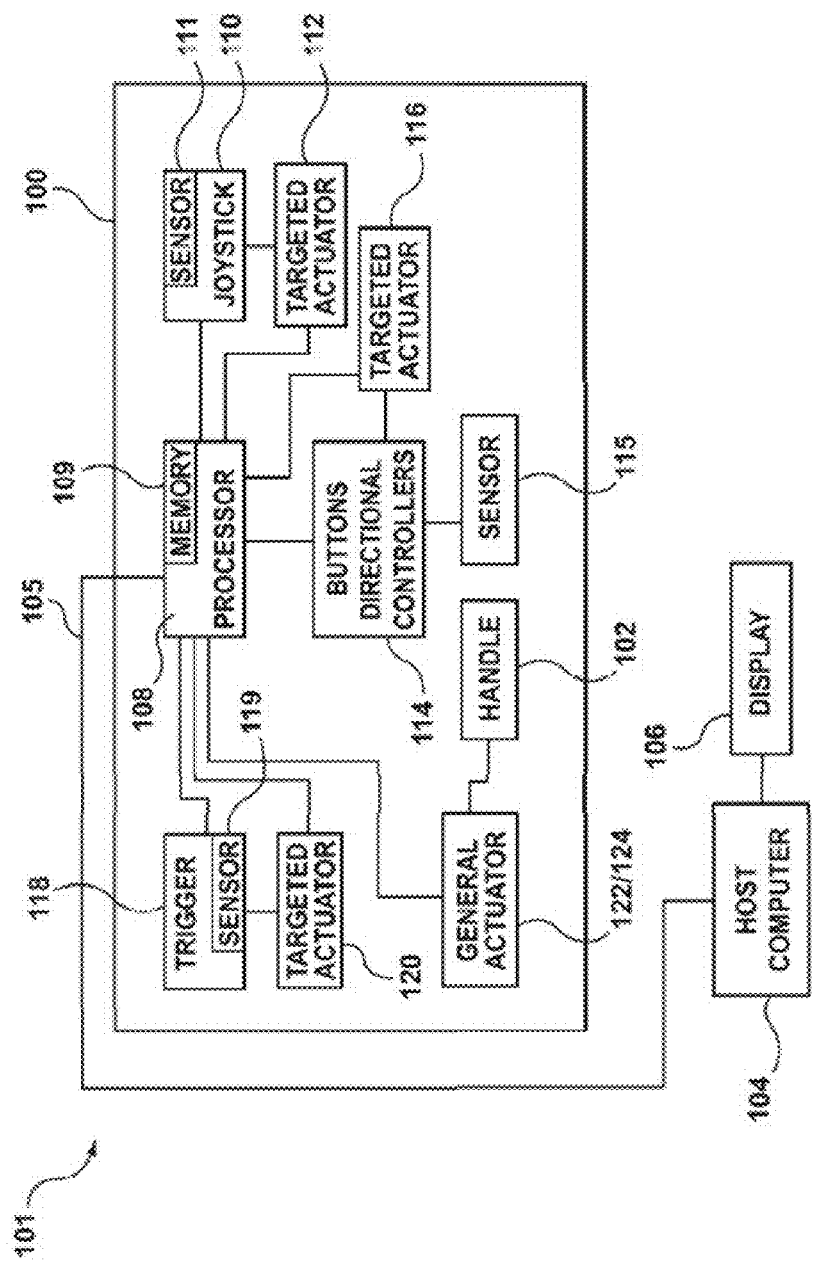
FIG. 4 illustrates a block diagram of a controller in conjunction with a host computer and display, according to an embodiment of the invention.

FIG. 4 illustrates a block diagram of controller 100 used in a gaming system 101 that further includes a host computer 104 and a display 106. As shown in the block diagram of FIG. 4, controller 100 includes a local processor 108 which communicates with host computer 104 via a connection 105. Connection 105 may be a wired connection, a wireless connection, or other types of connections known to those skilled in the art. Controller 100 may be alternatively configured to not include local processor 108, whereby all input/output signals from controller 100 are handled and processed directly by host computer 104. Host computer 104 is operably coupled to display screen 106. In an embodiment, host computer 104 is a gaming device console and display screen 106 is a monitor which is operably coupled to the gaming device console, as known in the art. In another embodiment, as known to those skilled in the art, host computer 104 and display screen 106 may be combined into a single device.

A housing 102 of controller 100 is shaped to easily accommodate two hands gripping the device, either by a left-handed user or a right-handed user. Those skilled in the art would recognize that controller 100 is merely an example embodiment of a controller of similar shape and size to many "gamepads" currently available for video game console systems, such as a Microsoft® Xbox One™ controller or a PlayStation® DualShock™ controller, and that controllers with other configurations of user input elements, shapes, and sizes may be used, including but not limited to controllers such as a Wii™ remote or Wii™ U Controller, Sony® SixAxis™ controller or Sony® Wand controller, as well as controllers shaped as real life objects (such as tennis rackets, golf clubs, baseball bats, and the like) and other shapes, or controllers with a display or head-mounted display.

Controller 100 includes several user input elements, including an analog or digital stick 110, a button 114, and a trigger 118. As used herein, user input element refers to an interface device such as a trigger, button, analog or digital stick, or the like, which is manipulated by the user to interact with host computer 104. As can be seen in FIGS. 2 and 3, and as known to those skilled in the art, more than one of each user input element and additional user input elements may be included on controller 100. Accordingly, the present description of a trigger 118, for example, does not limit controller 100 to a single trigger. Further, the block diagram of FIG. 4 shows only one (1) of each of analog or digital stick 110, button 114, and trigger 118. However, those skilled in the art would understand that multiple analog or digital sticks, buttons, and triggers, as well as other user input elements, may be used, as described above.

As can be seen in the block diagram of FIG. 4, controller 100 includes a targeted actuator or motor to directly drive each of the user input elements thereof as well as one or more general or rumble actuators 122, 124 operably coupled to housing 102 in a location where a hand of the user is generally located. More particularly, analog or digital stick 110 includes a targeted actuator or motor 112 operably coupled thereto, button 114 includes a targeted actuator or motor 116 operably coupled thereto, and trigger 118 includes a targeted actuator or motor 120 operably coupled thereto. In addition to a plurality of targeted actuators, controller 100 includes a position sensor operably coupled to each of the user input elements thereof. More particularly, analog or digital stick 110 includes a position sensor 111 operably coupled thereto, button 114 includes a position sensor 115 operably coupled thereto, and trigger 118 includes a position sensor 119 operably coupled thereto. Local processor 108 is operably coupled to targeted actuators 112, 116, 120 as well as position sensors 111, 115, 119 of analog or digital stick 110, button 114, and trigger 118, respectively. In response to signals received from position sensors 111, 115, 119, local processor 108 instructs targeted actuators 112, 116, 120 to provide directed or targeted kinesthetic effects directly to analog or digital stick 110, button 114, and trigger 118, respectively. Such targeted kinesthetic effects are discernible or distinguishable from general or rumble haptic effects produced by general actuators 122, 124 along the entire body of the controller. The collective haptic effects provide the user with a greater sense of immersion to the game as multiple modalities are being simultaneously engaged, e.g., video, audio, and haptics. Further details of a controller configured to produce haptics are described in greater detail in application Ser. No. 14/258,644, filed Apr. 22, 2014, entitled "GAMING DEVICE HAVING A HAPTIC-ENABLED TRIGGER," herein incorporated by reference in its entirety.

Figure 5:
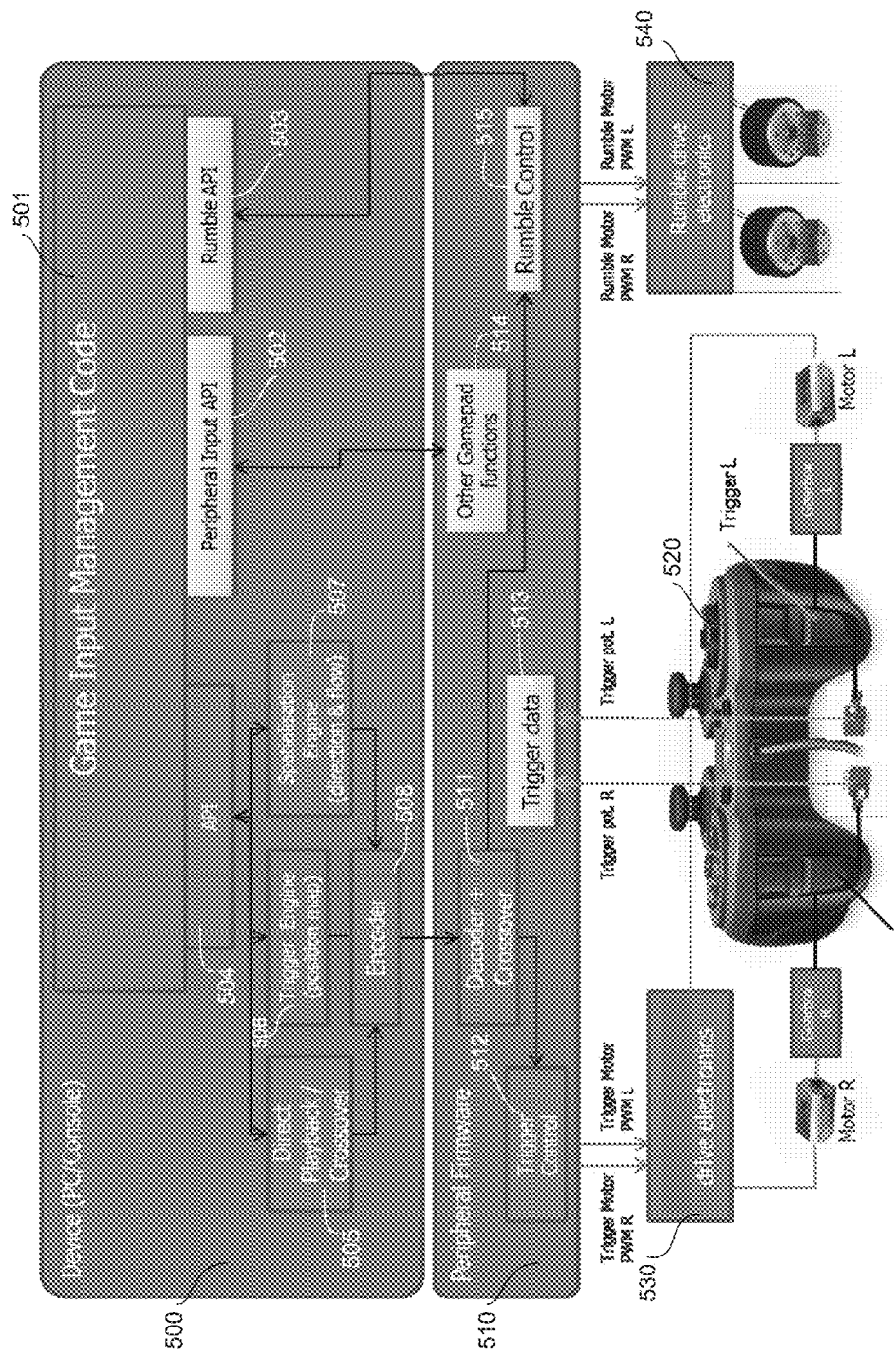
FIG. 5 illustrates a block diagram of a spatialization haptic effect software stack for a system, according to an embodiment of the invention.

FIG. 5 illustrates a block diagram of a spatialization haptic effect software stack for a system, according to an embodiment of the invention. The trigger haptic effect software stack is implemented on a system, such as system 10 of FIG. 1. In the illustrated embodiment, the system includes the following components: device 500, peripheral firmware 510, and controller 520. Device 500 can be any type of computer device, such as a personal computer, tablet, smartphone, or console (e.g., video game console). Peripheral firmware 510 is firmware for one or more peripheral devices (e.g., controllers) that can be operably connected to device 500. Controller 520 is an example of a peripheral that is operably connected to device 500. Controller 520 can be a video game controller. In one embodiment, controller 520 can be identical to controller 30 of FIG. 1, and controller 100 of FIGS. 2, 3, and 4.

Device 500 includes game input management code 501. Game input management code 501 includes a set of computer-readable instructions that manage input provided by controller 520 in the context of a game application, or other type of application, executed within device 500. Device 500 further includes peripheral input application programming interface ("API") 502. Peripheral input API 502 includes a set of computer-readable functions or routines that allow game input management code 501 to interact with peripheral firmware 510 in order to receive and manage input provided by controller 520. Device 500 further includes rumble API 503. Rumble API includes a set of computer-readable functions or routines that allow game input management code 501 to interact with peripheral firmware 510 in order to transmit rumble instructions to one or more rumble motors, or rumble actuators, of controller 520 (e.g., rumble motors L and R, as illustrated in FIG. 5). A rumble instruction can cause a rumble motor, or rumble actuator, of controller 520 to produce a general or rumble haptic effect.

Device 500 further includes haptic effect API 504 (identified in FIG. 5 as "API"). Haptic effect API 504 includes a set of computer-readable functions or routines that are exposed to game input management code 501, and that allow game input management code 501 to interact with peripheral firmware 510 in order to transmit haptic instructions to controller 520, such as trigger instructions to one or more triggers of controllers 520 (e.g., triggers L and R, as illustrated in FIG. 5). A haptic instruction can cause one or more targeted motors, or targeted actuators, of controller 520 to produce a haptic effect at one or more user input elements of controllers 520. A trigger instruction is a specific type of haptic instruction that can cause one or more targeted motors, or targeted actuators, of controller 520 (e.g., motors L and R, as illustrated in FIG. 5) to produce a trigger haptic effect at one or more triggers of controllers 520 (e.g., triggers L and R, as illustrated in FIG. 5). A trigger haptic effect is a specific type of haptic effect that is experienced at a trigger of a controller, such as controller 520. Haptic effect API 504 can store one or more trigger haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 520. The haptic data can include one or more attributes of the corresponding haptic effect, where the attributes can be stored as parameters. Example parameters of a haptic effect definition include an amplitude parameter, a frequency parameter, a waveform parameter, an envelope parameter, a magnitude (or strength) parameter, and a duration parameter. A trigger haptic effect definition is a specific type of haptic effect definition that can be sent to one or more motors, or actuators, of controller 520 (e.g., motors L and R, as illustrated in FIG. 5) to produce a trigger haptic effect at one or more triggers of controllers 520 (e.g., triggers L and R, as illustrated in FIG. 5).

According to the embodiment, Haptic effect API 504 can allow game input management code 501 to interact with direct playback/crossover 505, trigger engine 506, and spatialization engine 507, and can further manage direct playback/crossover 505, trigger engine 506, and spatialization engine 507 according to requests invoked by game input management code 501. Further, haptic effect API 504 can store data required for communication with peripheral firmware 510, and required for generation of one or more trigger haptic effects. In an alternate embodiment, haptic effect API 504 can reside within peripheral firmware 510 rather than device 500. Haptic effect API 504 is further described below in greater detail in conjunction with FIG. 15.

Device 500 further includes direct playback/crossover 505. Direct playback/crossover 505 receives haptic data as input, produces haptic data as output, and transmits haptic data to one or more targeted motors, or targeted actuators, of controller 520 (e.g., motors L and R, as illustrated in FIG. 5). In certain embodiments, direct playback/crossover 505 can output the input haptic data directly, without modifying a format of the input haptic data. This results in an "as-is" playback of the input haptic data. In other embodiments, direct playback/crossover 505 can convert the haptic data that is input from a first format to a second format, and can further output the converted haptic data. Depending on the type of playback, direct playback/crossover 505 can optionally use a programmable crossover to convert the haptic data. By converting the haptic data, device 500 can "deconstruct" the haptic effect and playback the haptic effect at multiple actuators faithfully. In one embodiment, the format of the haptic data can be a Haptic Elementary Stream ("HES") format. A HES format is a file or data format for representing haptic data that can be streamed to a device. The haptic data can be represented in a manner that is identical or similar to how uncompressed sound is represented, although the haptic data can be encrypted within the HES format. Thus, the haptic data can be stored in a haptic file or haptic stream, where a format of the haptic file or haptic stream is an HES format. In other words, the HES format can be used by the haptic file or haptic stream to represent the haptic data in a haptic format. In an alternate embodiment, direct playback/crossover 505 can reside within peripheral firmware 510 rather than device 500. Direct playback/crossover 505 is further described below in greater detail in conjunction with FIGS. 7, 8, 9, 10, 11, 12, and 13.

Device 500 further includes trigger engine 506. Trigger engine 506 can receive haptic data, such as a trigger haptic effect definition, and can modify the haptic data based on data, such as trigger data (e.g., trigger data 513 as illustrated in FIG. 5) received from controller 520. Trigger data is data that includes one or more parameters that indicate a position and/or range of one or more triggers of controller 520 (e.g., triggers L and R as illustrated in FIG. 5). Trigger engine 506 can further transmit haptic instructions to controller 520. For example, trigger engine 506 can transmit trigger instructions to one or more triggers of controller 520 (e.g., triggers L and R, as illustrated in FIG. 5). As previously described, a trigger instruction can cause one or more targeted motors, or targeted actuators, of controller 520 (e.g., motors L and R, as illustrated in FIG. 5) to produce a trigger haptic effect at one or more triggers of controllers 520 (e.g., triggers L and R, as illustrated in FIG. 5). Thus, in one embodiment, by modifying the haptic data of the trigger haptic effect definition, trigger engine 506 can cause a specific trigger haptic effect to be experienced at a trigger based on a position and/or range of the trigger. In another embodiment, by modifying the haptic data of the trigger haptic effect definition, trigger engine 506 can scale a trigger haptic effect for one or more targeted motors, or targeted actuators, of controller 520 (e.g., motors L and R, as illustrated in FIG. 5) based on a position and/or range of the trigger. Trigger engine 506 can further store one or more haptic effect definitions, such as trigger haptic effect definitions. In an alternate embodiment, trigger engine 506 can reside within peripheral firmware 510 rather than device 500.

Device 500 further includes spatialization engine 507 (identified in FIG. 5 as "spatialisation engine"). Spatialization engine 507 can receive haptic data, such as a trigger haptic effect definition, and can modify the haptic data based on spatialization data. Spatialization data can include data that indicates a desired direction and/or flow of a haptic effect, such as a trigger haptic effect. In certain embodiments, spatialization engine 507 can receive spatialization data that includes a direction and/or flow from game input management code 501. Further, spatialization data can also include one or more positions of one or more hands of a user located on controller 520. In certain embodiments, spatialization engine 507 can receive spatialization data that includes one or more hand positions from controller 520. Further, in certain embodiments, spatialization engine 507 can receive spatialization data that includes a position of a user's character within a game application as communicated by game input management code 501.

According to the embodiment, spatialization engine 507 can modify the haptic data so that a haptic effect, such as a trigger haptic effect, is scaled for one or more rumble motors, or rumble actuators, of controller 520 (e.g., rumble motors L and R, as illustrated in FIG. 5), and that the haptic effect is also scaled for one or more targeted motors, or targeted actuators, of controller 520 (e.g., motors L and R, as illustrated in FIG. 5). In other words, spatialization engine 507 can modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 507 may scale one or more portions of the haptic effect. For example, spatialization engine 507 may scale haptic data that is sent to the motor or actuator that causes the haptic effect to be experienced, causing the haptic effect to be more pronounced (e.g., increased magnitude, duration, etc.). Additionally, spatialization engine 507 may scale haptic data that is sent to other motors or actuators, causing other haptic effects that are experienced at those motors or actuators to be less pronounced (e.g., decreased magnitude, duration, etc.). In certain embodiments, spatialization engine 507 can modify the haptic data in real-time. Further, in certain embodiments, spatialization engine 507 can have non-linear relationships between inputs and motor, or actuator, outputs in order to exaggerate an overall trigger haptic effect. In an alternate embodiment, spatialization engine 507 can reside within peripheral firmware 510 rather than device 500. Spatialization engine 507 is further described below in greater detail in conjunction with FIGS. 14, 29, and 30.

Device 500 further includes encoder 508. Encoder 508 encodes haptic data received from direct playback/crossover 505, trigger engine 506, and/or spatialization engine 507 into a format. In one embodiment, the format can be an HES format. Encoder 508 further transmits the encoded haptic data to peripheral firmware 510.

Peripheral firmware 510 includes decoder and crossover 511. Decoder and crossover 511 receives the encoded haptic data from encoder 508 and decodes the encoded haptic data. In certain embodiments, decoder and crossover 511 computes a programmable crossover in order to decode the encoded haptic data. In some of these embodiments, decoder and crossover 511 computes the programmable crossover in real-time. Peripheral firmware 510 further includes trigger control 512. Trigger control 512 is a low-level control API for one or more targeted motors, or targeted actuators, of controller 520 (e.g., motors L and R, as illustrated in FIG. 5). Trigger control 512 can receive a trigger instruction from device 500, can convert the trigger instruction into a low-level trigger instruction for a specified targeted motor, or targeted actuator, of controller 520, and can transmit the low-level trigger instruction to the specified targeted motor, or targeted actuator, of controller 520. The low-level trigger instruction can cause the specified targeted motor, or targeted actuator, to produce a trigger haptic effect at a specified trigger of controller 520.

Peripheral firmware 510 further includes trigger data 513. Trigger data 513, as previously described, is data that includes one or more parameters, such as one or more parameters that indicate a position and/or range of one or more triggers of controller 520 (e.g., triggers L and R as illustrated in FIG. 5). Trigger data 513 can be received from controller 520 by peripheral firmware 510. Peripheral firmware 510 can further store trigger data 513, and can further transmit trigger data 513 to device 500. Peripheral firmware 510 further includes other gamepad functions 514, which are functions of controller 520 that can be managed by peripheral firmware 510. Such functions can include wired/wireless communications, input reporting, protocol implementation, power management, etc. Peripheral firmware 510 further includes rumble control 515. Rumble control 515 is a low-level control API for one or more rumble motors, or rumble actuators, of controller 520 (e.g., rumble motors L and R, as illustrated in FIG. 5). Rumble control 515 can receive a rumble instruction from device 500, can convert the rumble instruction into a low-level rumble instruction for a specified rumble motor, or rumble actuator, of controller 520, and can transmit the low-level trigger instruction to the specified rumble motor, or rumble actuator, of controller 520.

Controller 520 includes triggers L and R. Controller 520 further includes gear boxes L and R and motors L and R. Motor L and gearbox L are operably coupled to trigger L within controller 520. Likewise, motor R and gearbox R are operably coupled to trigger R within controller 520. When motor L receives a trigger instruction, motor L and gearbox L collectively cause a trigger haptic effect to be experienced at trigger L. Likewise, when motor R receives a trigger instruction, motor R and gearbox R collectively cause a trigger haptic effect to be experienced at trigger R. According to the embodiment, peripheral firmware 510 sends trigger instructions to motors L and R of controller 520 using drive electronics 530. Controller 520 further includes potentiometers L and R. Potentiometer L can detect a position and/or range of trigger L, and can further send the detected position and/or range of trigger L to peripheral firmware 510 as trigger data. Likewise, potentiometer R can detect a position and/or range of trigger R, and can further send the detected position and/or range of trigger R to peripheral firmware 510 as trigger data. In one embodiment, potentiometers L and R can each be replaced with another type of position sensor, such as a hall effect sensor. Controller 520 further includes rumble motors L and R. When rumble motor L receives a rumble instruction, rumble motor L causes a haptic effect to be experienced along a left body of controller

520. Likewise, when rumble motor R receives a rumble instruction, rumble motor R cause a haptic effect to be experienced along a right body of controller 520. According to the embodiment, peripheral firmware 510 sends rumble instructions to rumble motors L and R of controller 520 using rumble drive electronics 530.

In an alternate embodiment, one or more targeted motors, or targeted actuators, can be operably coupled to one or more user input elements (such as one or more digital buttons, one or more analog buttons, one or more bumpers, one or more directional pads, one or more analog or digital sticks, one or more driving wheels) of controller 520. According to the alternate embodiment, peripheral firmware 510 can sends instructions to the one or more targeted motors or targeted actuators, causing the one or more targeted motors or targeted actuators to produce haptic effects that are experienced at the one or more user input elements of controller 520.

Figure 6:
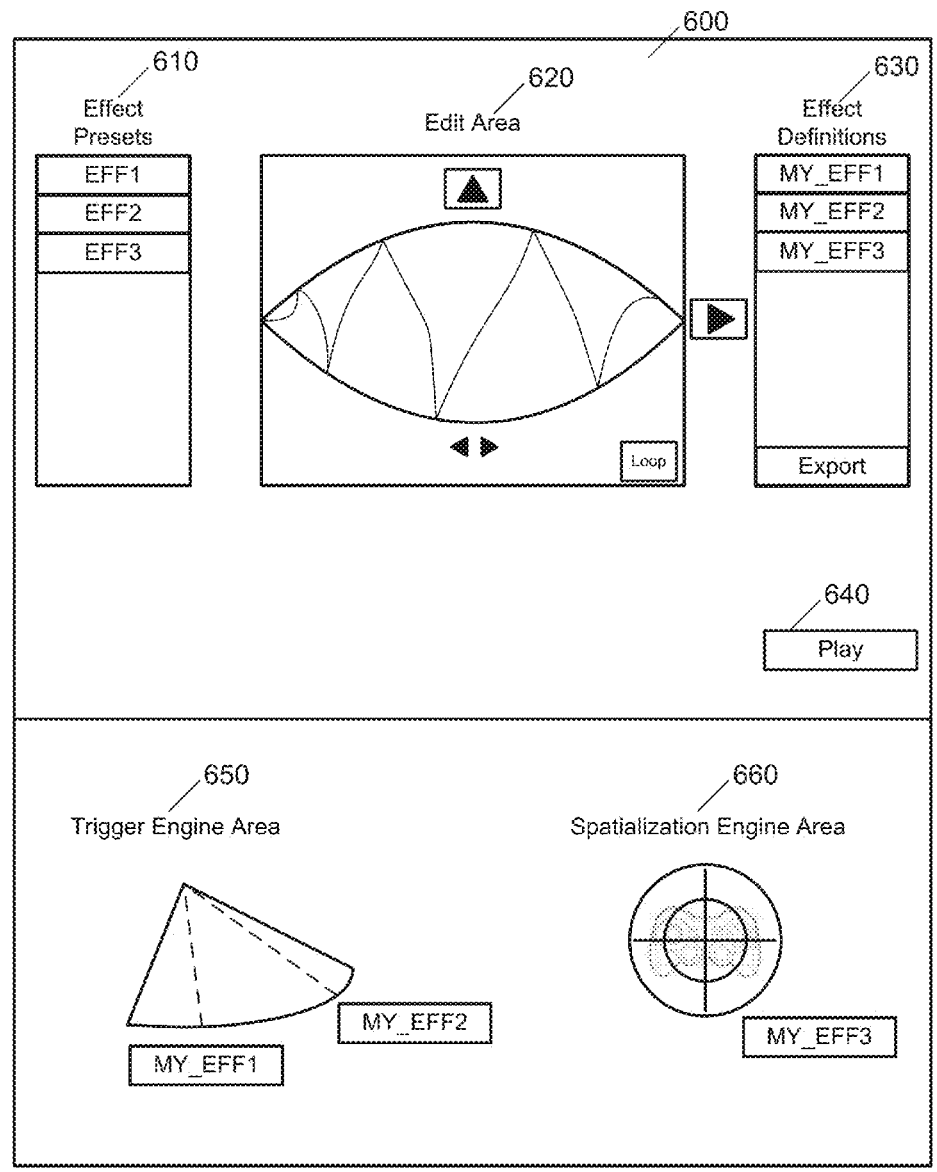
FIG. 6 illustrates an example user interface for designing a spatialization haptic effect, according to an embodiment of the invention.

FIG. 6 illustrates an example user interface 600 for designing a spatialization haptic effect, according to an embodiment of the invention. A system (such as system 10 of FIG. 1) can provide user interface 600 to a user as a dedicated tool for designing a spatialization haptic effect. In this embodiment, a user can design a spatialization haptic effect based on a pre-existing haptic effect definition, with the option of modifying the pre-existing haptic effect definition. According to the embodiment, user interface 600 includes effect presets 610. Effect presets 610 can display one of more haptic effect presets. A haptic effect preset is a pre-defined haptic effect definition of an arbitrary shape and/or form that produces a pre-defined haptic effect. A haptic effect preset can be stored within a haptic file or haptic stream. In one embodiment, a format of the haptic file or haptic stream can be an HES format. User interface 600 further includes edit area 620. According to the embodiment, a user can select a haptic effect preset displayed within effect presets 610, and edit area 620 can display a graphical representation of the haptic effect definition that is represented by the selected haptic effect preset. Further, a user can modify one or more parameters of the selected haptic effect definition by interacting with one or more display elements (such as buttons) within edit area 620. By modifying one or more parameters of a haptic effect definition, one can modify one or more corresponding attributes of a corresponding haptic effect. Example parameters of a haptic effect definition that can be modified include an amplitude parameter, a frequency parameter, a waveform parameter, an envelope parameter, a magnitude (or strength) parameter, and a duration parameter.

User interface 600 further includes effect definitions 630. According to the embodiment, the user can save a modified haptic effect definition as a new haptic effect definition, where the new haptic effect definition is displayed within effect definitions 630. The new haptic effect definition can be stored within a haptic file or haptic stream. In one embodiment, a format of the haptic file or haptic stream can be an HES format. The new haptic effect definition can further be exported to an external haptic file or external haptic stream. User interface 600 further includes a play button 640. Interacting with play button 640 can cause the system to output a haptic effect at a controller that can be operably controlled to user interface 600. The haptic effect can be a selected pre-defined haptic effect definition or a selected new haptic effect definition.

User interface 600 further includes trigger engine area 650. Trigger engine area 650 is an editable visual area that can visualize a trigger haptic effect that is generated by a trigger engine (such as trigger engine 506 of FIG. 5). As previously described, a trigger engine can receive a trigger haptic effect definition and can modify the trigger haptic effect definition based on a position and/or range of a trigger of a controller. Thus, trigger engine area 650 can display a visualization of the trigger, including an actual position of the trigger. Further, trigger engine area 650 can display a position and/or range of the trigger that is defined for a trigger haptic effect definition, where the position and/or range can cause the trigger engine to modify the trigger haptic effect definition. A user can edit the position and/or range of the trigger that is defined for the trigger haptic effect definition. User interface 600 further includes spatialization engine area 660. Spatialization engine area 660 is an editable visual area that can visualize a haptic effect that can be originally generated by the trigger engine and that can be further modified by a spatialization engine (such as spatialization engine 507 of FIG. 5). As previously described, the spatialization engine can modify the haptic effect definition so that a haptic effect is scaled for one or more targeted motors, targeted actuators, rumble motors, or rumble actuators, of a controller. Thus, spatialization engine area 660 can display a visualization of the controller. The spatialization engine area 660 can further display a visualization of the haptic effect experienced at each targeted motor, targeted actuator, rumble motor, or rumble actuator of the controller. A user can edit a scaling of the haptic effect that is experienced at each targeted motor, targeted actuator, rumble motor, or rumble actuator of the controller.

Figure 7:
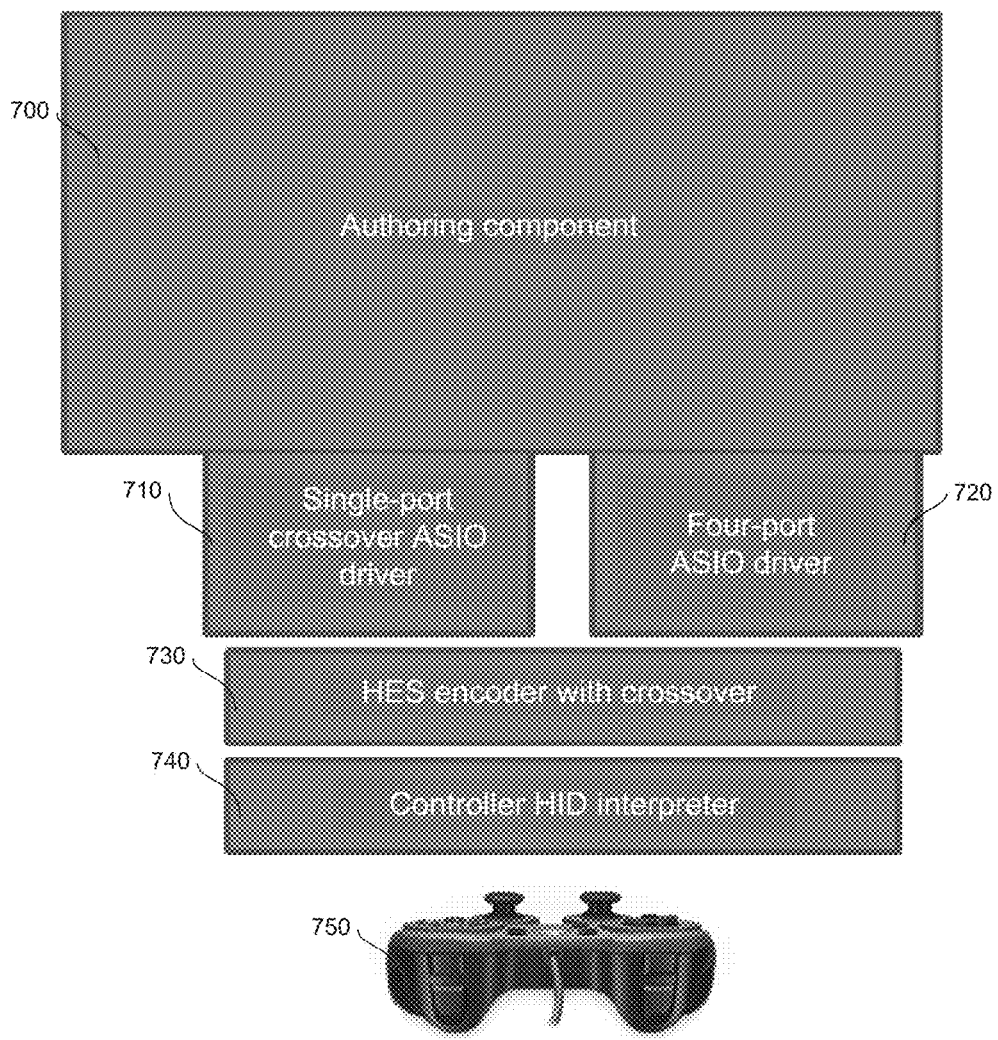
FIG. 7 illustrates a block diagram of components used to design a spatialization haptic effect, according to an embodiment of the invention.

FIG. 7 illustrates a block diagram of components used to design a spatialization haptic effect, according to an embodiment of the invention. In this embodiment, a system (such as system 10 of FIG. 1) can provide authoring component 700 as a dedicated tool for either: (1) authoring a haptic effect (i.e., by authoring a haptic effect definition); or (2) authoring a haptic effect as an audio effect (i.e., by authoring an audio effect definition). In one embodiment, authoring component 700 can be a "Pro Tools®" product by Avid Technology, Inc. The system can further use either single-port crossover audio stream input/output ("ASIO") driver 710 or four-port ASIO driver 720 to stream the haptic effect definition or audio effect definition. Single-port crossover driver 710 can stream the haptic effect definition or audio effect definition as a single channel of haptic data or audio data. In contrast, four-port ASIO driver 720 can stream the haptic effect definition or audio effect definition as four channels of haptic data or audio data. In an alternate embodiment, four-port ASIO driver 720 can be replaced by another driver that streams the haptic effect definition or audio effect definition as any plural number of channels of haptic data or audio data, such as six or eight channels of haptic data or audio data. In an embodiment where a user authors an audio effect definition, either single-port crossover ASIO driver 710 or four-port ASIO driver 720 can also convert the audio effect definition into a haptic effect definition. The system can further use HES encoder 730 to encode the audio effect definition or haptic effect definition into an external format, such as an HES format. If the system streams the audio effect definition or haptic effect definition as a single channel of haptic data or audio data using single-port crossover driver 710, HES encoder 730 can apply a crossover input warp algorithm to separate the haptic data or audio data into three different bands that can be mapped to three different outputs (such as: (1) a low-frequency rumble motor, or rumble actuator; (2) a medium-frequency rumble motor, or rumble actuator; or (3) a high-frequency targeted motor, or targeted actuator).

The crossover input warp algorithm can reside either in the device itself, or reside on the opposite side of a communications link, executing on a processor different from that of the device. The crossover input warp algorithm may also separate the input data (haptic or audio) into two bands, where lower frequencies are separated and then optionally further transformed before being applied to one or more actuator outputs, and higher frequencies are separated and then optionally transformed before being applied to a number of actuators distinct from those used for the lower-frequency separated data. This type of data separation could occur on an arbitrary number of frequency bands and actuator outputs. In alternate embodiments, the input data (audio or haptic) can be separated into multiple overlapping frequency regions, which are then each optionally transformed and applied to a number of output actuators. Another set of embodiments could create a number of signal strength bands, where the input data (audio or haptic) is separated according to output power or strength (such as through peak detection, RMS calculations, etc.), and these separated data streams are each applied to one or more distinct sets of actuators. In alternate embodiments, the input data (audio or haptic) can be separated according to output power or strength (such as through peak detection, RMS calculations, etc.) into distinct but overlapping data streams, instead of completely distinct streams, where the strength filtering algorithms capture overlapping regions of strength, optionally apply the transformations and apply each of the outputs to a number of output actuators.

The system can further send the encoded audio effect definition or the encoded haptic effect definition to a human interface device ("HID") interpreter 740 that resides on controller 750. HID interpreter 740 receives and interprets the encoded audio effect definition or the encoded haptic effect definition in order to provide a haptic effect at a trigger of controller 750. In one embodiment, a system can further modify the encoded audio effect definition or the encoded haptic effect definition using a trigger engine (such as trigger engine 506 of FIG. 5) and/or a spatialization engine (such as spatialization engine 507 of FIG. 5) before the system sends the encoded audio effect definition or the encoded haptic effect definition to HID interpreter 740 of controller 750.

Figure 8:
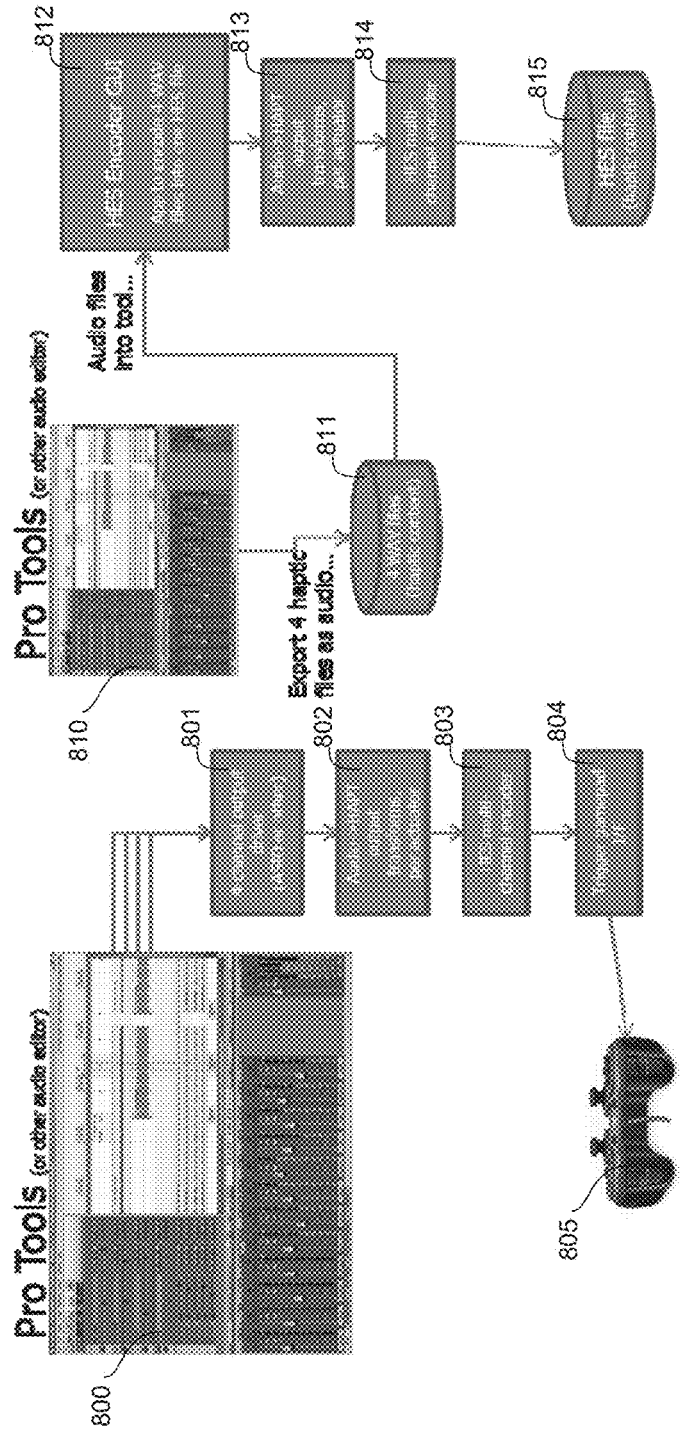
FIG. 8 illustrates a block diagram of components used to author a spatialization haptic effect for direct playback, and a block diagram of components used to save the spatialization haptic effect, according to an embodiment of the invention.

FIG. 8 illustrates a block diagram of components used to author a spatialization haptic effect for direct playback, and a block diagram of components used to save the spatialization haptic effect, according to an embodiment of the invention. In this embodiment, a system (such as system 10 of FIG. 1) can provide audio authoring component 800 as a dedicated tool for authoring a spatialization haptic effect as an audio effect (i.e., by authoring an audio effect definition). In one embodiment, audio authoring component 800 can be a "Pro Tools®" product by Avid Technology, Inc.

Once a user of the system has authored a spatialization haptic effect using audio authoring component 800, the user can preview the spatialization haptic effect. The preview functionality can allow for further customization of the spatialization haptic effect. Upon previewing the spatialization haptic effect, the system can send the authored audio effect definition to four-channel output driver 801, where four-channel output driver 801 can stream the audio effect definition as four channels of audio data. In one embodiment, four-channel output driver 801 can be a four-channel ASIO output driver. In an alternate embodiment, four-channel output driver 801 can be replaced by another driver that streams the audio effect definition as any plural number of channels of audio data, such as six or eight channels of audio data.

Further, the system can send the audio stream to audio-to-haptic converter 802, where audio-to-haptic converter 802 can convert the audio effect definition of the audio stream into a haptic effect definition using a haptic conversion algorithm. In one embodiment, each separate channel of the audio effect definition that corresponds to a motor, or actuator, can be converted into a channel of a haptic effect definition. Example haptic conversion algorithms are described in the following patents or patent applications (all of which are hereby incorporated by reference in their entirety): U.S. Pat. No. 7,979,146; U.S. Pat. No. 8,000,825; U.S. Pat. No. 8,378,964; U.S. Pat. App. Pub. No. 2011/0202155; U.S. Pat. App. Pub. No. 2011/0215913; U.S. Pat. App. Pub. No. 2012/0206246; U.S. Pat. App. Pub. No. 2012/0206247; U.S. Pat. App. Pub. No. 2013/0265286; U.S. Pat. App. Pub. No. 2013/0131851; U.S. Pat. App. Pub. No. 2013/0207917; U.S. Pat. App. Pub. No. 2013/0335209; U.S. Pat. App. Pub. No. 2014/0064516; U.S. patent application Ser. No. 13/661,140; U.S. patent application Ser. No. 13/785,166; U.S. patent application Ser. No. 13/788,487; U.S. patent application Ser. No. 14/078,438; U.S. patent application Ser. No. 14/078,442; U.S. patent application Ser. No. 14/078,445; U.S. patent application Ser. No. 14/051,933; U.S. patent application Ser. No. 14/020,461; U.S. patent application Ser. No. 14/020,502; U.S. patent application Ser. No. 14/277,870; and U.S. patent application Ser. No. 14/467,184.

The system can further send the converted haptic effect definition to HES multi-channel encoder 803, where multi-channel encoder 803 can encode the converted haptic effect definition into an external format, such as an HES format. The system can further send the encoded and converted haptic effect definition to trigger controller interface ("I/F") 804 that resides on controller 805. Trigger controller I/F 804 can receive and interpret the encoded and converted haptic effect definition in order to preview the authored spatialization haptic effect at a trigger of controller 805.

In this embodiment, the system can provide audio authoring component 810, where audio authoring component 810 is identical to audio authoring component 800. Once a user of the system has authored a spatialization haptic effect using audio authoring component 810, the user can save the spatialization haptic effect. Upon saving the spatialization haptic effect, the system can export the audio effect definition as separate audio files 811. In one embodiment where the audio effect definition includes four channels, audio files 811 can include four audio files. In an alternate embodiment, where the audio effect definition includes another number of channels, audio files 811 can include that number of separate audio files. In certain embodiments, audio files 811 can be a Waveform Audio File ("WAV") format. The system can further send audio files 811 to a HES encoder graphical user interface ("GUI") 812, where HES encoder GUI 812 can encode audio files 811 into a single audio file. In one embodiment, the audio file can be an HES format. Further, the system can send the audio file to audio-to-haptic converter 812, where audio-to-haptic converter 813 can convert the audio effect definition of the audio file into a haptic effect definition using a haptic conversion algorithm. In one embodiment, each separate channel of the audio effect definition that corresponds to a motor, or actuator, can be converted into a channel of a haptic effect definition. The system can further send the converted haptic effect definition to HES multi-channel encoder 814, where multi-channel encoder 814 can encode the converted haptic effect definition into an external format, such as an HES format. The system can further store the encoded and converted haptic effect definition within a haptic file 815. In one embodiment, haptic file 815 can be an HES file.

Figure 9:
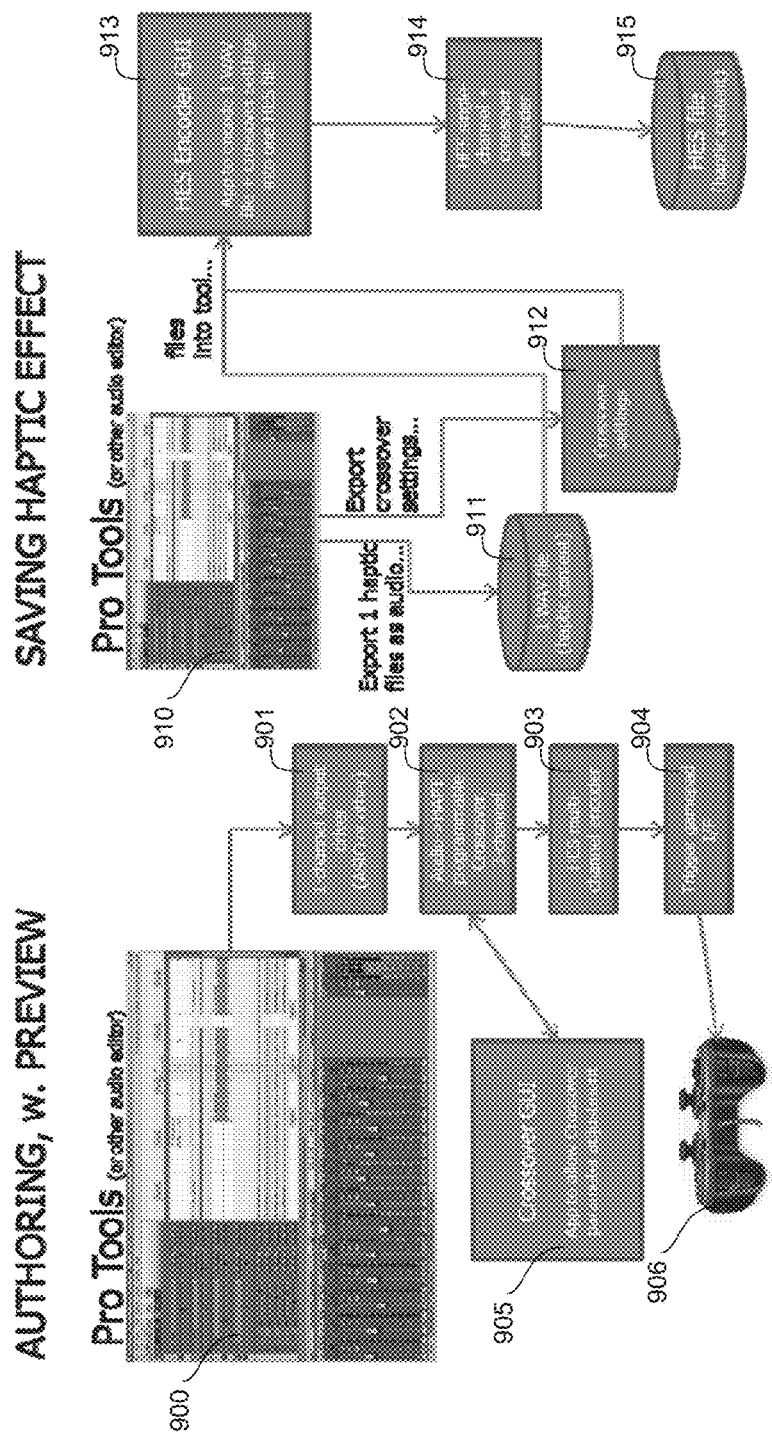
FIG. 9 illustrates a block diagram of components used to author a spatialization haptic effect for crossover playback, and a block diagram of components used to save the spatialization haptic effect, according to an embodiment of the invention.

FIG. 9 illustrates a block diagram of components used to author a spatialization haptic effect for crossover playback, and a block diagram of components used to save the spatialization haptic effect, according to an embodiment of the invention. In this embodiment, a system (such as system 10 of FIG. 1) can provide audio authoring component 900 as a dedicated tool for authoring a spatialization haptic effect as an audio effect (i.e., by authoring an audio effect definition). Once a user of the system has authored a spatialization haptic effect using audio authoring component 900, the user can preview the spatialization haptic effect. Upon previewing the spatialization haptic effect, the system can send the authored audio effect definition to single-channel output driver 901, where single-channel output driver 901 can stream the audio effect definition as a single channel of audio data. In one embodiment, single-channel output driver 901 can be a single-channel ASIO output driver. Further, the system can send the audio stream to audio-to-haptic converter 902, where audio-to-haptic converter 902 can convert the audio effect definition of the audio stream into a haptic effect definition using a haptic conversion algorithm. In one embodiment, each separate channel of the audio effect definition that corresponds to a motor, or actuator, can be converted into a channel of a haptic effect definition. Even further, the system can send the converted haptic effect definition to crossover GUI 905, where crossover GUI 905 can apply a crossover input warp algorithm to separate the converted haptic effect definition into three different channels that can be mapped to three different outputs (such as: (1) a low-frequency rumble motor, or rumble actuator; (2) a medium-frequency rumble motor, or rumble actuator; or (3) a high-frequency targeted motor, or targeted actuator).

The system can further send the converted haptic effect definition to HES multi-channel encoder 903, where multi-channel encoder 903 can encode the converted haptic effect definition into an external format, such as an HES format. The system can further send the encoded and converted haptic effect definition to trigger controller I/F 904 that resides on controller 906. Trigger controller I/F 904 can receive and interpret the encoded and converted haptic effect definition in order to preview the authored trigger haptic effect at a trigger of controller 906.

In this embodiment, the system can provide audio authoring component 910, where audio authoring component 910 is identical to audio authoring component 900. Once a user of the system has authored a spatialization haptic effect using audio authoring component 910, the user can save the spatialization haptic effect. Upon saving the spatialization haptic effect, the system can export the audio effect definition as a single audio file 911. In certain embodiments, audio file 911 can be a WAV format. The system can further export crossover settings 912. The system can further send audio file 911 to a HES encoder GUI 913, where HES encoder GUI 913 can encode audio file 911 and crossover settings 912 into a single audio file. In one embodiment, the audio file can be an HES format. The system can further send the audio file to HES single-channel and crossover encoder 914, where single-channel and crossover encoder can encode the audio file into an external format, such as an HES format. The system can further store the encoded audio file within a haptic file 915. In one embodiment, haptic file 915 can be an HES file.

Figure 10:
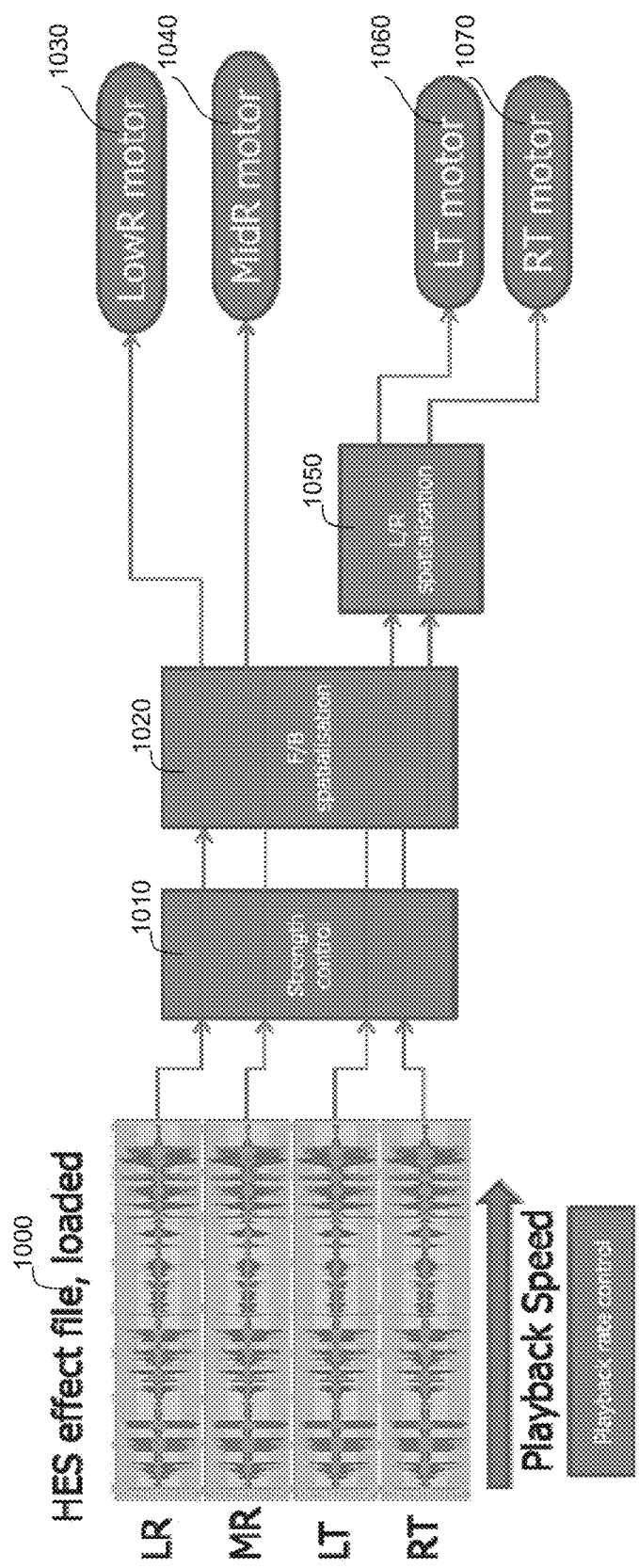
FIG. 10 illustrates a block diagram of components used to directly play a spatialization haptic effect, according to an embodiment of the invention.

FIG. 10 illustrates a block diagram of components used to directly play a spatialization haptic effect, according to an embodiment of the invention. According to an embodiment, a system (such as system 10 of FIG. 1) can load a haptic file 1000 that includes a haptic effect definition. In one embodiment, haptic file 1000 can be an HES file. According to the embodiment, the haptic effect definition included within haptic file 1000 includes four channels, where each channel includes a portion of the haptic data included within the haptic effect definition. In an alternate embodiment, the haptic effect definition included within haptic file 1000 can include any plural number of channels. Each channel of the haptic effect definition can be associated with a targeted motor, targeted actuator, rumble motor, or rumble actuator. In the illustrated embodiment, the first channel (i.e., "channel LR") is associated with a low rumble motor, the second channel (i.e., "channel MR") is associated with a medium rumble motor, the third channel (i.e., "channel LT") is associated with a motor that is operably coupled to a left trigger, and the fourth channel (i.e., "channel RT") is associated with a targeted motor that is operably coupled to a right trigger. In one embodiment, the haptic effect definition included within haptic file 1000 can define a playback speed and a playback rate control.

According to the embodiment, the system can send the four channels of the haptic effect definition included within haptic file 1000 to strength control 1010, where strength control 1010 can modify a strength, or magnitude, of the haptic data included within each channel of the haptic effect definition. The system can then send the four channels of the haptic effect definition to front/back ("F/B") spatialization 1020, where F/B spatialization 1020 can modify the haptic data included within each channel of the haptic effect definition based on spatialization data. The spatialization data can include a direction and/or flow of a haptic effect. In one embodiment, the direction and/or flow of the haptic effect can be a frontwards or backwards direction. Further, spatialization data can include one or more hand positions. According to the embodiment, F/B spatialization 1020 can modify the haptic data included within each channel so that a haptic effect is scaled for each motor, or actuator. The system can then send channel LR to low rumble motor 1030 (identified in FIG. 10 as "LowR motor"), and can further send channel MR to medium rumble motor 1040 (identified in FIG. 10 as "MidR motor"). The haptic data contained within channel LR can cause low rumble motor 1030 to produce a general or rumble haptic effect, and the haptic data contained within channel MR can cause medium rumble motor 1040 to produce a general or rumble haptic effect.

The system can further send channels LT and RT to left/right ("L/R") spatialization 1050, where L/R spatialization 1050 can modify the haptic data included within channels LT and RT based on spatialization data. The spatialization data can include a direction and/or flow of a haptic effect. In one embodiment, the direction and/or flow of the haptic effect can be a left or right direction. Further, spatialization data can include one or more hand positions. According to the embodiment, L/R spatialization 1050 can modify the haptic data included within each channel so that a haptic effect is scaled for each motor, or actuator. The system can then send channel LT to left trigger targeted motor 1060 (identified in FIG. 10 as "LT motor"), and can further send channel RT to right trigger targeted motor 1070 (identified in FIG. 10 as "RT motor"). The haptic data contained within channel LT can cause left trigger targeted motor 1060 to produce a trigger haptic effect at a left trigger, and the haptic data contained within channel RT can cause right trigger targeted motor 1070 to produce a trigger haptic effect at a right trigger.

Figure 11:
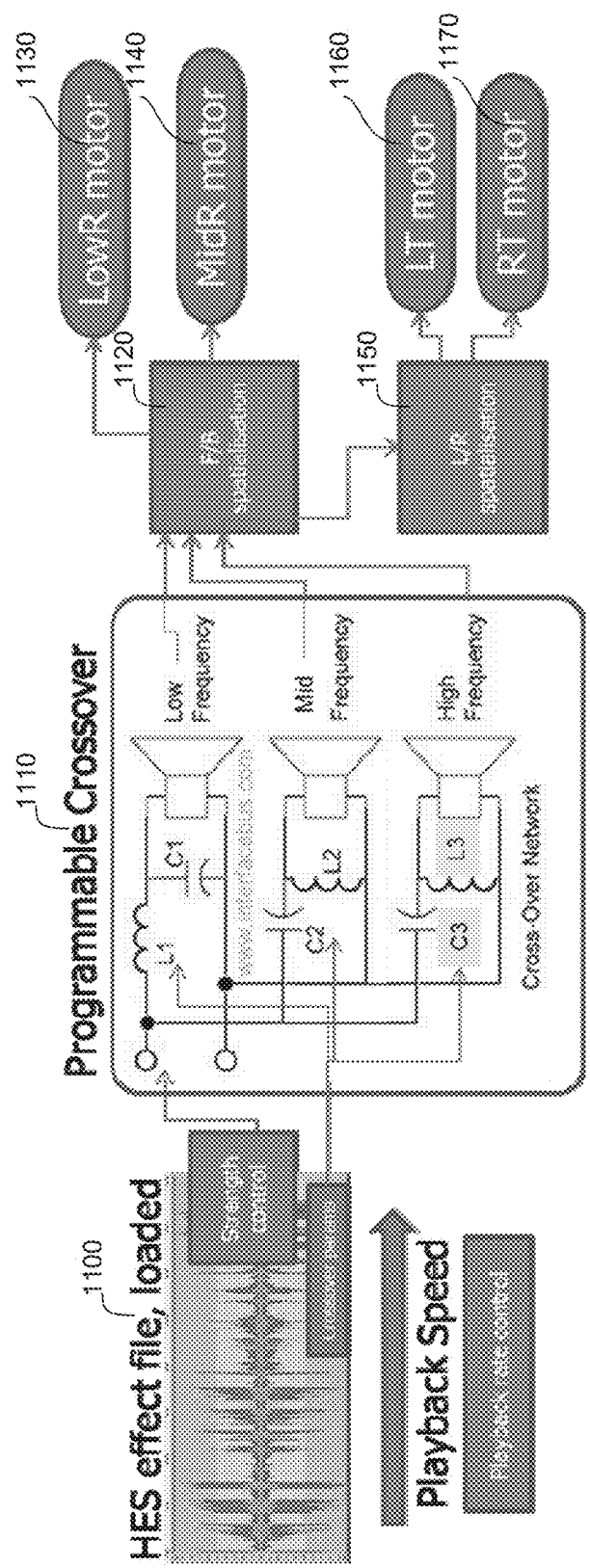
FIG. 11 illustrates a block diagram of components used to play a spatialization haptic effect using a programmable crossover, according to an embodiment of the invention.

FIG. 11 illustrates a block diagram of components used to play a spatialization haptic effect using a programmable crossover, according to an embodiment of the invention. According to an embodiment, a system (such as system 10 of FIG. 1) can load a haptic file 1100 that includes a haptic effect definition. In one embodiment, haptic file 1100 can be an HES file. According to the embodiment, the haptic effect definition included within haptic file 1100 includes a single channel, where the channel includes the haptic data included within the haptic effect definition. Also according to the embodiment, the haptic effect definition included within haptic file 1100 includes one or more crossover parameters, where the one or more crossover parameters can be parameters for a crossover input warp algorithm. In one embodiment, the haptic effect definition included within haptic file 1100 can define a playback speed and a playback rate control.

According to the embodiment, the system can send the channel of the haptic effect definition included within haptic file 1100, and the one or more crossover parameters also included within haptic file 1100, to programmable crossover 1110. Programmable crossover 1110 can apply a crossover input warp algorithm using the one or more crossover parameters to separate the channel into three different channels: a low-frequency channel; a medium-frequency channel; and a high-frequency channel. The low-frequency channel includes a portion of the haptic data included within the haptic effect definition that includes one or more low frequencies. The medium-frequency channel includes a portion of the haptic data included within the haptic effect definition that includes one or more medium frequencies. The high-frequency channel includes a portion of the haptic data included within the haptic effect definition that includes one or more high frequencies.

The system can then send the three channels of the haptic effect definition to F/B spatialization 1120, where F/B spatialization 1120 can modify the haptic data included within each channel of the haptic effect definition based on spatialization data. The spatialization data can include a direction and/or flow of a haptic effect. In one embodiment, the direction and/or flow of the haptic effect can be a frontwards or backwards direction. Further, spatialization data can include one or more hand positions. According to the embodiment, F/B spatialization 1120 can modify the haptic data included within each channel so that a haptic effect is scaled for each motor, or actuator. The system can then send the low frequency channel to low rumble motor 1130 (identified in FIG. 11 as "LowR motor"), and can further send the middle frequency channel to medium rumble motor 1140 (identified in FIG. 11 as "MidR motor"). The haptic data contained within the low-frequency channel can cause low rumble motor 1130 to produce a general or rumble haptic effect, and the haptic data contained within the medium-frequency channel can cause medium rumble motor 1140 to produce a general or rumble haptic effect.

The system can further send the high-frequency channel to L/R spatialization 1150, where L/R spatialization 1150 can modify the haptic data included within the high frequency channel based on spatialization data. In one embodiment, the direction and/or flow of the haptic effect can be a left or right direction. Further, spatialization data can include one or more hand positions. According to the embodiment, L/R spatialization 1150 can modify the haptic data included within the channel so that a haptic effect is scaled for each motor, or actuator. The system can then send the high-frequency channel to left trigger targeted motor 1160 (identified in FIG. 11 as "LT motor"), and can also send the high-frequency channel to right trigger targeted motor 1170 (identified in FIG. 11 as "RT motor"). The haptic data contained within the high-frequency channel can cause left trigger targeted motor 1160 to produce a trigger haptic effect at a left trigger, and the haptic data contained within the high-frequency channel can cause right trigger targeted motor 1170 to produce a trigger haptic effect at a right trigger.

Figure 12:
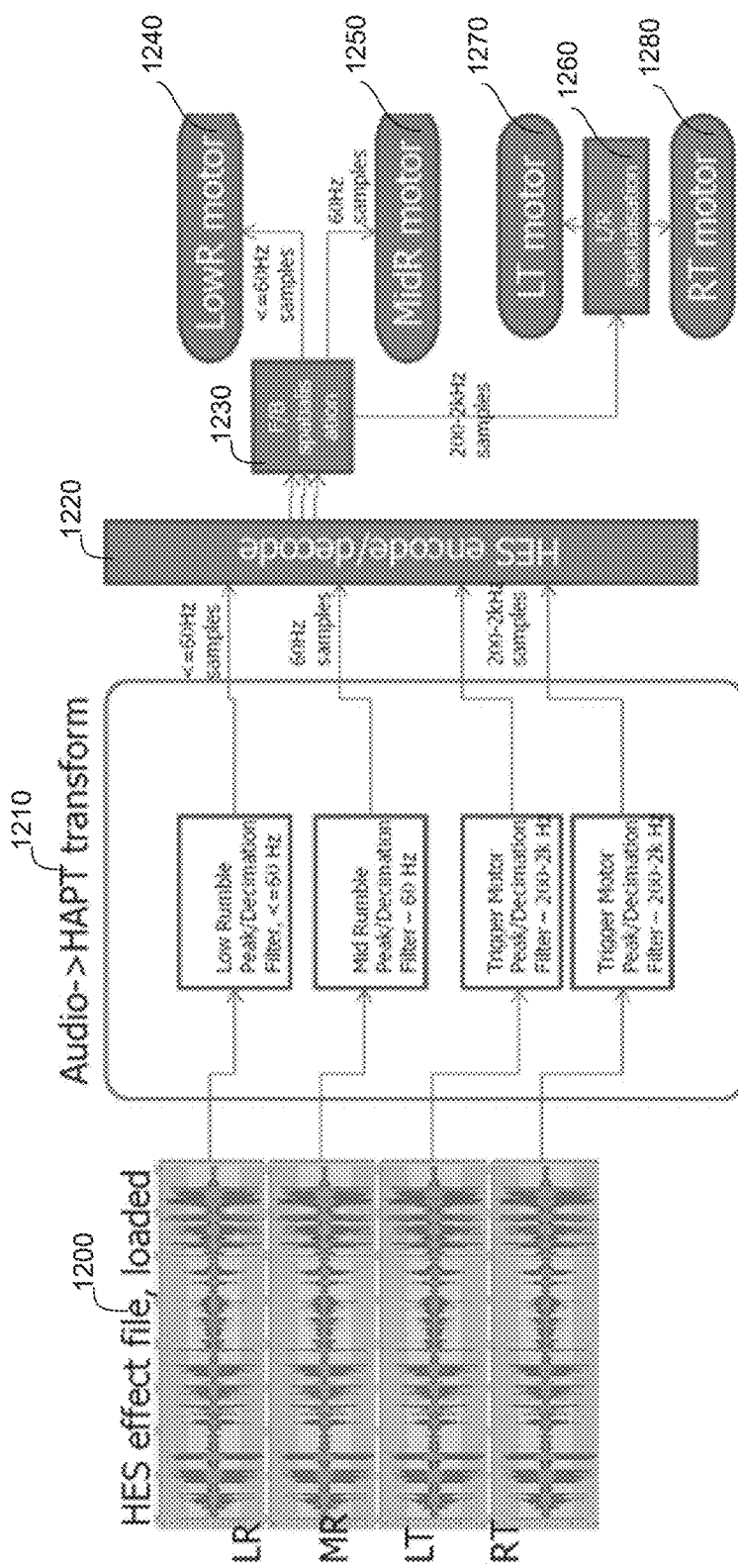
FIG. 12 illustrates an example four-channel direct playback of a spatialization haptic effect, according to an embodiment of the invention.

FIG. 12 illustrates an example four-channel direct playback of a spatialization haptic effect, according to an embodiment of the invention. According to an embodiment, a system (such as system 10 of FIG. 1) can load an audio file 1200 that includes an audio effect definition. In one embodiment, audio file 1200 can be an HES file. According to the embodiment, the audio effect definition included within audio file 1200 includes four channels, where each channel includes a portion of the audio data included within the audio effect definition. In an alternate embodiment, the audio effect definition included within audio file 1200 can include any plural number of channels. Each channel of the haptic effect definition can be associated with a targeted motor, targeted actuator, rumble motor, or rumble actuator. In the illustrated embodiment, the first channel (i.e., "channel LR") is associated with a low rumble motor, the second channel (i.e., "channel MR") is associated with a medium rumble motor, the third channel (i.e., "channel LT") is associated with a targeted motor that is operably coupled to a left trigger, and the fourth channel (i.e., "channel RT") is associated with a targeted motor that is operably coupled to a right trigger.

According to the embodiment, the system can send the four channels of the audio effect definition included within audio file 1200 to audio-to-haptic converter 1210, where audio-to-haptic converter 1210 can convert the audio effect definition into a haptic effect definition using a haptic conversion algorithm. In one embodiment, each separate channel of the audio effect definition can be converted into a channel of a haptic effect definition. In the illustrated embodiment: channel LR can be converted using a peak/decimation filter with a range of less than 60 hertz ("Hz"); channel MR can be converted using a peak/decimation filter with a value of 60 Hz; and channels LT and RT can each be converted using a peak/decimation filter with a range of 200 Hz-2 kHz.

The system can further send the four channels of the converted haptic effect definition to encoder/decoder 1220, where encoder/decoder 1220 can encode each channel of the converted haptic effect definition into an external format, such as an HES format. The system can then send the four encoded channels of the converted haptic effect definition to F/B spatialization 1230, where F/B spatialization 1230 can modify the converted haptic data included within each encoded channel of the converted haptic effect definition based on spatialization data. The spatialization data can include a direction and/or flow of a haptic effect. In one embodiment, the direction and/or flow of the haptic effect can be a frontwards or backwards direction. Further, spatialization data can include one or more hand positions. According to the embodiment, F/B spatialization 1230 can modify the converted haptic data included within each encoded channel so that a haptic effect is scaled for each motor, or actuator. The system can then send encoded channel LR to low rumble motor 1240 (identified in FIG. 12 as "LowR motor"), and can further send encoded channel MR to medium rumble motor 1250 (identified in FIG. 12 as "MidR motor"). The converted haptic data contained within channel LR can cause low rumble motor 1240 to produce a general or rumble haptic effect, and the converted haptic data contained within channel MR can cause medium rumble motor 1250 to produce a general or rumble haptic effect.

The system can further send encoded channels LT and RT to L/R spatialization 1260, where L/R spatialization 1260 can modify the converted haptic data included within encoded channels LT and RT based on spatialization data. The spatialization data can include a direction and/or flow of a haptic effect. In one embodiment, the direction and/or flow of the haptic effect can be a left or right direction. Further, spatialization data can include one or more hand positions. According to the embodiment, L/R spatialization 1260 can modify the haptic data included within each channel so that a haptic effect is scaled for each motor, or actuator. The system can then send channel LT to left trigger targeted motor 1270 (identified in FIG. 12 as "LT motor"), and can further send channel RT to right trigger targeted motor 1280 (identified in FIG. 12 as "RT motor"). The haptic data contained within channel LT can cause left trigger targeted motor 1270 to produce a trigger haptic effect at a left trigger, and the haptic data contained within channel RT can cause right trigger targeted motor 1280 to produce a trigger haptic effect at a right trigger.

Figure 13:
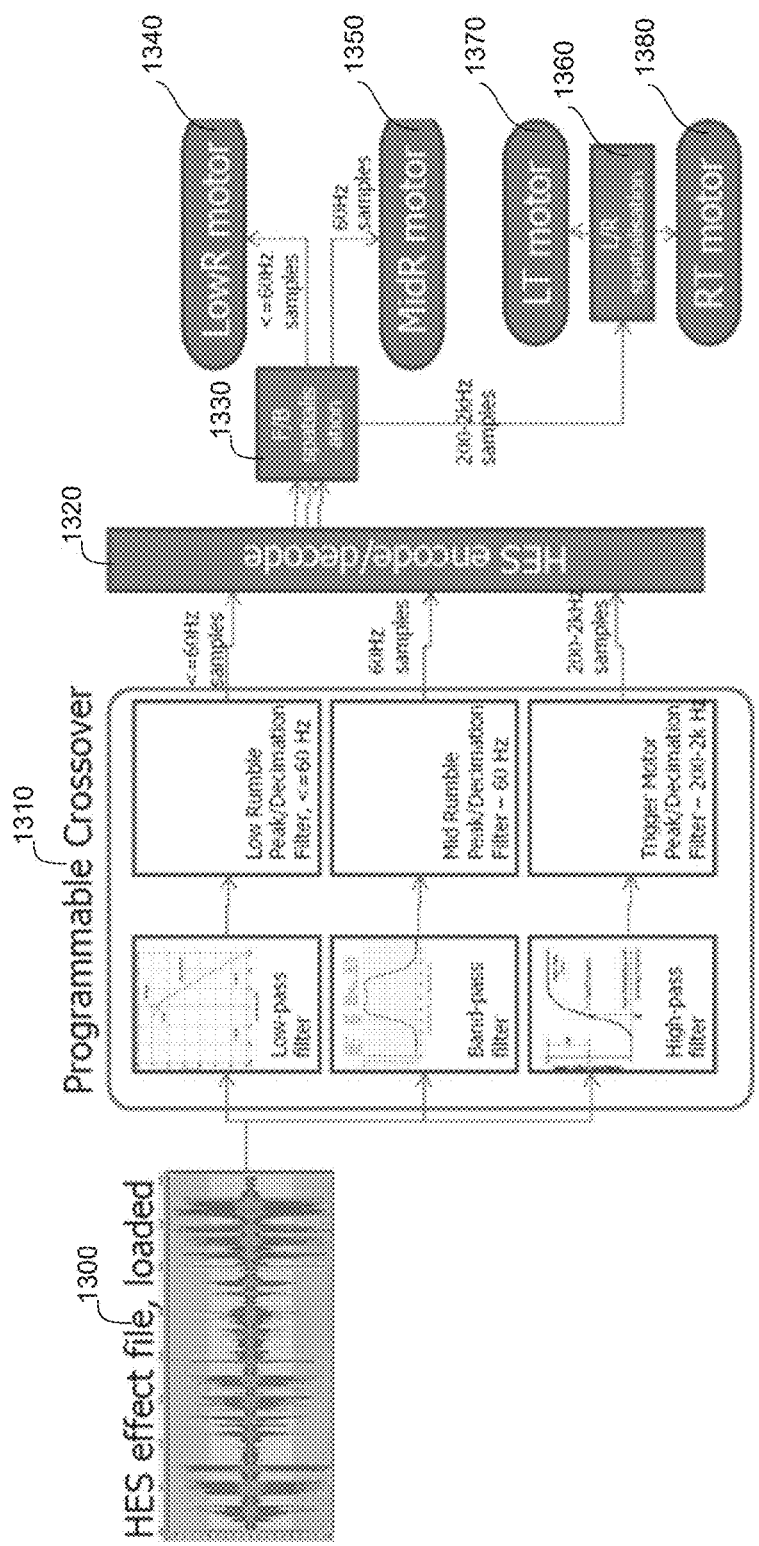
FIG. 13 illustrates an example crossover playback of a spatialization haptic effect, according to an embodiment of the invention.

FIG. 13 illustrates an example crossover playback of a spatialization haptic effect, according to an embodiment of the invention. According to an embodiment, a system (such as system 10 of FIG. 1) can load an audio file 1300 that includes an audio effect definition. In one embodiment, audio file 1300 can be an HES file. According to the embodiment, the audio effect definition included within audio file 1300 includes a single channel, where the channel includes the audio data included within the audio effect definition. In an embodiment, the audio effect definition included within audio file 1300 can include one or more crossover parameters, where the one or more crossover parameters can be parameters for a crossover input warp algorithm.

According to the embodiment, the system can send the channel of the audio effect definition included within audio file 1300, and, in one embodiment, the one or more crossover parameters also included within audio file 1300, to programmable crossover 1310. Programmable crossover 1310 can apply a crossover input warp algorithm (in one embodiment, using the one or more crossover parameters) to separate the channel into three different channels: a low-frequency channel; a medium-frequency channel; and a high-frequency channel. Programmable crossover 1310 can further convert the audio effect definition into a haptic effect definition using a haptic conversion algorithm. In one embodiment, each separate channel of the audio effect definition can be converted into a channel of a haptic effect definition. In the illustrated embodiment: the low-frequency channel can be converted using a peak/decimation filter with a range of less than 60 hertz ("Hz"); the medium-frequency channel can be converted using a peak/decimation filter with a value of 60 Hz; and the high-frequency channel can each be converted using a peak/decimation filter with a range of 200 Hz-2 kHz.

The system can further send the three channels of the converted haptic effect definition to encoder/decoder 1320, where encoder/decoder 1320 can encode each channel of the converted haptic effect definition into an external format, such as an HES format. The system can then send the three channels of the haptic effect definition to F/B spatialization 1330, where F/B spatialization 1330 can modify the haptic data included within each channel of the haptic effect definition based on spatialization data. The spatialization data can include a direction and/or flow of a haptic effect. In one embodiment, the direction and/or flow of the haptic effect can be a frontwards or backwards direction. Further, spatialization data can include one or more hand positions. According to the embodiment, F/B spatialization 1330 can modify the haptic data included within each channel so that a haptic effect is scaled for each motor, or actuator. The system can then send the low-frequency channel to low rumble motor 1340 (identified in FIG. 13 as "LowR motor"), and can further send the middle-frequency channel to medium rumble motor 1350 (identified in FIG. 13 as "MidR motor"). The haptic data contained within the low-frequency channel can cause low rumble motor 1340 to produce a general or rumble haptic effect, and the haptic data contained within the medium-frequency channel can cause medium rumble motor 1350 to produce a general or rumble haptic effect.

The system can further send the high-frequency channel to L/R spatialization 1360, where L/R spatialization 1360 can modify the haptic data included within the high-frequency channel based on spatialization data. In one embodiment, the direction and/or flow of the haptic effect can be a left or right direction. Further, spatialization data can include one or more hand positions. According to the embodiment, L/R spatialization 1360 can modify the haptic data included within the channel so that a haptic effect is scaled for each motor, or actuator. The system can then send the high frequency channel to left trigger targeted motor 1370 (identified in FIG. 13 as "LT motor"), and can also send the high frequency channel to right trigger targeted motor 1380 (identified in FIG. 13 as "RT motor"). The haptic data contained within the high frequency channel can cause left trigger targeted motor 1370 to produce a trigger haptic effect at a left trigger, and the haptic data contained within the high frequency channel can cause right trigger targeted motor 1380 to produce a trigger haptic effect at a right trigger.

Figure 14:
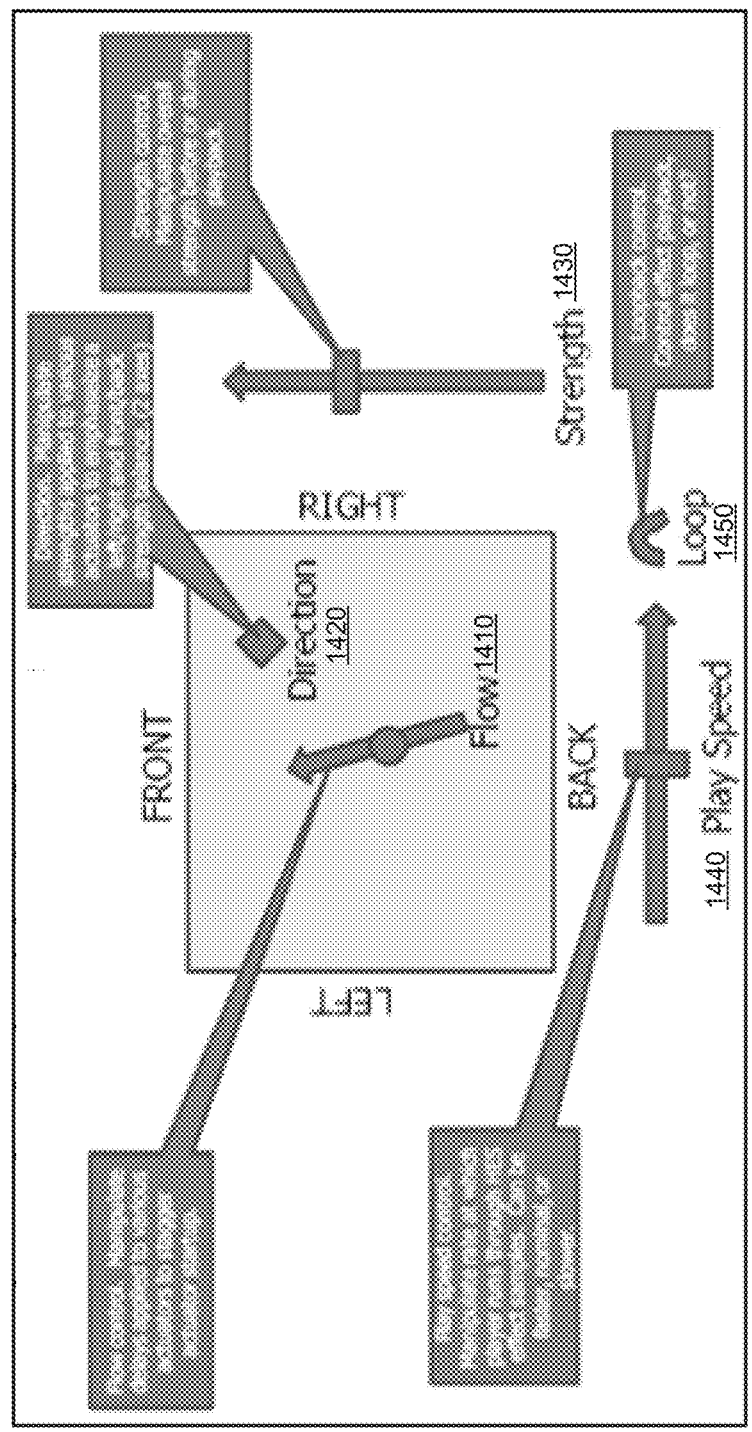
FIG. 14 illustrates an example user interface of a spatialization engine, according to an embodiment of the invention.

FIG. 14 illustrates an example user interface 1400 of a spatialization engine, according to an embodiment of the invention. User interface 1400 is an editable visual area that can visualize a haptic effect that is originally generated and further modified by a spatialization engine (such as spatialization engine 507 of FIG. 5). In one embodiment, the haptic effect can be a trigger haptic effect that is originally generated by a trigger engine (such as trigger engine 506 of FIG. 5). User interface 1400 can further allow a user to programmatically manage one or more modifications of the haptic effect by the spatialization engine. Such modifications can further be recorded for dynamic playback in the future. As previously described, a spatialization engine can modify a haptic effect definition that is originally generated so that a haptic effect is scaled for one or more targeted motors, targeted actuators, rumble motors, or rumble actuators, of a controller. More specifically, a spatialization engine can modify a haptic effect definition as applied to each targeted motor, targeted actuator, rumble motor, or rumble actuator to convey a sense of direction of the haptic effect as experienced by a user of the controller. Each modification to the haptic effect definition can be based on an intended direction and/or flow of a haptic effect as defined by the specialization engine. Further, each modification can also be based on an input received by the controller, where the input indicates a position of a user's hand on the controller. Thus, the spatialization engine can receive a haptic effect definition that is originally generated, and can modify the haptic effect definition based on the "spatialization" aspect of the haptic effect (e.g., a position and/or flow of the haptic effect).

User interface 1400 includes flow 1410. Flow 1410 allows a user to programmatically manage a flow of a haptic effect. A flow is a temporal start-of-playback offset modification to delay playback on individual targeted motors, targeted actuators, rumble motors, or rumble actuators of a controller. Alternatively, a flow can be a duration modification to modify a duration of a haptic effect experienced at targeted motors, targeted actuators, rumble motors, or rumble actuators of a controller. For example, a flow can be defined so that haptic playback first begins on a left targeted motor or targeted actuator, then subsequently begins on a middle rumble motor or rumble actuator, and then further begins on a right targeted motor or targeted actuator. In this example, a flow of the overall haptic effect is left-to-right, as a user of a controller first experiences the haptic playback of the overall haptic effect at the left of the controller, then at the middle of the controller, and then at the right of the controller. A flow can be from left to right or vice-versa, front to back or vice-versa, or a combination of the two. Thus, a flow can define a haptic playback vector. Flow 1410 can be visualized within user interface 1400 as an arrow that can be placed horizontally, vertically, or diagonally within user interface 1400. Thus, by interacting with flow 1410, a user can modify one or more delays applied to various motors or actuators of the controller to stagger haptic playback.

User interface 1400 further includes direction 1420. Direction 1420 allows a user to programmatically modify a direction of a haptic effect. A direction is a magnitude (or strength) modification to emphasize a front-back and/or left-right bias (or balance) among various motors or actuators of a controller. Alternatively, a direction can be a frequency modification. For example, a direction can be defined so that haptic playback of the haptic effect is the strongest at the right of the controller. Direction 1420 can be visualized within user interface 1400 as a point within a two-dimensional grid or space defined by two axes. Thus, by interacting with direction 1420, a user can modify magnitudes (or strengths) applied to various motors or actuators to emphasize a left-right and/or front-back bias (or balance).

User interface 1400 further includes strength 1430. Strength 1430 allows a user to programmatically modify a magnitude (or strength) of an overall haptic effect either before or during playback. Strength 1430 can be visualized within user interface 1400 as a slider. Thus, by interacting with strength 1430, a user can modify an overall magnitude (or strength) of a haptic effect. User interface 1400 further includes play speed 1440. Play speed 1440 allows a user to programmatically modify a play speed, or rate, at which a system (such as system 10 of FIG. 1) processes a haptic effect definition of a haptic effect in order to playback the haptic effect. Play speed 1440 can be visualized within user interface 1400 as a slider. Thus, by interacting with play speed 1440, a user can modify a play speed, or rate, of a haptic effect. User interface 1400 further includes loop 1450. Loop 1450 allows a user to programmatically modify whether a playback of a haptic effect loops or not. Loop 1450 can be visualized within user interface 1400 as a button. Thus, by interacting with loop 1450, a user can control a looping of a haptic effect. Further details of a spatialization engine are further described below in greater detail in conjunction with FIGS. 29 and 30.

Figure 15:
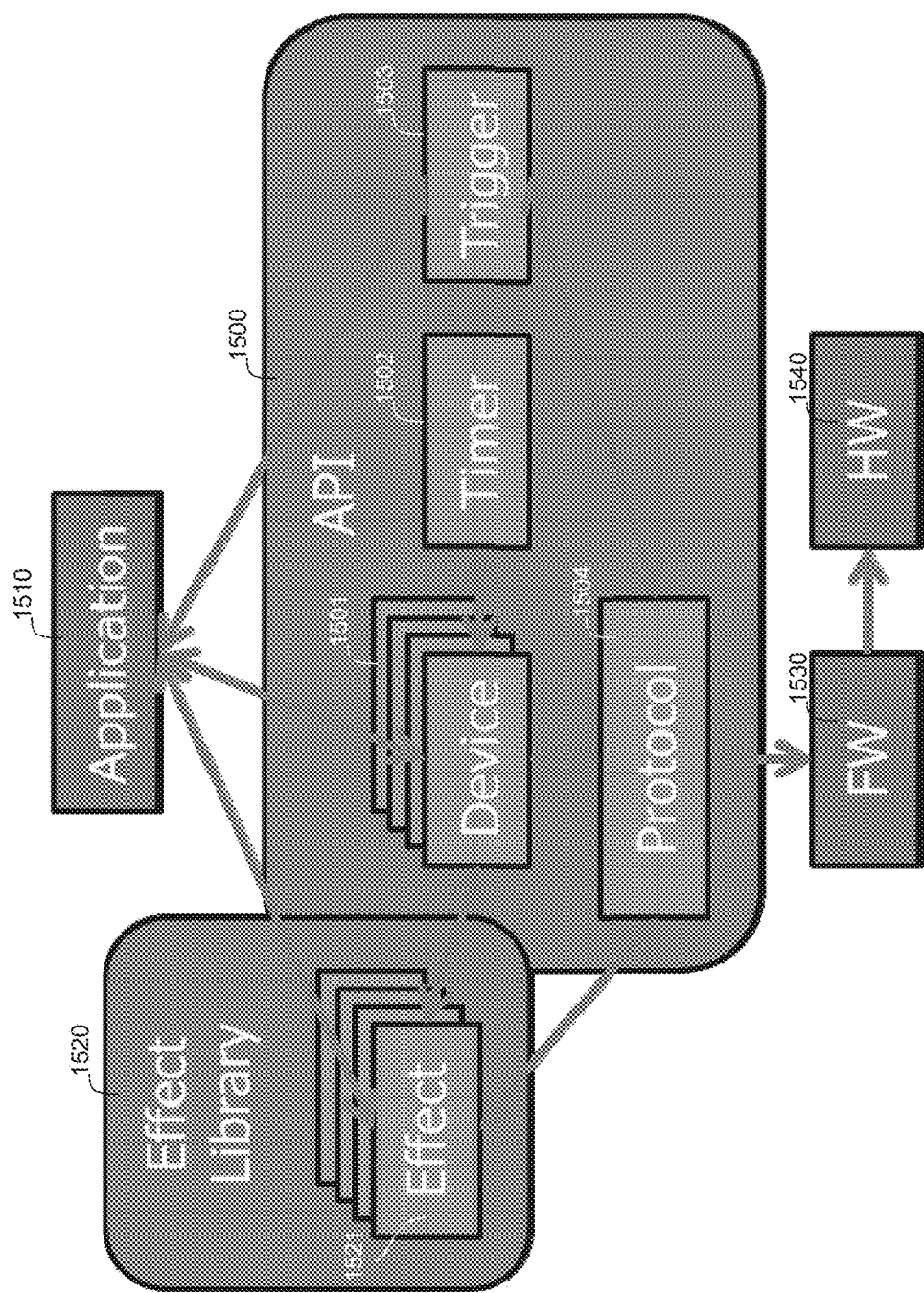
FIG. 15 illustrates an architecture diagram of a haptic effect application programming interface, according to an embodiment of the invention.

FIG. 15 illustrates an architecture diagram of a haptic effect API 1500, according to an embodiment of the invention. Haptic effect API 1500 includes a set of computer-readable functions or routines that allow a developer to play haptic effects, such as trigger haptic effects, at a user input element of a controller, such as a trigger. The haptic effect API can include an extensive haptic effect library containing pre-defined haptic effect definition for many different game genres, such as driving/racing, weapons/warfare, and sports (e.g., soccer, football, baseball, golf, or hockey). In one embodiment, the haptic effect API can include a set of C++ classes, and is not required to use advanced features, such as exceptions and run-time type information, which may be turned off in client applications. In alternate embodiments, the haptic effect API can use other language bindings, such as C, Java, or C#. Further, the haptic effect API can provide plug-ins for certain game engines, such as Unity 3D™ and Marmalade™.

According to the embodiment, haptic effect API 1500 can be accessed by application 1510, which is a software application, such as a game application, that can be executed on a system (such as system 10 of FIG. 1). Further, haptic effect API 1500 can access an effect library 1520, where effect library 1520 can include one or more haptic effect definitions, such as haptic effect definition 1521 (identified in FIG. 15 as "effect 1521"). As previously described, an example of a haptic effect definition is a trigger haptic effect definition. Further, haptic effect API 1500 includes one or more device definitions, such as device definition 1501 (identified in FIG. 15 as "device 1501"). A device definition includes device data that defines a hardware device, such as a controller, gamepad, or other peripheral device, where a haptic effect is to be played. Haptic effect API 1500 further includes one or more timer definitions, such as timer definition 1502 (identified in FIG. 15 as "timer 1502"). A timer definition includes timer data that defines a time period where all haptic effect definitions registered to a specific hardware device are updated. Haptic effect API 1500 further includes trigger definition 1503 (identified in FIG. 15 as "trigger 1503"). A trigger definition includes trigger data that defines a trigger of a specific hardware device. Haptic effect API 1500 further includes protocol definition 1504 (identified in FIG. 15 as "protocol 1504"). A protocol definition describes a protocol of a communication interface used by haptic effect API 1500 to communicate with a specific hardware device. Using protocol definition 1504, haptic effect API 1500 can communicate with device firmware 1530 (identified in FIG. 15 as "FW 1530"), where device firmware 1530 is firmware for the specific hardware device. Using device firmware 1530, haptic effect API 1500 can further communicate with hardware device 1540 (identified in FIG. 15 as "HW 1540"), where hardware device 1540 is the specific hardware device.

In one embodiment, application 1510 can access device definition 1501 to acquire a target hardware device (i.e., HW 1540) where a haptic effect is to be played. By accessing device definition 1501, application 1510 can further access timer definition 1502, trigger definition 1503, and protocol definition 1504. Application 1510 can further access haptic effect definition 1521 from effect library 1520 to instantiate a haptic effect. Application 1510 can further cause the haptic effect be played at the target hardware device (i.e., HW 1540) by sending an instruction to the target hardware device (i.e., HW 1540) via haptic effect API 1500 and FW 1530.

Figure 16:
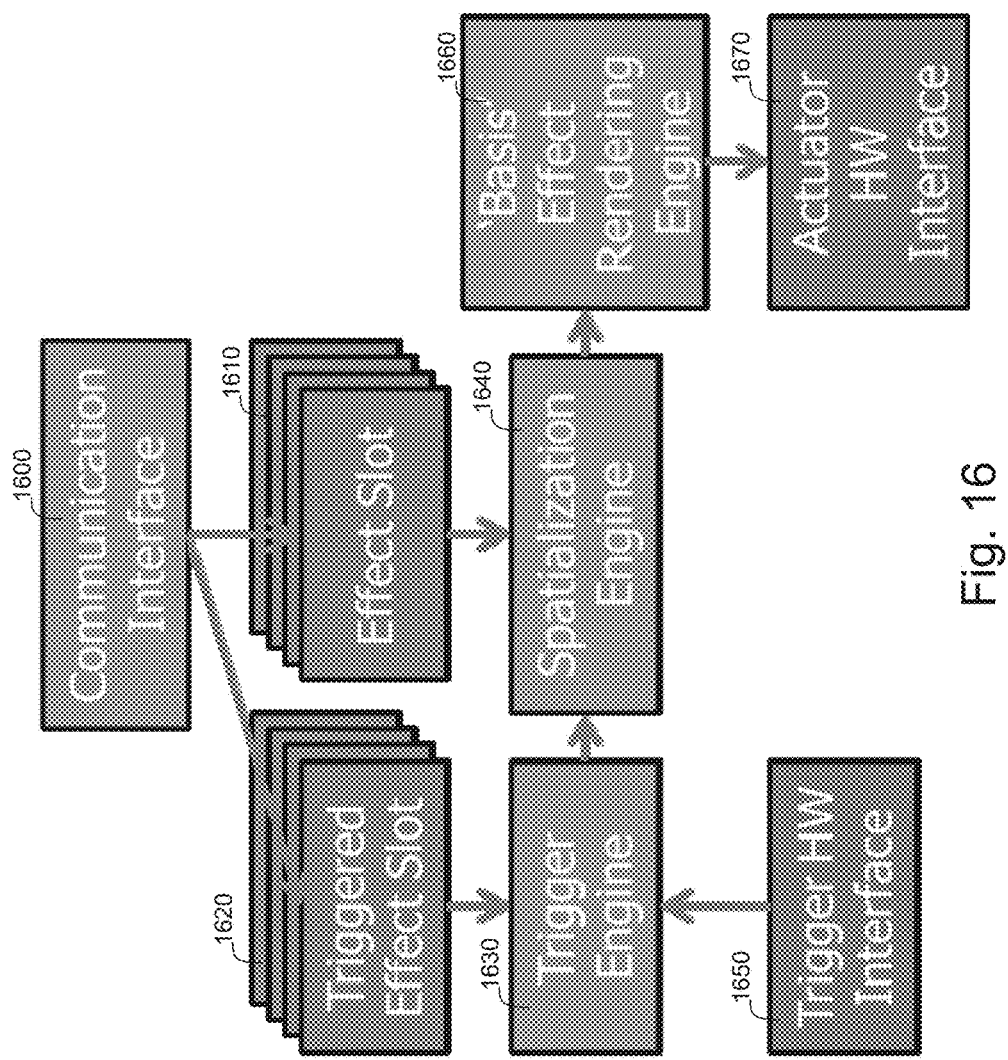
FIG. 16 illustrates an architecture diagram of firmware that produces spatialization haptic effects, according to an embodiment of the invention.

FIG. 16 illustrates an architecture diagram of firmware that produces haptic effects, according to an embodiment of the invention. The architecture includes communication interface 1600. Communication interface 1600 provides for communication between a haptic effect API (such as haptic effect API 1500 of FIG. 15) and firmware for a peripheral device, such as a controller or gamepad. The architecture further includes effect slot 1610. An effect slot defines a type of haptic effect, and can include the following parameters: magnitude (or strength); frequency (or period); envelope (e.g., attack level, attack time, fade level, and fade time); actuator (e.g., specific actuators or virtual actuators, such as "rumble" or "directional"); direction (e.g., one or two angles, or a two-dimensional vector); distance (e.g., can be used to module an entire haptic effect); start/end haptic effect definition (e.g., a starting haptic effect definition and an ending haptic effect definition that can be interpolated to create an interpolated haptic effect). A specific type of effect slot 1610 is a triggered effect slot 1620. A triggered effect slot defines a type of trigger haptic effect, and, in addition to the aforementioned parameters of an effect slot, can include the following additional parameters: trigger button (e.g., none, left, or right); trigger start/stop, points, and directions (e.g., start/stop the trigger haptic effect when a trigger button reaches a certain position while moving in a certain direction); and trigger end point (e.g., interpolate between a start trigger haptic effect definition and an end trigger haptic effect definition while playing the trigger haptic effect).

The architecture further includes trigger engine 1630. As previously described, trigger engine 1630 can receive a trigger haptic effect definition and can modify the trigger haptic effect definition based on trigger data, such as a position and/or range of a trigger of a controller. The architecture further includes trigger hardware interface 1640 (identified in FIG. 16 as "trigger HW interface 1640"). Trigger hardware interface 1640 is a communication interface that allows trigger engine 1630 to receive trigger data from a peripheral device, such as a controller or gamepad. The architecture further includes spatialization engine 1650. As previously described, spatialization engine 1650 can modify a haptic effect definition, such as a trigger haptic effect definition, so that a haptic effect, such as a trigger haptic effect, is scaled for one or more targeted motors, targeted actuators, rumble motors, or rumble actuators, of a controller. The architecture further includes basis effect rendering engine 1660. Basis effect rendering engine 1660 renders a haptic effect, such as a trigger haptic effect, for a motor or actuator based on a haptic effect definition, such as a trigger haptic effect definition. The architecture further includes actuator hardware interface 1670 (identified in FIG. 16 as "actuator HW interface 1670"). Actuator hardware interface 1670 is a communication interface that allows basis effect rendering engine 1660 to send haptic data included within the rendered haptic effect to a motor or actuator to cause the motor or actuator to play the haptic effect.

Figure 17:
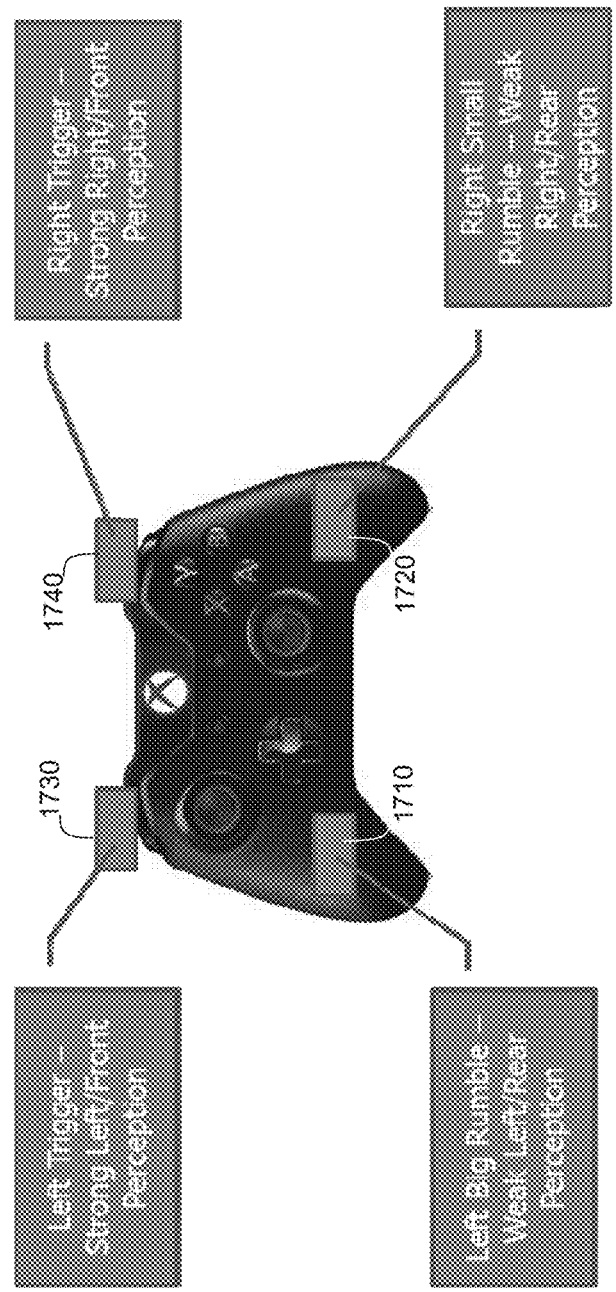
FIG. 17 illustrates an example directionality model for a controller, according to an embodiment of the invention.

FIG. 17 illustrates an example directionality model for a controller, according to an embodiment of the invention. According to the embodiment, the controller includes rumble motors 1710 and 1720, and targeted motors 1730 and 1740, where targeted motors 1730 and 1740 are each operably coupled to a trigger of the controller. Rumble motors 1710 and 1720 can have complementary vibration ranges. Further, targeted motors 1730 and 1740 can generate higher-frequency vibrations that are more spatially-isolated. It can be understood that using rumble motors 1710 and 1720 for a left/right spatialized haptic effect provides an asymmetric vibration experience (i.e., different frequency content that is not well spatially separated for most users). Thus, a haptic effect definition can include left-front, right-front, and directionless channels. Further, a front/back directionality can be reinforced by transitioning a vibration from rumble motors 1710 and 1720 to targeted motors 1730 and 1740. Thus, rumble motors 1710 and 1720 can be used for directionless low-frequency haptic effects. Rumble motors 1710 and 1720 can optionally also be used for back/front directionality. Further, targeted motors 1730 and 1740 can be used for left/right directionality.

Figure 18:
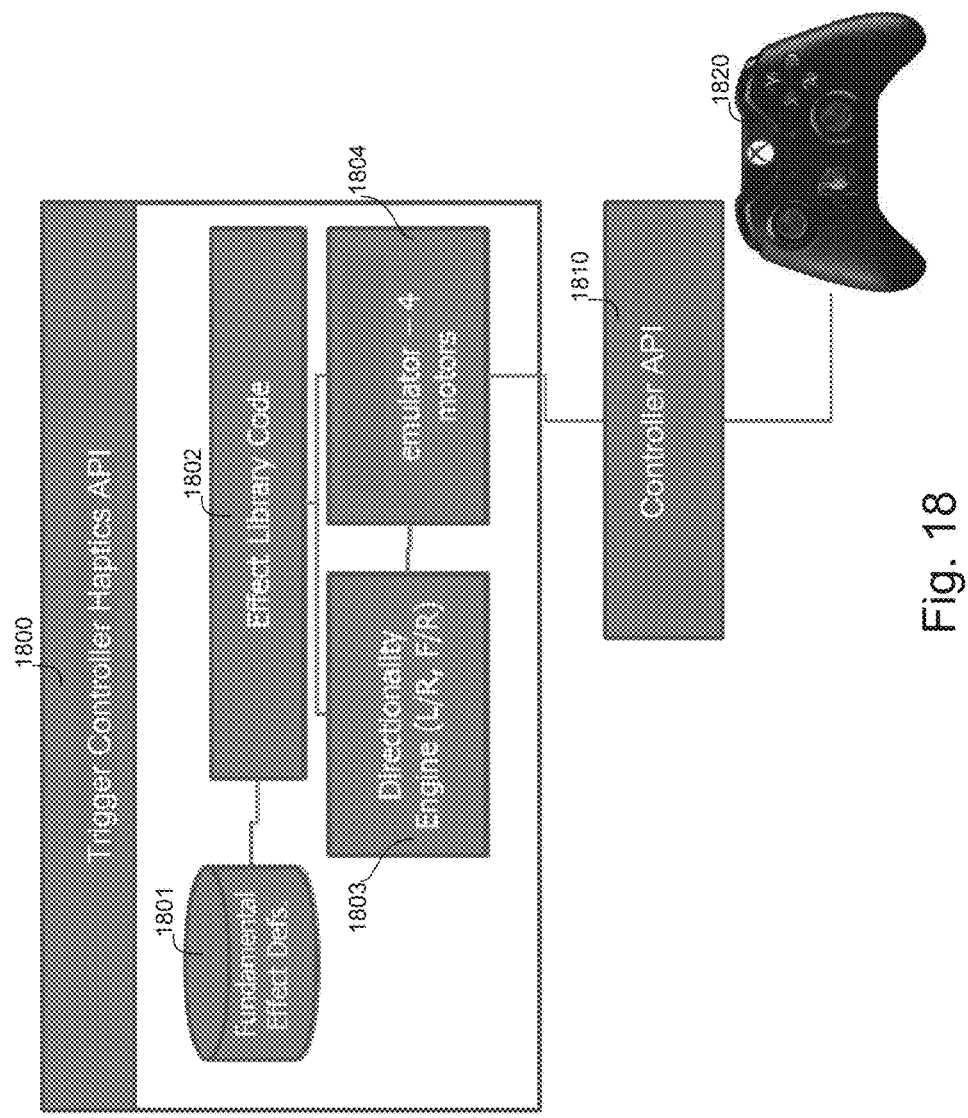
FIG. 18 illustrates a block diagram of a spatialization haptic effect firmware stack, according to an embodiment of the invention.

FIG. 18 illustrates a block diagram of a haptic effect firmware stack, according to an embodiment of the invention. The haptic effect firmware stack can be for firmware for a peripheral device, such as peripheral firmware 510 of FIG. 5. The trigger haptic effect firmware stack can include controller haptics API 1800 (identified as "trigger controller haptic API 1800" in FIG. 18). Controller haptics API 1800 includes a set of computer-readable functions or routines that allow the firmware to play haptic effects, such as trigger haptic effects, at a user input element of a controller, such as a trigger. Controller haptics API 1800 can include fundamental effect definitions 1801. Effect definitions 1801 include one or more haptic effect definitions, such as trigger haptic effect definitions. Controller haptics API 1800 can further include effect library code 1802. Effect library code 1802 includes a set of computer-readable instructions that can instantiate a haptic effect based on a haptic effect definition stored within effect definitions 1801. Effect library code 1802 can provide one or more effect-specific parameters as part of the instantiation of a haptic effect based on a haptic effect definition. Controller haptic API 1800 can further include directionality engine 1803. Directionality engine 1803 can modify a haptic effect definition, such as a trigger haptic effect definition, so that a haptic effect, such as a trigger haptic effect, is scaled for one or more targeted motors, targeted actuators, rumble motors, or rumble actuators, of a controller. Controller haptic API 1800 further includes emulator 1804. Emulator 1804 renders a haptic effect, such as a trigger haptic effect, for one or more motors or actuators (e.g., four motors) of a controller based on a haptic effect definition, such as a trigger haptic effect definition. Controller haptic API 1800 further sends the rendered haptic effect to controller 1820 (or some other peripheral device) using controller API 1810.

Figure 19:
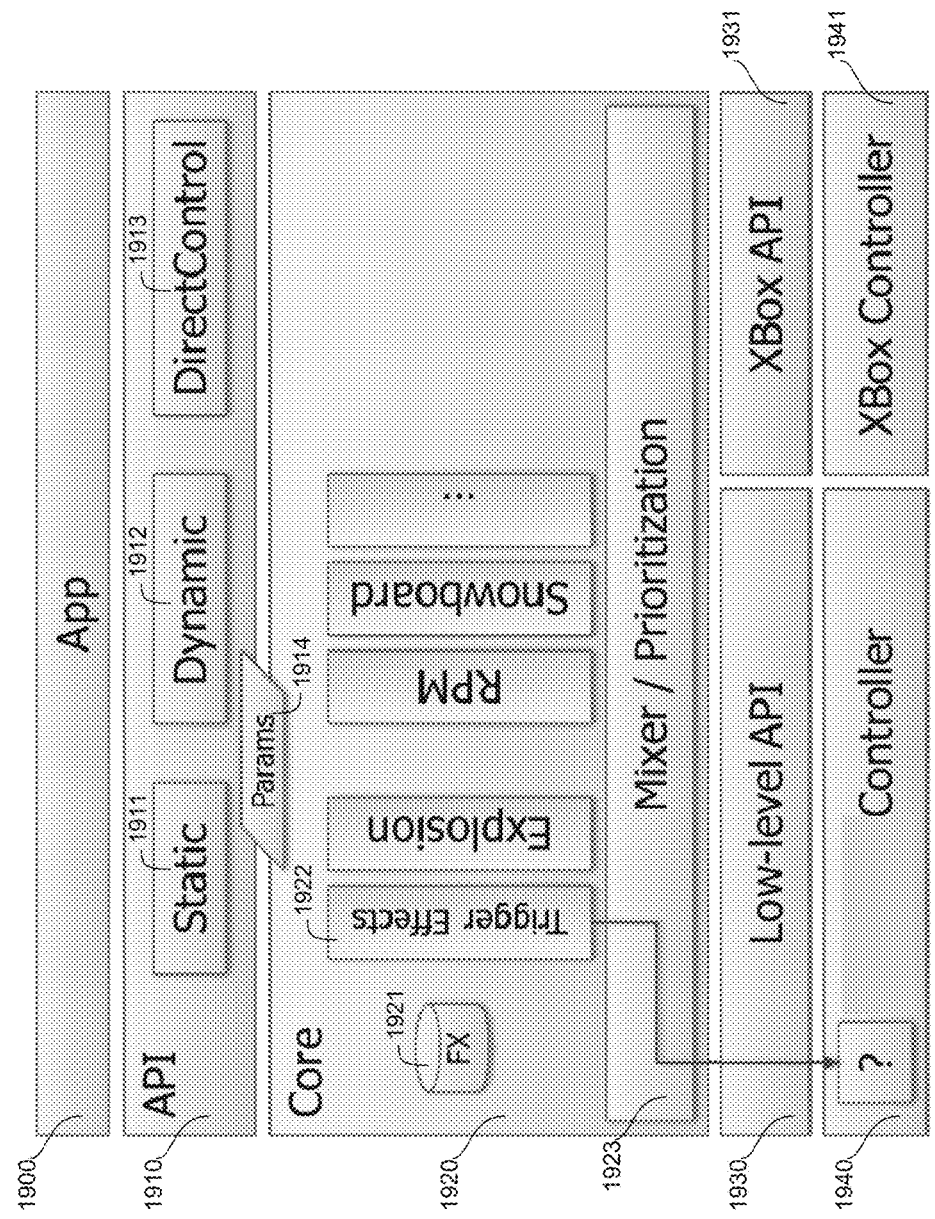
FIG. 19 illustrates an architecture diagram of a system that provides spatialization haptic effects experienced at a trigger of a controller, according to an embodiment of the invention.

FIG. 19 illustrates an architecture diagram of a system (such as system 10 of FIG. 1) that provides haptic effects experienced at a controller, according to an embodiment of the invention. The system includes application 1900 (identified in FIG. 19 as "app 1900"). Application 1900 is a software application, such as a game application, that can be executed on the system. The system further includes haptic effect API 1910 (identified in FIG. 19 as "API 1910"). In one embodiment, haptic effect API 1910 is identical to controller haptic API 1800 of FIG. 18. According to the embodiment, haptic effect API 1910 can be a single API for all controllers, gamepads, or other peripheral devices. Thus, haptic effect API 1910 can abstract differences between controllers, gamepads, and other peripheral devices. Further, haptic effect API 1910 can include a built-in effects library that includes one or more built-in haptic effect definitions. A built-in haptic effect definition is a data structure that encapsulates one or more attributes of a corresponding haptic effect.

One type of a built-in haptic effect definition is static haptic effect definition 1911 (identified in FIG. 19 as "static 1911"). Static haptic effect definition 1911 is a set of one or more periodic or magnitude sweep effect definitions that produce a static haptic effect that does not change over time. Examples include a car crash, a rocket launcher, and a user interface confirmation. Static haptic effect definition 1911 can be called directly by application 1900 based on events within a game. A static haptic effect produced by static haptic effect definition 1911 can be used as a trigger haptic effect.

Another type of a built-in haptic effect definition is dynamic haptic effect definition 1912 (identified in FIG. 19 as "dynamic 1912"). Dynamic haptic effect definition 1912 is an algorithm that receives one or more parameters 1914 as input and produces a continuously changing haptic effect (i.e., a dynamic haptic effect). Examples include an engine's revolutions per minute ("RPM"), a snowboard, and an explosion. A static haptic effect definition can be turned into a dynamic haptic effect definition by including a vector (i.e., distance and direction), and an input position/state of one or more buttons or axes). A dynamic haptic effect can be based on game variables that can be passed from application 1900. A dynamic haptic effect can also be based on controller input, such as trigger input.

Another type of a built-in haptic effect definition is direct control haptic effect definition 1913 (identified in FIG. 19 as "direct control 1913"). In a direct control scenario, direct control haptic effect definition 1913 can be defined in a way that allows direct rendering to the output device, with very little processing applied to direct control haptic effect definition 1913 as it travels through core effect library 1920. In this scenario, direct control haptic effect definition 1913 can include a number of distinct data channels that corresponds to, and maps exactly to, a number of output actuators on an output device. Alternately, direct control haptic effect definition 1913 can contain a number of distinct data channels that exceeds the number of available output actuators on the output device, and core effect library 1920 can select a number of channels, where each channel is selected such that it best maps to a particular actuator in the output device, and core effect library 1920 can then transmit the selected channels' data to the mapped actuators.

The system further includes core effect library 1920 (identified in FIG. 19 as "core19"). Core effect library 1920 includes one or more haptic effect definitions 1921 (identified in FIG. 19 as "FX 1921"). Haptic effect definitions 1921 can include trigger haptic effect definitions 1922 (identified in FIG. 19 as "trigger effects 1922"). Examples of haptic effect definitions can include explosion haptic effect definitions, RPM haptic effect definitions, snowboard haptic effect definitions, and other haptic effect definitions. Core effect library further includes mixer 1923 (identified in FIG. 19 as "mixer/prioritization 1923"). Mixer 1923 can mix or prioritize one or more haptic effect definitions.

The system further includes low-level API 1930. Low-level API 1930 can receive an instruction to play a haptic effect based on a haptic effect definition, and can convert the instruction to a low-level instruction that can be interpreted by a controller 1940. An example of low-level API 1930 is Xbox® API 2031 by Microsoft Corporation, and an example of controller 1940 is Xbox® controller 2041 by Microsoft Corporation.

Figure 20:
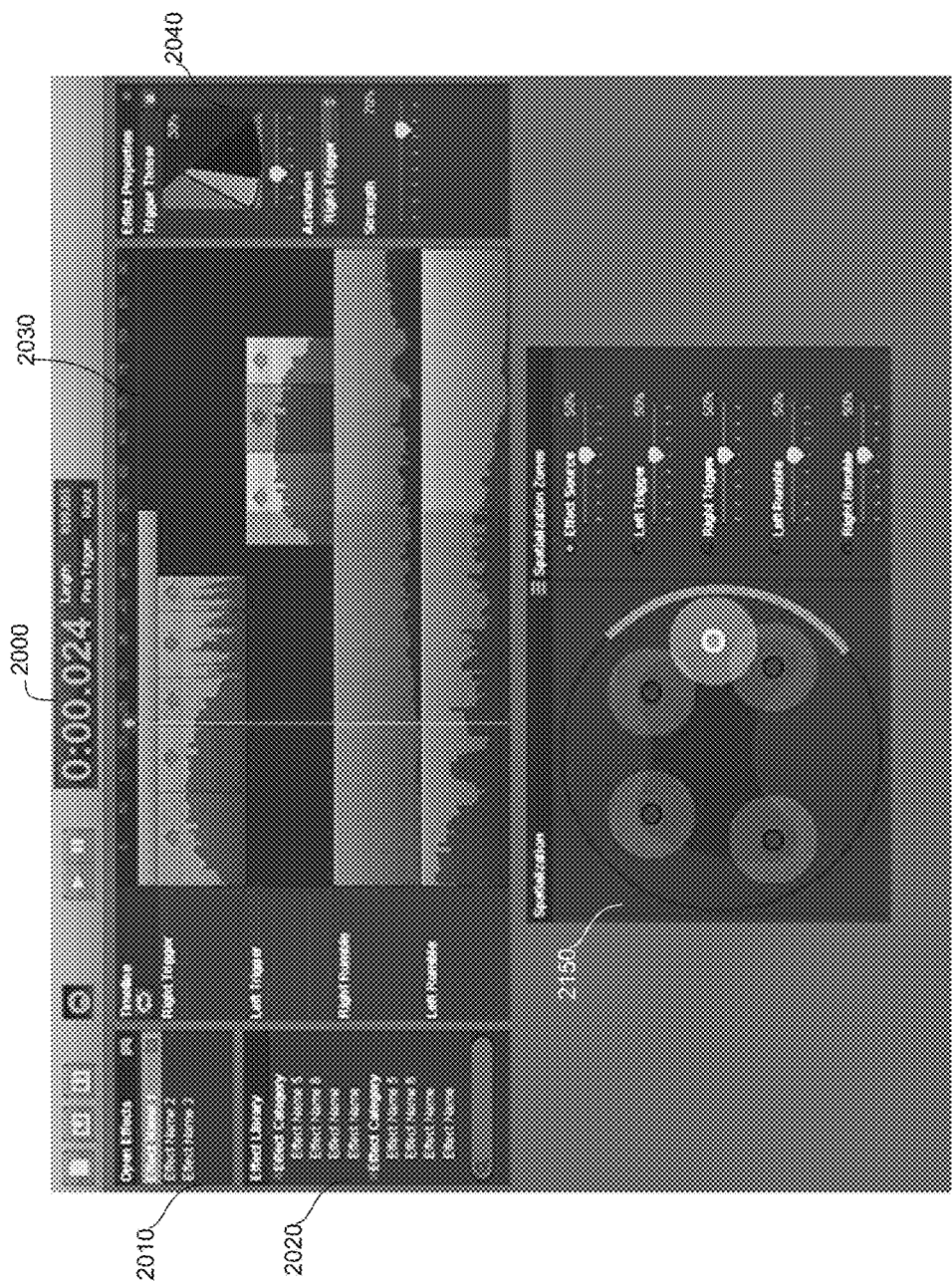
FIG. 20 illustrates an example user interface for previewing and modifying a spatialization haptic effect, according to an embodiment of the invention.

FIG. 20 illustrates an example user interface 2000 for previewing and modifying a spatialization haptic effect, according to an embodiment of the invention. A system (such as system 10 of FIG. 1) can provide user interface 2000 to a user as a spatialization haptic effect preview and modification tool. According to the embodiment, user interface 2000 includes open effects 2010. Open effects 2010 can display one of more haptic effect presets, such as trigger haptic effect presets, that are available to be selected. User interface 2000 further includes effect library 2020. Effect library 2020 can display one or more haptic effect presets, such as trigger haptic effect presets, that are included within a haptic effects library. Effect library 2020 can display the one or more haptic effect presets by category.

User interface 2100 further includes timeline 2030. According to the embodiment, a user can select a haptic effect preset displayed within open effects 2010, and timeline 2030 can display a graphical representation of the haptic effect definition that is represented by the selected haptic effect preset. In the illustrated embodiment, the haptic effect definition includes four channels, with each channel including haptic data that is mapped for a specific output (e.g., (1) targeted motor or actuator for a right trigger; (2) targeted motor or actuator for a left trigger; (3) right rumble motor or actuator; and (4) left rumble motor or actuator), and each channel being displayed along the timeline. However, in other embodiments, the haptic effect definition can include any number of channels. Further, a user can modify one or more channels of the selected haptic effect definition by interacting with one or more display elements within timeline 2030. By modifying one or more channels of a haptic effect definition, one can modify one or more attributes of a corresponding haptic effect.

User interface 2000 further includes effect properties 2040. Effect properties 2040 is an editable visual area that can visualize a trigger haptic effect that is generated by a trigger engine (such as trigger engine 506 of FIG. 5). As previously described, a trigger engine can receive a trigger haptic effect definition and can modify the trigger haptic effect definition based on a position and/or range of a trigger of a controller. Thus, effect properties 2040 can display a visualization of the trigger, including an actual position of the trigger. Further, effect properties 2040 can display a position and/or range of the trigger that is defined for a trigger haptic effect definition, where the position and/or range can cause the trigger engine to modify the trigger haptic effect definition. A user can edit the position and/or range of the trigger that is defined for the trigger haptic effect definition. Further, effect properties 2040 can display a list of triggers for a controller, so the user can edit the trigger that is defined for the trigger haptic effect definition. Even further, effect properties 2040 can display a magnitude (or strength) of the trigger haptic effect definition, and a user can modify the magnitude (or strength).

User interface 2000 further includes spatialization 2050. Spatialization 2050 is an editable visual area that can visualize a haptic effect that is originally generated and further modified by a spatialization engine (such as spatialization engine 507 of FIG. 5). As previously described, the spatialization engine can modify the haptic effect definition so that a haptic effect is scaled for one or more targeted motors, targeted actuators, rumble motors, or rumble actuators, of a controller. Thus, spatialization 2050 can display a visualization of the controller. Spatialization 2050 can further display a visualization of the haptic effect experienced at each targeted motor, targeted actuator, rumble motor, or rumble actuator of the controller. A user can edit a scaling of the haptic effect that is experienced at each targeted motor, targeted actuator, rumble motor, or rumble actuator of the controller, as well as edit a scaling of a source of the haptic effect.

Figure 21:
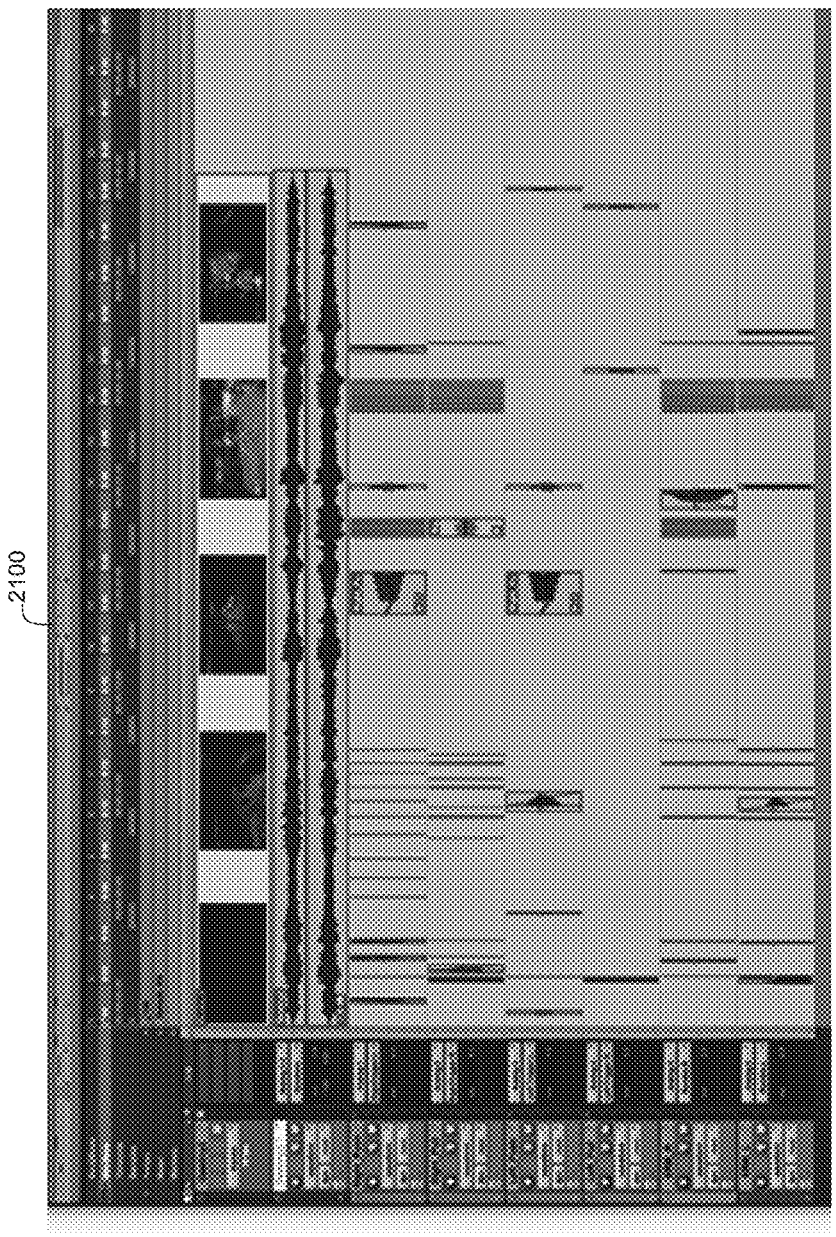
FIG. 21 illustrates an example user interface for converting an audio signal into a spatialization haptic effect, according to an embodiment of the invention.

FIG. 21 illustrates an example user interface 2100 for converting an audio signal into a haptic effect, according to an embodiment of the invention. According to an embodiment, haptic effect design can become part of an audio design process that is incorporated into user interface 2100. More specifically, audio effect definitions 3-8 displayed within user interface 2100 can be converted into haptic effect definitions, where the haptic effect definitions can be exported.

Figure 22:
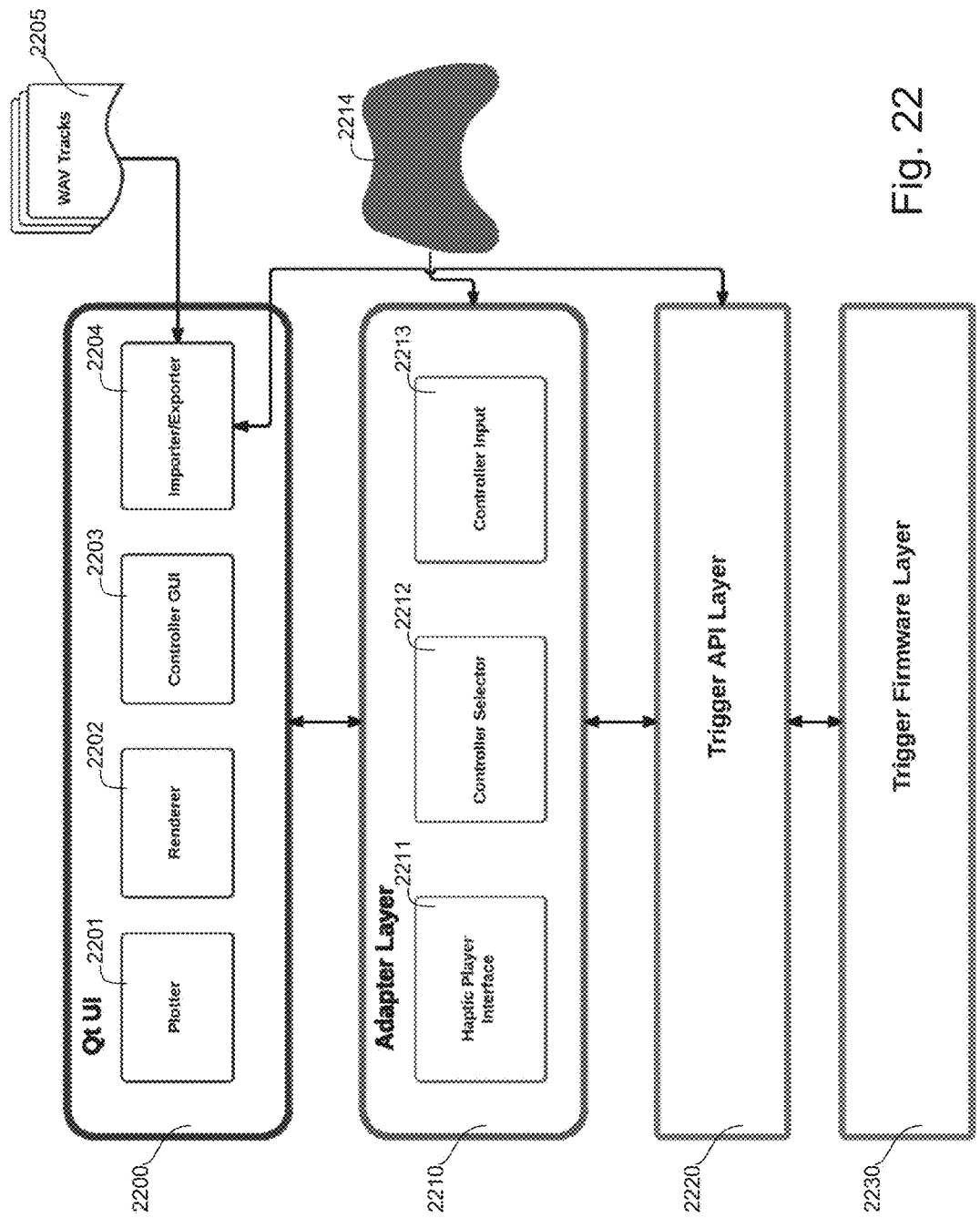
FIG. 22 illustrates an architecture diagram of a system that previews spatialization haptic effects, according to an embodiment of the invention.

FIG. 22 illustrates an architecture diagram of a system (such as system 10 of FIG. 1) that previews spatialization haptic effects, according to an embodiment of the invention. The system includes user interface 2200. In one embodiment, user interface 2200 is a Qt user interface, where Qt is a cross-platform application and user interface framework. The system further includes adapter layer 2210. The system further includes trigger API layer 2220. The system further includes trigger firmware layer 2230.

User interface 2200 includes plotter 2201. Plotter 2201 takes a haptic effect definition specified by a user as input, and sends the haptic data includes within the haptic effect definition through adapter layer 2210 to trigger API layer 2220. Trigger API layer 2220 sends back individual channel data that plotter 2201 displays within user interface 2200. Render 2202 takes input from controller GUI 2203 and starts a haptic player render loop. The input is routed through adapter layer 2210, which has callbacks setup with trigger API layer 2220 to and relay controller input 2213 (such as button and trigger input) sent from controller 2214. Adapter layer 2210 can also communicate with plotter 2201 while the render loop is running to update user interface 2200. Controller GUI 2203 can also select controller 2214 using controller selector 2212, and can show what is connected. Controller GUI 2203 can also set up a trigger activation point. Further, importer/exporter 2204 can take input audio files and convert them to a haptic file. In one embodiment, an audio file is a WAV file. Further, adapter layer 2210 can be embedded within user interface 2200, or can be a separate library. When adapter layer 2210 is a separate library, adapter layer 2210 can be a separate C++ library.

Figure 23:
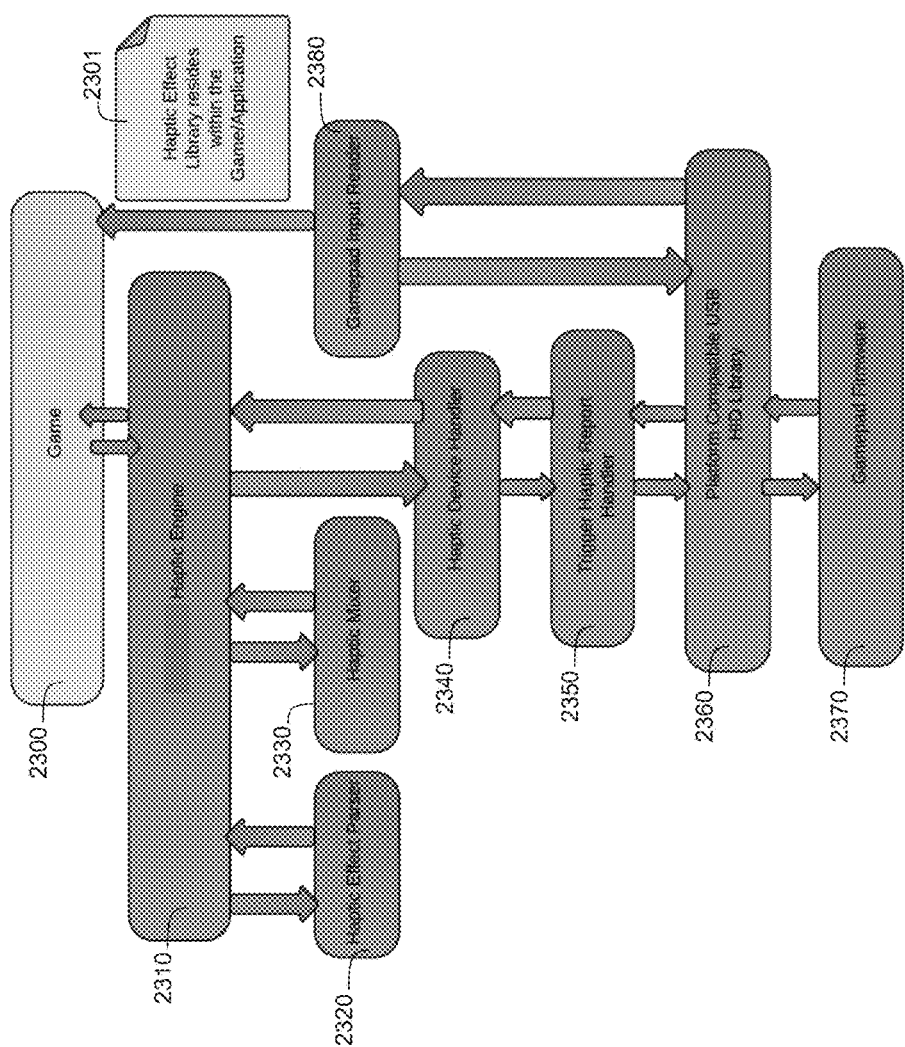
FIG. 23 illustrates an architecture diagram of a system that produces spatialization haptic effects, according to an embodiment of the invention.

FIG. 23 illustrates an architecture diagram of a system (such as system 10 of FIG. 1) that produces spatialization haptic effects, according to an embodiment of the invention. The system includes game application 2300 (identified in FIG. 23 as "game 2300"). Game application 2300 includes a set of computer-readable instructions that manage input provided by a controller, gamepad, or other peripheral device, in the context of a software game, or other type of software application. In on embodiment, game application 2300 includes haptic effect library 2301, where haptic effect library 2301 includes one or more haptic effect definitions.

The system further includes haptic engine 2310. Haptic engine 2310 is a high-level API that can utilize a low level API to perform the playing of a haptic effect, and to add haptic effects to game application 2300. Haptic engine 2310 can load, start, stop, and render a haptic effect. Haptic engine 2310 can interface with haptic effect parser 2320 to parse/get information about a haptic effect. Haptic engine 2310 can further interface with haptic mixer 2330 to start or stop an effect and modify a mixer buffer. Haptic engine 2310 can further interface with haptic device handler 2350 to get a device handle of, and render haptic effects on, a controller, gamepad, or other peripheral device.

The system further includes haptic effect parser 2320. Haptic effect parser 2320 includes an API that can load a haptic effect in memory, verify its format, and obtain information about the haptic effect, such as size, duration, and haptic data. The system further includes haptic mixer 2330. Haptic mixer 2330 supports playback of multiple haptic effects at the same time. The system further includes haptic device handler 2340. Haptic device handler 2340 can initiate and manage communication with a controller, gamepad, or other peripheral device. Haptic device handler 2340 can interface with a Universal Serial Bus ("USB") communication layer and obtain a device handle of the controller, gamepad, or other peripheral device. Haptic device handler 2340 can further initialize several state machine structures critical for haptic effect playback.

The system further includes trigger haptic report handler 2350. Trigger haptic report handler 2350 can package haptic data into USB HID packets according to a trigger communication protocol. The system further includes platform compliant USB HID library 2360. Platform compliant USB HID library 2360 includes one or more computer-readable routines to interface with USB HID and Bluetooth HID class of controllers, gamepads, or other peripheral devices. The system further includes peripheral firmware 2370 (identified in FIG. 23 as "gamepad firmware 2370"). Peripheral firmware 2370 is firmware for a controller, gamepad, or other peripheral device. The system further includes peripheral input reader 2380 (identified in FIG. 23 as "gamepad input reader 2380"). Peripheral input reader 2380 receives peripheral input that is sent by the controller, gamepad, or other peripheral device. Peripheral input reader 2380 further interprets the peripheral input and sends the peripheral input to game application 2300.

Figure 24:
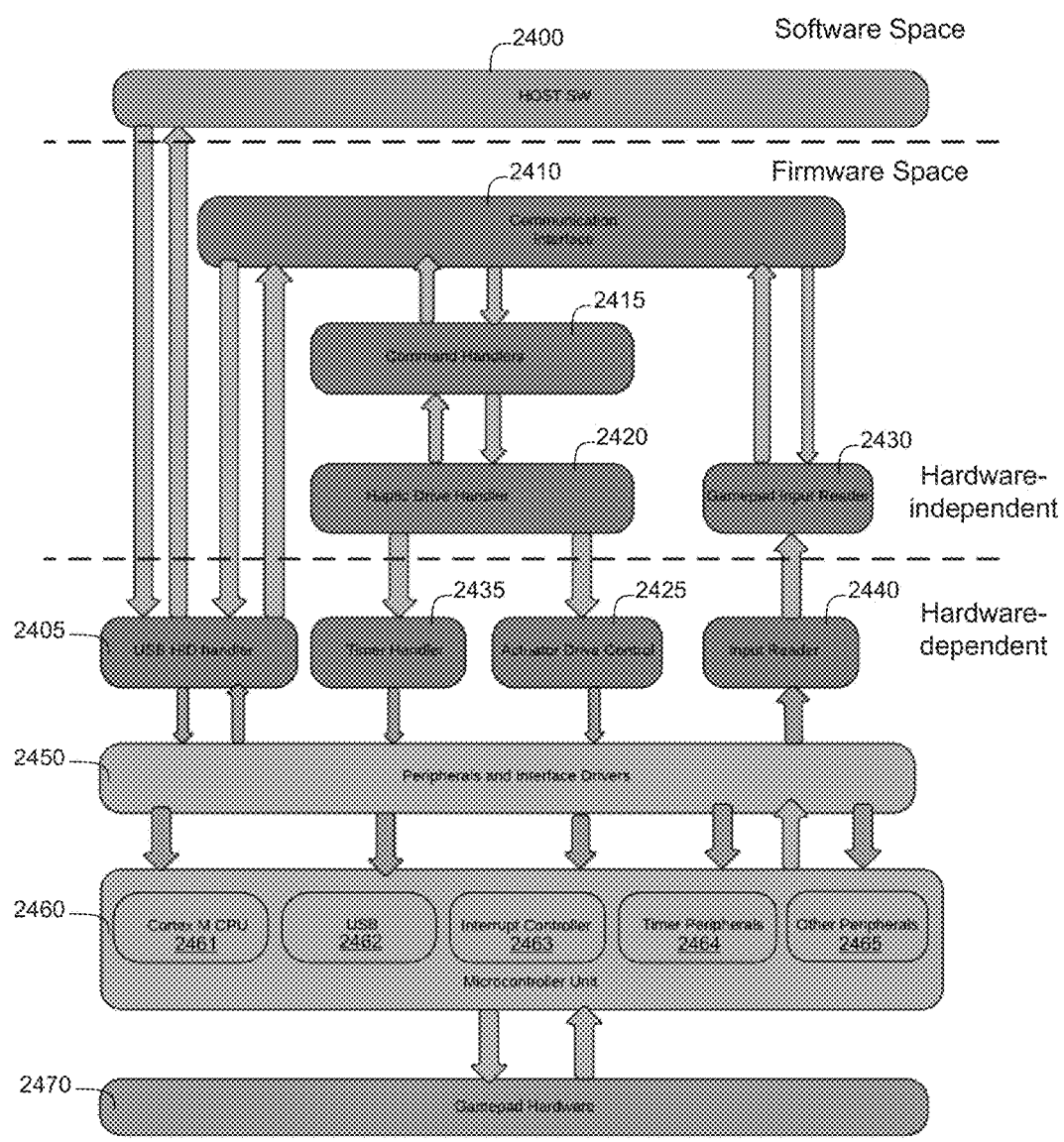
FIG. 24 illustrates an architecture diagram of firmware that produces spatialization haptic effects, according to an embodiment of the invention.

FIG. 24 illustrates an architecture diagram of firmware that produces spatialization haptic effects, according to an embodiment of the invention. The firmware architecture can make the firmware modular, can separate hardware-independent component from hardware-dependent components, and can make porting easier from one microcomputer unit to another. The hardware-independent layer can communicate with the hardware-dependent layer by functional pointers. The hardware-dependent layer can be ported to another microcontroller unit based on the implementation template. All hardware-dependent routines can interface with a board configuration file that can give an inside look of the hardware which has different port/button definitions.

FIG. 24 includes host software 2400 (identified in FIG. 24 as "HOST SW 2400"). Host software 2400 includes a set of computer-readable instructions that manage input provided by a controller, gamepad, or other peripheral device, in the context of a software game, or other type of software application. Host software 2400 can be within a software space. FIG. 24 further includes USB HID handler 2405. USB HID handler 2405 can be a main entry point for all communication between a controller, gamepad, or other peripheral device, and host software 2400. USB HID handler 2405 can include one or more computer-readable functions or routines to encode/decode data, such as haptic data, according to a trigger communication protocol. USB HID handler 2405 can also store all USB descriptors and routines to handle USB communication. USB HID handler 2405 can be within a firmware space.

FIG. 24 further includes communication interface 2410. Communication interface 2410 can parse an incoming packet and call command handler 2415 to take appropriate actions. FIG. 24 further includes command handler 2415. Command handler 2415 can include one or more computer-readable functions or routines to handle commands supported by a trigger protocol that supports haptic playback on actuators. FIG. 24 further includes haptic drive handler 2420. Haptic drive handler 2420 can update a state of a haptic playback engine, updates drive values of actuators and controls the actuators. Haptic drive handler 2420 can interface with hardware-dependent timer handler 2435 and actuator control 2425 by function pointer mechanism. Communication interface 2410, command handler 2415 and haptic drive handler 2420 can all be within a firmware space.

FIG. 24 further includes actuator control 2425 (identified in FIG. 24 as "actuator drive control 2425"). Actuator control 2425 can control the actuators and set the drive values. Actuator control 2425 can include one or more computer-readable functions or routines to interface with a pulse-width modulation generation unit, and to interface with actuator driver chips. FIG. 24 further includes controller input reader 2430 (identified in FIG. 24 as "gamepad input reader 2430"). Controller input reader 2430 can interface with platform-dependent input reader 2440 to obtain a state of different inputs of the controller, gamepad, or other peripheral device, package the inputs, and send the inputs to communication interface 2410 to be further sent to host software 2400. FIG. 24 further includes timer handler 2435. Timer handler 2435 is a hardware-dependent layer that can control a timer responsible for generating periodic interrupts to call a routine that updates a drive value for the actuators. FIG. 24 further includes input reader 2440. Input reader 2440 is a hardware-dependent layer that can obtain a state of all potentiometers and digital inputs of a controller, gamepad, or other peripheral device. FIG. 24 further includes peripheral and interface driver 2450. Peripheral and interface driver 2450 can include one or more computer-readable functions or routines to control communication interfaces and hardware peripheral devices. Actuator control 2425, controller input reader 2430, timer handler 2435, input reader 2440, and peripheral and interface driver 2450 can all be within a firmware space.

Figure 26:
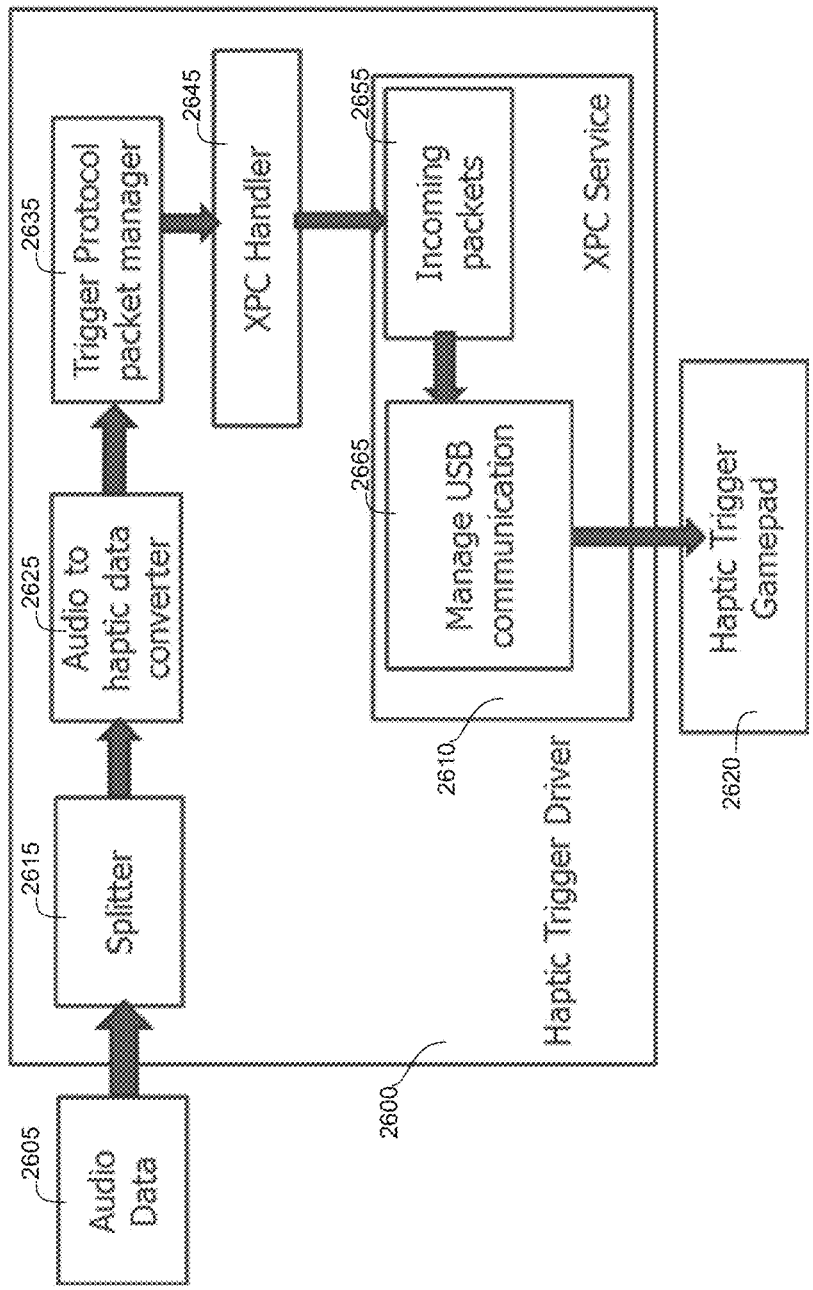
FIG. 26 illustrates an example audio driver that converts an audio effect into a spatialization haptic effect, according to an embodiment of the invention.

FIG. 24 further includes microcontroller unit 2460, which can include components, such as computer processing unit 2461, USB 2462, interrupt controller 2463, timer peripherals 2464, and other peripherals 2465. The functionality of these components is known to one of ordinary skill in the relevant art. FIG. 26 further includes controller hardware 2470 (identified in FIG. 24 as "gamepad hardware 2470"). The functionality of controller hardware 2470 is also known to one of ordinary skill in the relevant art. Microcontroller unit 2460, and controller hardware 2470 can all be within a firmware space. Further, communication interface 2410, command handler 2415, haptic drive handler 2425, and controller input reader 2430 can all be hardware-independent components, whereas USB HID handler 2405, actuator control 2425, timer handler 2435, input reader 2440, peripheral and interface driver 2450, microcontroller unit 2460, and controller hardware 2470 can all be hardware-dependent components.

In one embodiment, a controller, gamepad, or other peripheral device, can have a customized protocol for conveying haptic data and for driving individual motors or actuators. Accordingly, an audio driver can be provided that receives an audio file that includes a haptic effect authored as an audio effect definition from an audio authoring component, and that sends the audio data included within the audio file to the controller, gamepad, or other peripheral device. In one embodiment, the audio authoring component can be a "Pro Tools®" product by Avid Technology, Inc. The audio driver can get loaded during a boot up process. The audio driver can expose a necessary number of audio channels in order to make haptic effect definitions possible for using all the motors or actuators in the controller, gamepad, or other peripheral device. The audio driver can further work in user space, and can be accessible to all user space audio editing/playback applications. The audio driver can further read the audio data that an audio authoring component sends to the controller, gamepad, or other peripheral device. The audio driver can further perform necessary processing on the audio data being presented and can convert the audio data into haptic data, such as actuator drive values. The audio driver can further communicate the haptic data to the controller, gamepad, or other peripheral device over a communication interface.

According to the embodiment, a controller, gamepad, or other peripheral device, can include four actuators. Two actuators can be used as trigger actuators influencing haptic feedback on triggers. The trigger actuators can be bi-directional. Two kinds of direction events can happen with the trigger actuators: PUSH and PULL. The PUSH and PULL directions can be relative to a user's finger on the trigger. Two other actuators can be used as rumble actuators influencing general haptic feedback or rumble feedback within the controller, gamepad, or other peripheral device. The rumble actuators can be uni-directional. More specifically, the rumble actuators can spin in either a clockwise direction or a counter-clockwise direction, but not both directions. The direction of the motion can be dependent on the controller and/or the drive electronics of the controller.

In this embodiment, the following channel layout can be chosen for the audio driver:

| Channel Number | Channel Purpose |
| --- | --- |
| 0 | Push channel for left trigger |
| 1 | Pull channel for left trigger |
| 2 | Push channel for right trigger |
| 3 | Pull channel for right trigger |
| 4 | Left rumble |
| 5 | Right rumble |

In one embodiment, an audio format chosen for a 16-bit PCM can be 44.1 KHz. The audio driver can receive the audio data from an audio authoring component, convert the audio data into haptic data (e.g., drive values), and communicate the haptic data to the controller accordingly.

Figure 25:
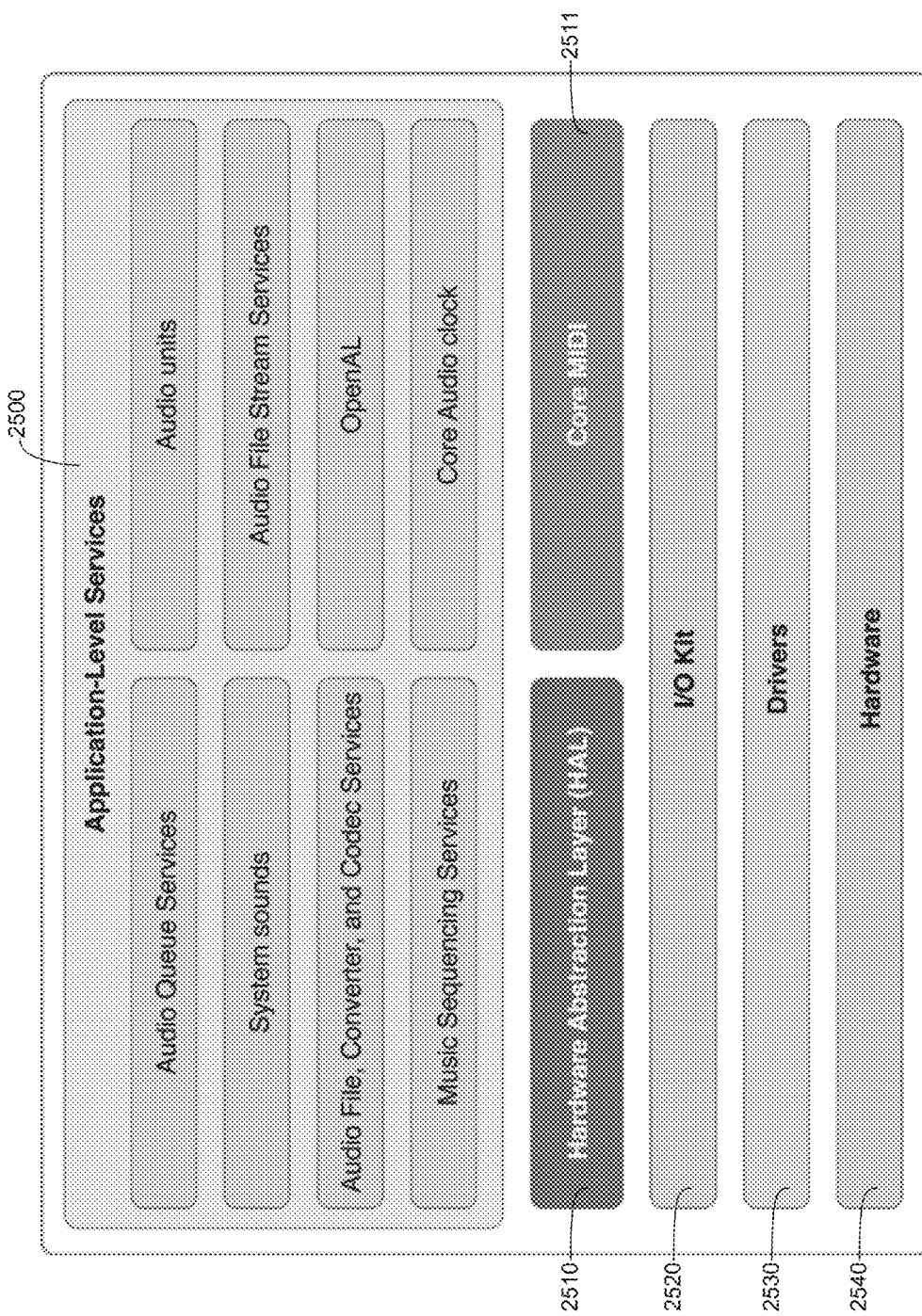
FIG. 25 illustrates an example audio architecture, according to an embodiment of the invention.

FIG. 25 illustrates an example audio architecture, according to an embodiment of the invention. The audio architecture includes application-level services 2500. Application-level services 2500 can include such services as: audio queue services; audio units; system sounds; audio file stream services; audio file, converter, and codec services; OpenAL; music sequencing services; or a core audio clock. Application-level services 2500 communicate with hardware abstraction layer ("HAL") 2510. An example of HAL 2510 is core Musical Instrument Digital Interface ("MIDI") 2511. In turn, HAL 2510 communicates with input/output ("I/O") kit 2520, drivers 2530, and hardware 2540. I/O kit 2520, drivers 2530, and hardware 2540 exist in kernel space. In order to receive audio data that application-level services intend to send to hardware 2540, an audio driver can require a plug-in to HAL 2510, where the plug-in can receive the audio data and access hardware 2540. The plug-in of the audio driver can receive audio data from application-level services 2500 in real-time, or in near real-time, and can convert the audio data to haptic data (e.g., drive values) performing decimation on a 5-millisecond ("ms") portion of audio data. An example audio driver is described further in greater detail in conjunction with FIG. 26.

FIG. 26 illustrates an example audio driver 2600 (identified in FIG. 26 as "haptic trigger driver 2600") that converts an audio effect into a haptic effect, according to an embodiment of the invention. Audio driver 2600 receives audio data 2605 from one or more applications. Audio data can be an interleaved multi-channel audio stream, such as a four-channel audio stream or a six-channel audio stream. Subsequently, splitter 2615 separates the audio data of the various channels into respective channel buffers. Further, audio-to-haptic data converter 2625 converts the audio data of each channel buffer into haptic data. More specifically, in one embodiment, audio-to-haptic data converter 2625 executes a peak-detection algorithm on the channel buffers on a portion of audio data (e.g., 5 ms of audio data) and populates values in a decimated value array of each channel. Audio-to-haptic data converter 2625 then calculates drive values of the individual actuators based on the following formulas:

Drive value for triggers: (PushChannelDecimated-Value−PullChannelDecimatedValue)→Scale it to [0,255]

Drive value for rumbles: (DecimatedValue)→Scale it to [128,255]

Subsequently, trigger protocol packet manager 2635 obtains drive values for all the actuators (e.g., all four actuators) and packages the drive values as data packets, such as USB HID packets, according to a trigger communication protocol. Further, XPC handler 2645 receives the data packets from trigger protocol packet manager 2635 and sends the data packets to XPC service 2610, which is a background service. At 2655, XPC service 2610 receives the data packets and, at 2665, sends the data packets to 2665 to a controller 2620 (identified in FIG. 26 as "haptic trigger gamepad 2620"), over a USB interface.

Figure 27:
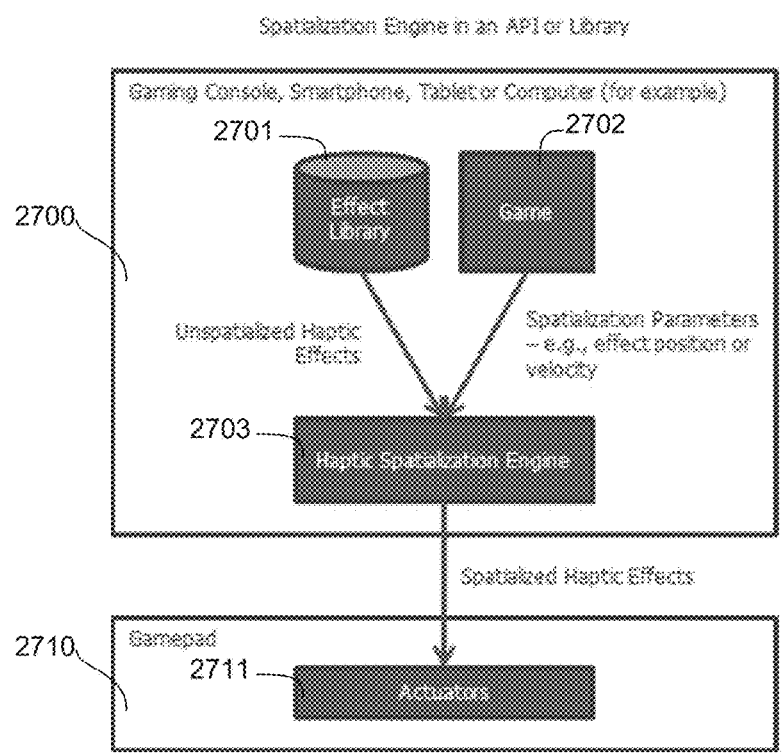
FIG. 27 illustrates an example spatialization engine that resides in an API or library, according to an embodiment of the invention.

FIG. 27 illustrates an example spatialization engine that resides in an API or library, according to an embodiment of the invention. The spatialization engine is implemented on a system, such as system 10 of FIG. 1. In the illustrated embodiment, the system includes the following components: device 2700 (identified in FIG. 27 as "gaming console, smartphone, tablet or computer (for example) 2700"), and controller 2710 (identified in FIG. 27 as "gamepad 2710"). Device 2700 can be any type of computer device, such as a personal computer, tablet, smartphone, or console (e.g., video game console). Controller 2710 is an example of a peripheral device that is operably connected to device 2700. Controller 2710 can be a video game controller. In one embodiment, controller 2710 can be identical to controller 30 of FIG. 1, controller 100 of FIGS. 2, 3, and 4, or controller 520 of FIG. 5.

Device 2700 includes effect library 2701, where effect library 2701 can include one or more haptic effect definitions. In the embodiment, these haptic effect definitions can be identified as unspatialized haptic effect definitions, as they are haptic effect definitions that have not been modified by a spatialization engine. Device 2700 further includes game 2702, where game 2702 is a software application, such as a game application, that can be executed on the system. According to the embodiment, game 2702 can generate one or more spatialization parameters, where the one or more spatialization parameters can define a position, distance, velocity, direction, and/or flow of a haptic effect defined by a haptic effect definition that is stored within effect library 2701.

Device 2700 further includes spatialization engine 2703 (identified in FIG. 27 as "haptic spatialization engine 2703"), where effect library 2701 can send one or more unspatialized haptic effect definitions to spatialization engine 2703, and where game 2702 can send one or more spatialization parameters to spatialization engine 2703. Spatialization engine 2703 can receive the one or more unspatialized haptic effect definitions, and can modify the one or more unspatialized haptic effect definitions based on the one or more spatialization parameters. According to the embodiment, spatialization engine 2703 can modify the one or more unspatialized haptic effect definitions, so that one or more haptic effects are scaled or attenuated for one or more actuators 2711 of controller 2710, where the one or more modified haptic effect definitions can be identified as spatialized haptic effect definitions. In other words, spatialization engine 2703 can modify the haptic effect definition that is sent to each actuator of actuators 2711, and thus, modify the haptic effect that is experienced at each actuator of actuators 2711, in order to convey a sense of position, distance, velocity, direction, and/or flow of the haptic effect. Spatialization engine 2703 can subsequently send the one or more spatialized haptic effect definitions to controller 2710. Controller 2710 can subsequently send each spatialized haptic effect definition to each actuator of actuators 2711, where each actuator can produce a spatialized haptic effect.

Figure 28:
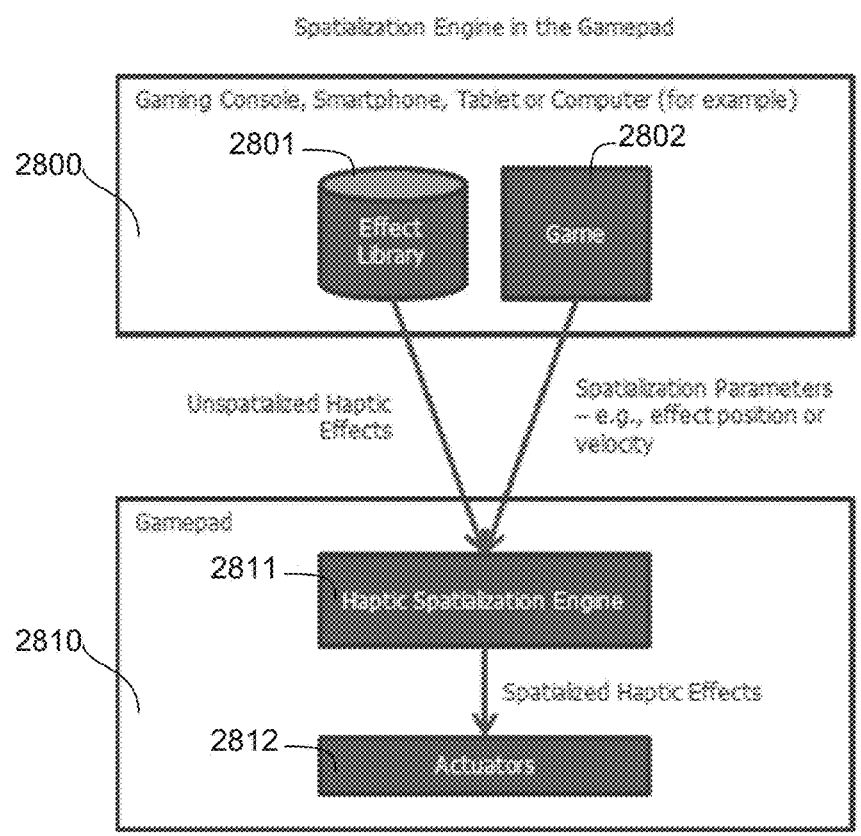
FIG. 28 illustrates an example spatialization engine that resides in a controller, according to an embodiment of the invention.

FIG. 28 illustrates an example spatialization engine that resides in a controller, according to an embodiment of the invention. The spatialization engine is implemented on a system, such as system 10 of FIG. 1. In the illustrated embodiment, the system includes the following components: device 2800 (identified in FIG. 28 as "gaming console, smartphone, tablet or computer (for example) 2800"), and controller 2810 (identified in FIG. 28 as "gamepad 2810"). Device 2800 can be any type of computer device, such as a personal computer, tablet, smartphone, or console (e.g., video game console). Controller 2810 is an example of a peripheral device that is operably connected to device 2800. Controller 2810 can be a video game controller. In one embodiment, controller 2810 can be identical to controller 30 of FIG. 1, controller 100 of FIGS. 2, 3, and 4, and controller 520 of FIG. 5.

Device 2800 includes effect library 2801, where effect library 2801 can include one or more haptic effect definitions, identified as unspatialized haptic effect definitions. Device 2800 further includes game 2802, where game 2802 is a software application, such as a game application, that can be executed on the system. According to the embodiment, game 2802 can generate one or more spatialization parameters, where the one or more spatialization parameters can define a position, distance, velocity, flow, and/or direction of a haptic effect defined by a haptic effect definition that is stored within effect library 2801.

Controller 2810 includes spatialization engine 2811 (identified in FIG. 28 as "haptic spatialization engine 2811"), where effect library 2801 can send one or more unspatialized haptic effect definitions to spatialization engine 2811, and where game 2802 can send one or more spatialization parameters to spatialization engine 2811. Spatialization engine 2811 can receive the one or more unspatialized haptic effect definitions, and can modify the one or more unspatialized haptic effect definitions based on the one or more spatialization parameters, where the one or more modified haptic effect definitions are identified as spatialized haptic effect definitions. Spatialization engine 2811 can subsequently send each spatialized haptic effect definition to each actuator of actuators 2812, where each actuator can produce a spatialized haptic effect.

Figure 29:
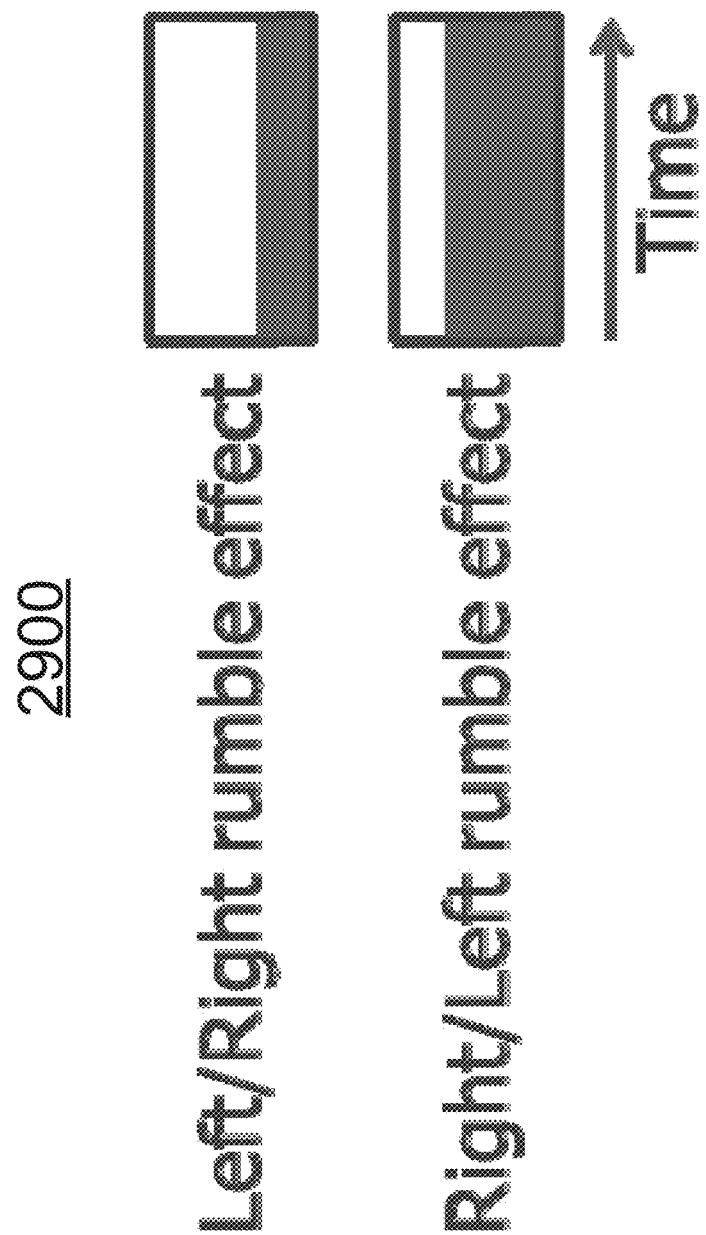
FIG. 29 illustrates an example spatialization haptic effect, according to an embodiment of the invention.

FIG. 29 illustrates an example spatialization haptic effect 2900, according to an embodiment of the invention. Spatialization haptic effect 2900 involves outputting a haptic effect at a plurality of rumble actuators of a peripheral device at multiple distinct, but constant, attenuations, based on a spatialization haptic effect definition. While spatialization haptic effect 2900 may not always be effective for conveying a location of a haptic effect to a user of the peripheral device, spatialization haptic effect 2900 can effectively convey a frequency of the haptic effect. As previously described, a rumble actuator is an actuator operably coupled to a housing, or other portion, of a peripheral device.

Figure 30:
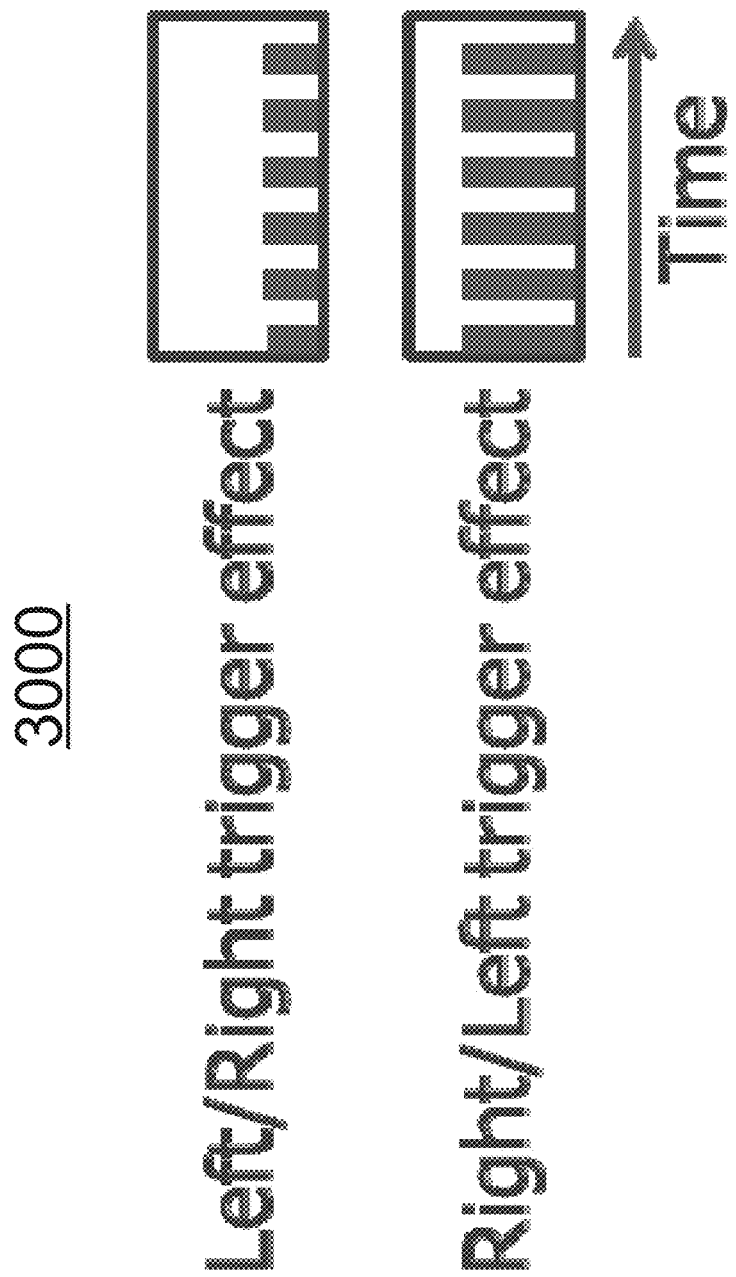
FIG. 30 illustrates an example spatialization haptic effect, according to another embodiment of the invention.

FIG. 30 illustrates an example spatialization haptic effect 3000, according to another embodiment of the invention. Spatialization haptic effect 3000 involves outputting a haptic effect at multiple trigger actuators of a peripheral device at multiple distinct, but constant, attenuations, based on a spatialization haptic effect definition. Spatialization haptic effect 3000 can effectively convey a location of a haptic effect, but may only effectively convey the location of the haptic effect in single-trigger cases, such as a left-only trigger case, or a right-only trigger case. As previously described, a trigger actuator is an actuator operably coupled to a trigger of a peripheral device. In certain embodiments, a trigger actuator can be replaced with a targeted actuator that is operably coupled to a user input element.

Figure 31:
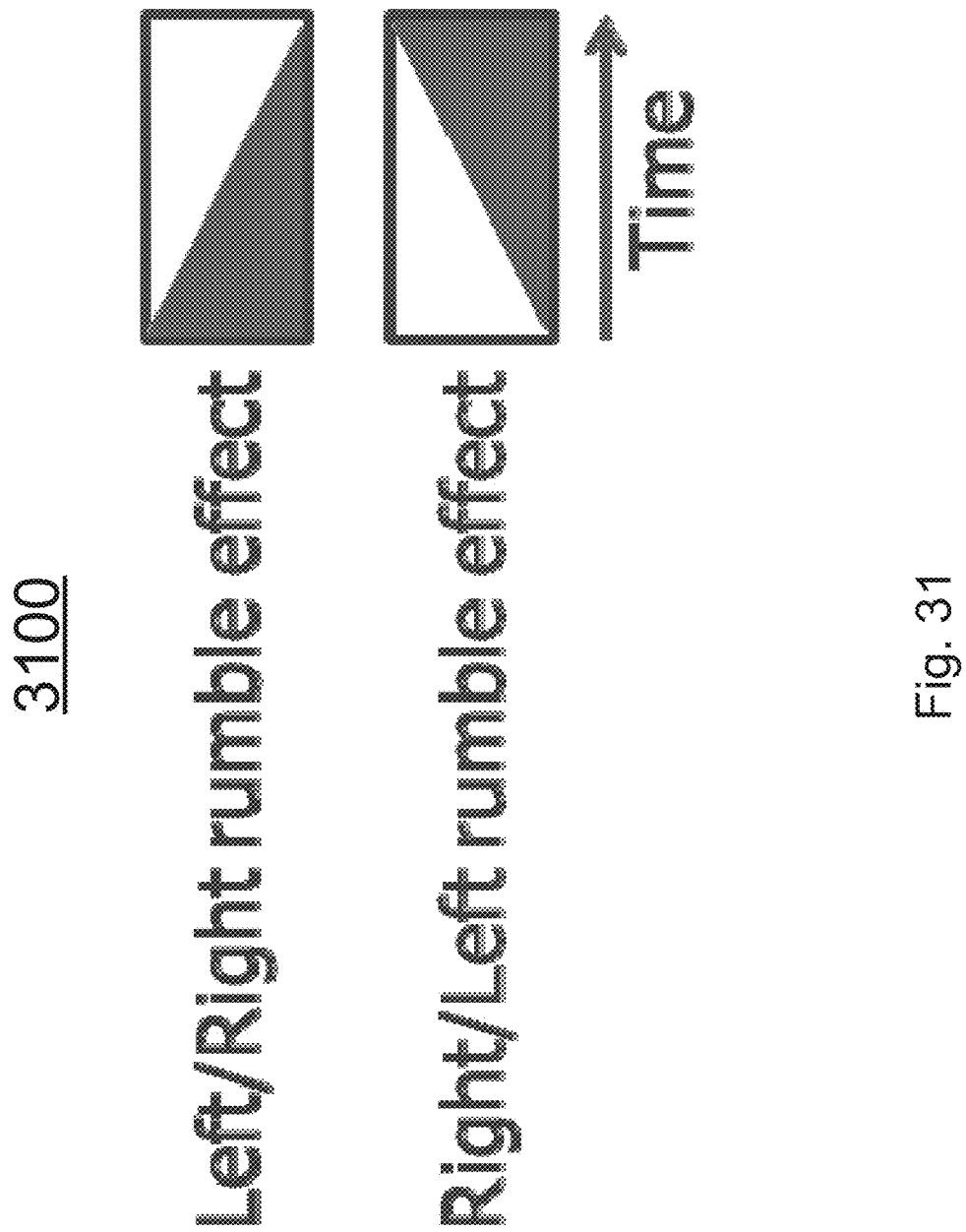
FIG. 31 illustrates an example spatialization haptic effect, according to an embodiment of the invention.

FIG. 31 illustrates an example spatialization haptic effect 3100, according to an embodiment of the invention. Spatialization haptic effect 3100 involves outputting a haptic effect at multiple rumble actuators of a peripheral device by inversely ramping attenuation, based on a spatialization haptic effect definition. Spatialization haptic effect 3100 can effectively convey movement, such as left-to-right movement or right-to-left movement.

Figure 32:
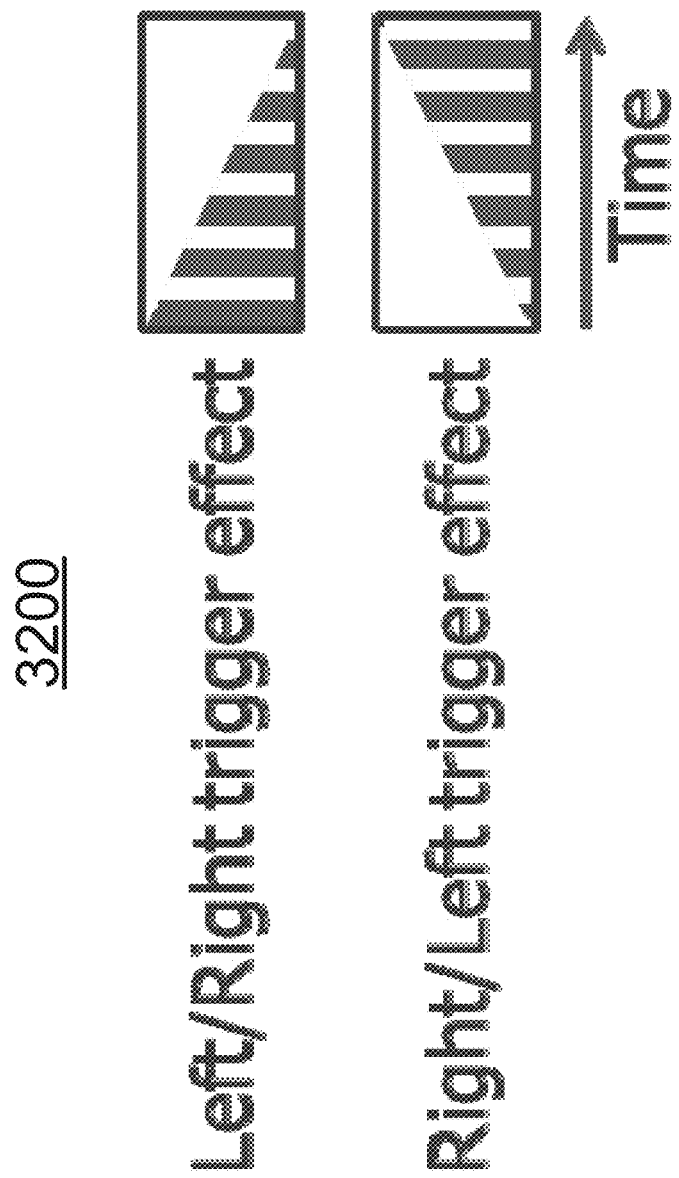
FIG. 32 illustrates an example spatialization haptic effect, according to another embodiment of the invention.

FIG. 32 illustrates an example spatialization haptic effect 3200, according to another embodiment of the invention. Spatialization haptic effect 3200 involves outputting a haptic effect at multiple trigger actuators of a peripheral device by inversely ramping attenuation, based on a spatialization haptic effect definition. Spatialization haptic effect 3200 can effectively convey movement, such as left-to-right movement or right-to-left movement. In certain embodiments, a trigger actuator can be replaced with a targeted actuator that is operably coupled to a user input element.

Figure 33:
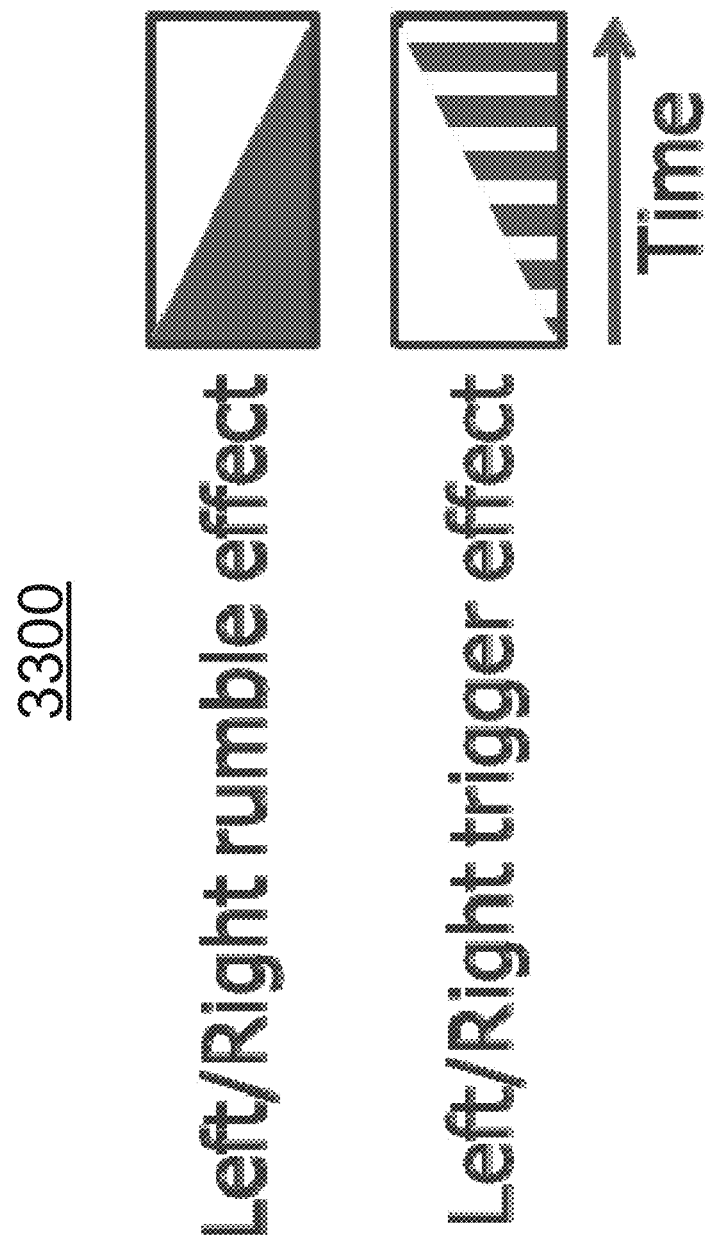
FIG. 33 illustrates an example spatialization haptic effect, according to another embodiment of the invention.

FIG. 33 illustrates an example spatialization haptic effect 3300, according to another embodiment of the invention. Spatialization haptic effect 3300 involves outputting a haptic effect at multiple rumble and trigger actuators of a peripheral device by inversely ramping attenuation from a rumble actuator to a trigger actuator, based on a spatialization haptic effect definition. Spatialization haptic effect 3300 can effectively convey movement, such as back-to-front movement. In certain embodiments, a trigger actuator can be replaced with a targeted actuator that is operably coupled to a user input element.

Figure 34:
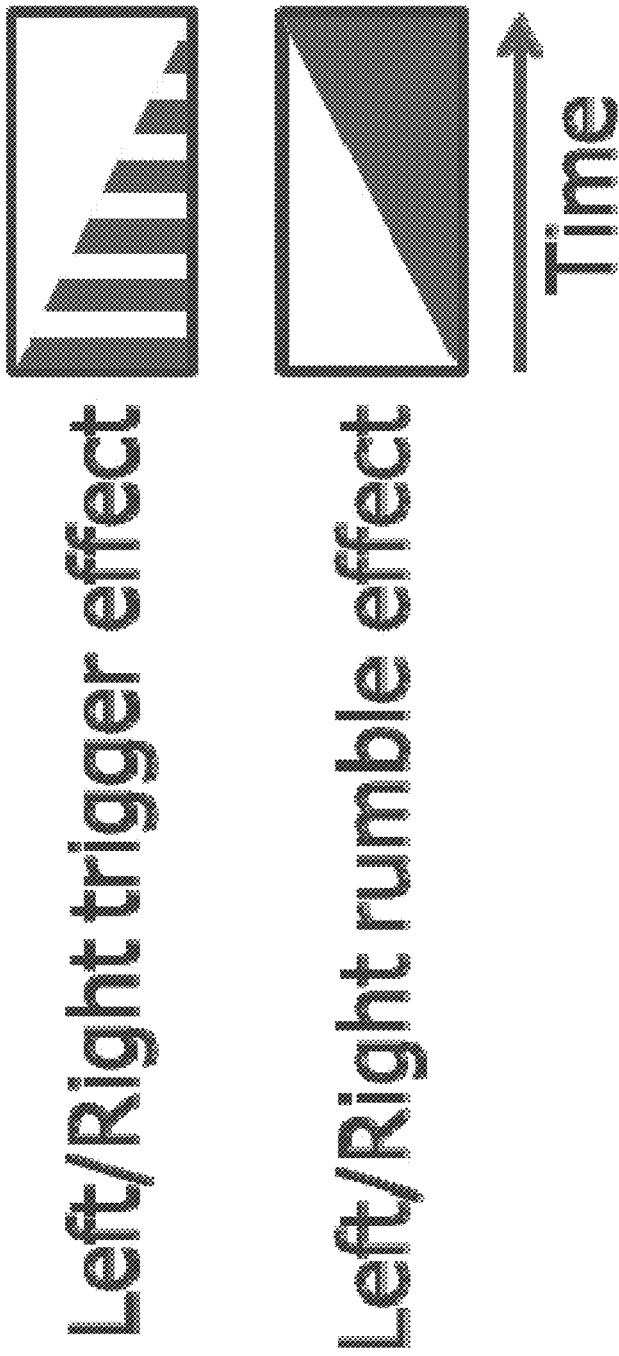
FIG. 34 illustrates an example spatialization haptic effect, according to another embodiment of the invention.

FIG. 34 illustrates an example spatialization haptic effect 3400, according to another embodiment of the invention. Spatialization haptic effect 3400 involves outputting a haptic effect at multiple trigger and rumble actuators of a peripheral device by inversely ramping attenuation from a trigger actuator to a rumble actuator, based on a spatialization haptic effect definition. Spatialization haptic effect 3400 can effectively convey movement, such as front-to-back movement. In certain embodiments, a trigger actuator can be replaced with a targeted actuator that is operably coupled to a user input element.

Figure 35:
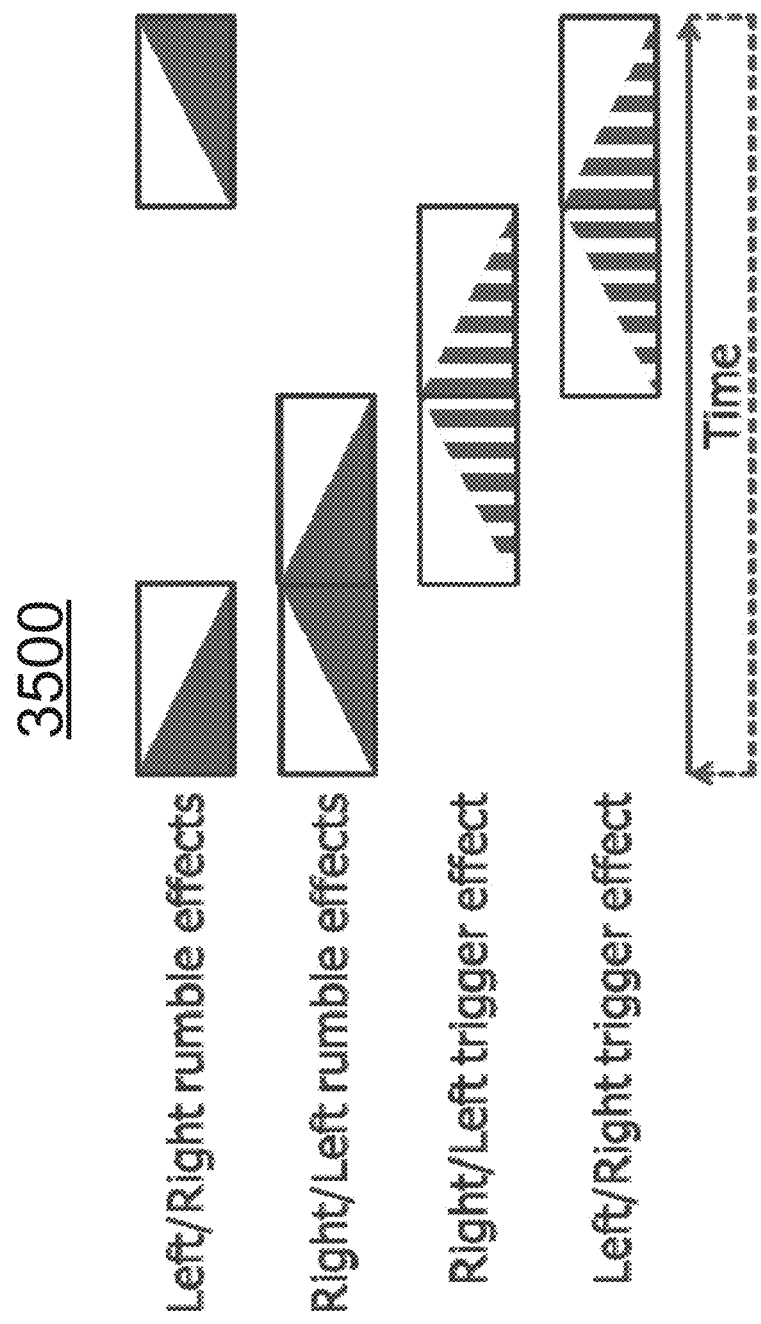
FIG. 35 illustrates an example spatialization haptic effect, according to another embodiment of the invention.

FIG. 35 illustrates an example spatialization haptic effect 3500, according to another embodiment of the invention. Spatialization haptic effect 3500 involves outputting a haptic effect at multiple rumble and/or trigger actuators of a peripheral device by inversely ramping attenuation in a clockwise or counter-clockwise order, based on a spatialization haptic effect definition. Spatialization haptic effect 3500 can effectively convey movement, such as rotational movement. In certain embodiments, a trigger actuator can be replaced with a targeted actuator that is operably coupled to a user input element.

Figure 36:
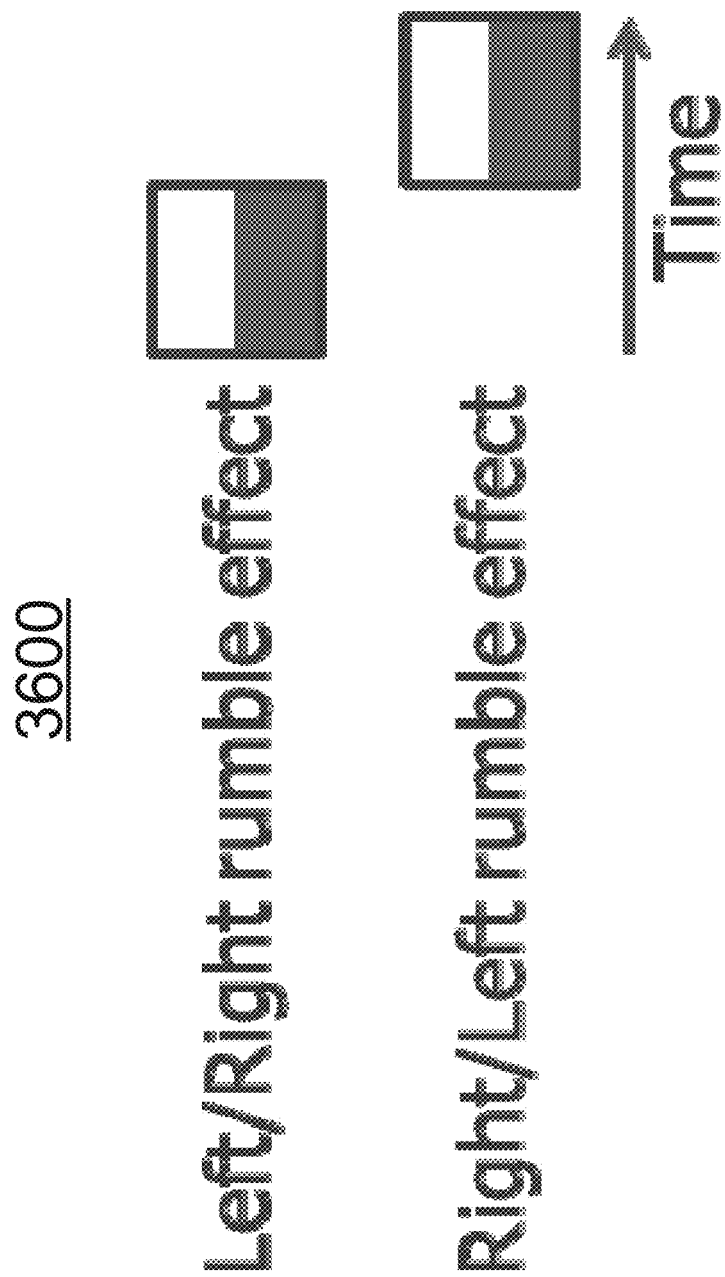
FIG. 36 illustrates an example spatialization haptic effect, according to another embodiment of the invention.

FIG. 36 illustrates an example spatialization haptic effect 3600, according to another embodiment of the invention. Spatialization haptic effect 3600 involves outputting a haptic effect at multiple rumble actuators of a peripheral device with a small delay (e.g., approximately 50-100 ms), based on a spatialization haptic effect definition. Spatialization haptic effect 3600 can effectively convey short-effect movement, such as left-to-right movement or right-to-left movement.

Figure 37:
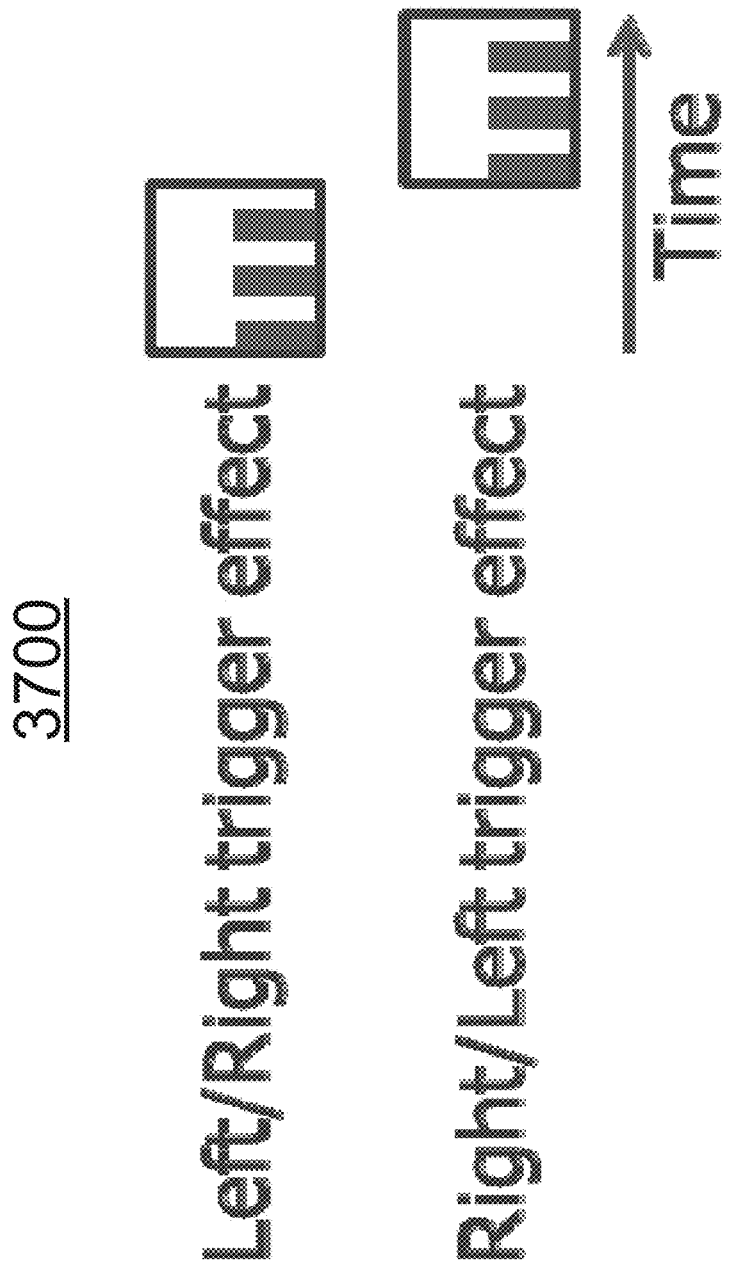
FIG. 37 illustrates an example spatialization haptic effect, according to another embodiment of the invention.

FIG. 37 illustrates an example spatialization haptic effect 3700, according to another embodiment of the invention. Spatialization haptic effect 3700 involves outputting a haptic effect at multiple trigger actuators of a peripheral device with a small delay (e.g., approximately 50-100 ms), based on a spatialization haptic effect definition. Spatialization haptic effect 3700 can effectively convey short-effect movement, such as left-to-right movement or right-to-left movement. In certain embodiments, a trigger actuator can be replaced with a targeted actuator that is operably coupled to a user input element.

Figure 38:
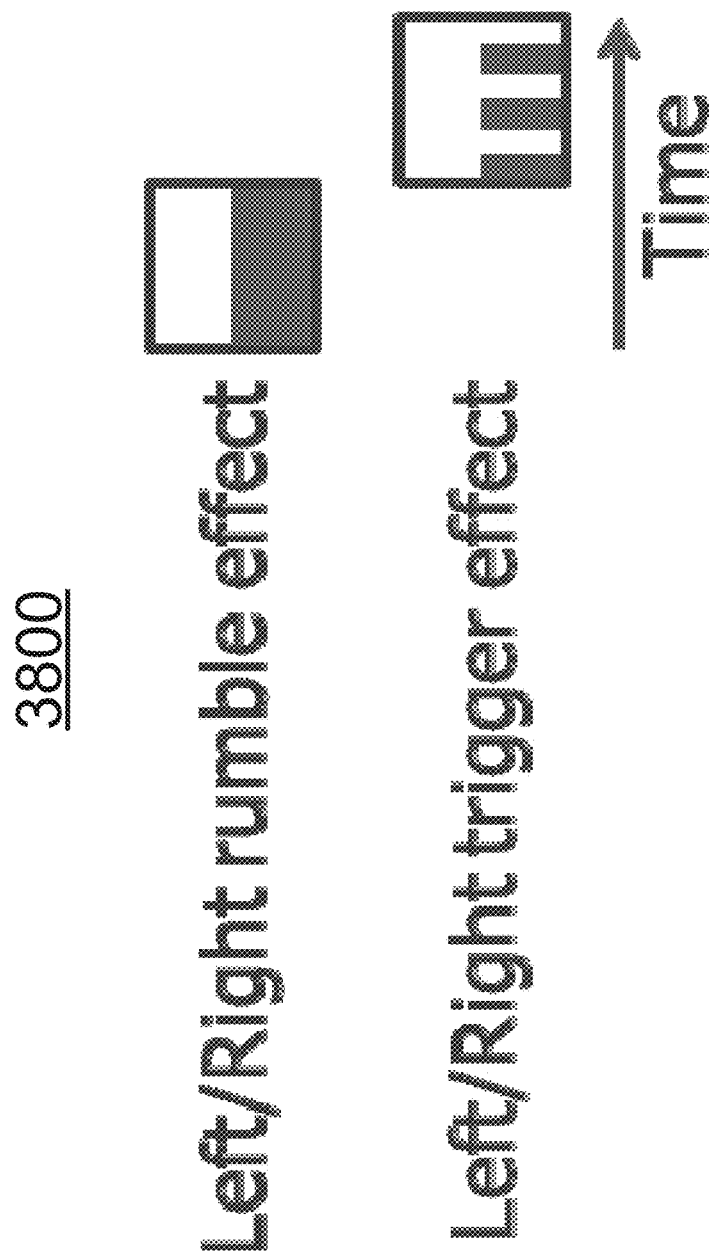
FIG. 38 illustrates an example spatialization haptic effect, according to another embodiment of the invention.

FIG. 38 illustrates an example spatialization haptic effect 3800, according to another embodiment of the invention. Spatialization haptic effect 3800 involves outputting a haptic effect at multiple rumble and trigger actuators of a peripheral device with a small delay (e.g., approximately 50-100 ms) from a rumble actuator to a trigger actuator, based on a spatialization haptic effect definition. Spatialization haptic effect 3800 can effectively convey short-effect movement, such as back-to-front movement. In certain embodiments, a trigger actuator can be replaced with a targeted actuator that is operably coupled to a user input element.

Figure 39:
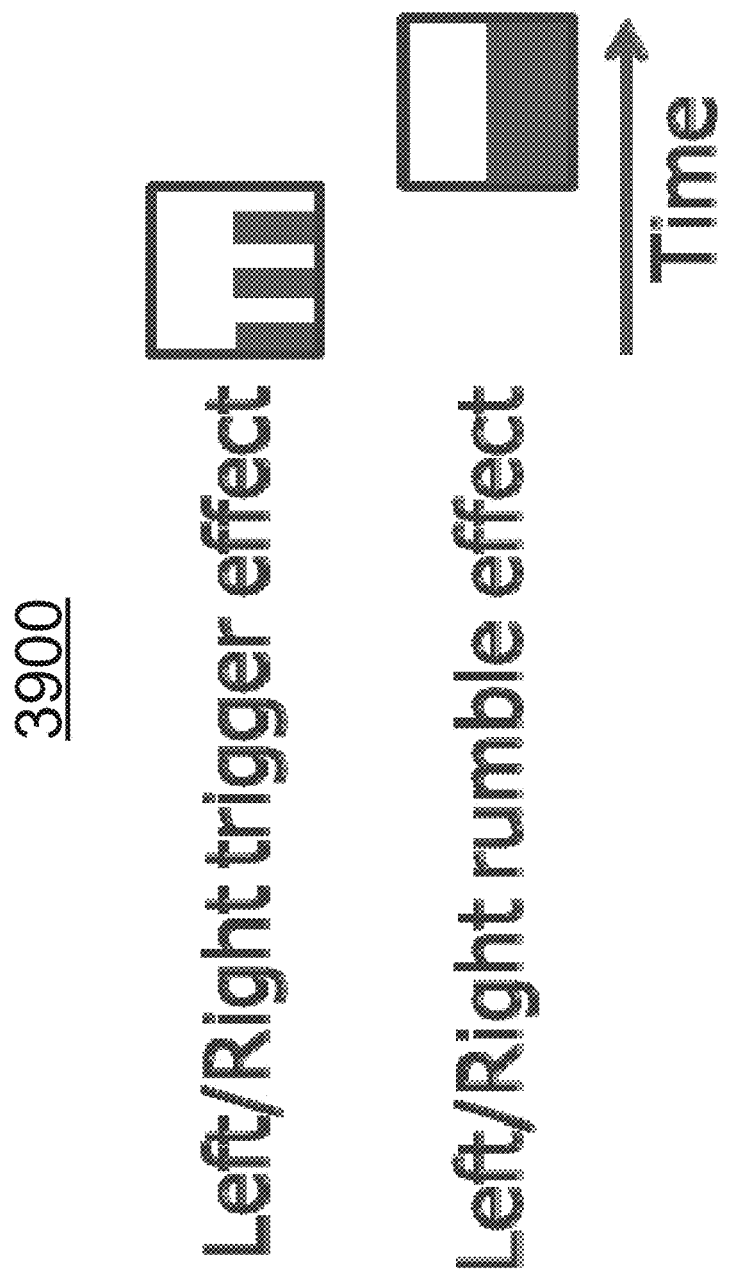
FIG. 39 illustrates an example spatialization haptic effect, according to another embodiment of the invention.

FIG. 39 illustrates an example spatialization haptic effect 3900, according to another embodiment of the invention. Spatialization haptic effect 3900 involves outputting a haptic effect at multiple trigger and rumble actuators of a peripheral device with a small delay (e.g., approximately 50-100 ms) from a trigger actuator to a rumble actuator, based on a spatialization haptic effect definition. Spatialization haptic effect 3800 can effectively convey short-effect movement, such as front-to-back movement. In certain embodiments, a trigger actuator can be replaced with a targeted actuator that is operably coupled to a user input element.

Figure 40:
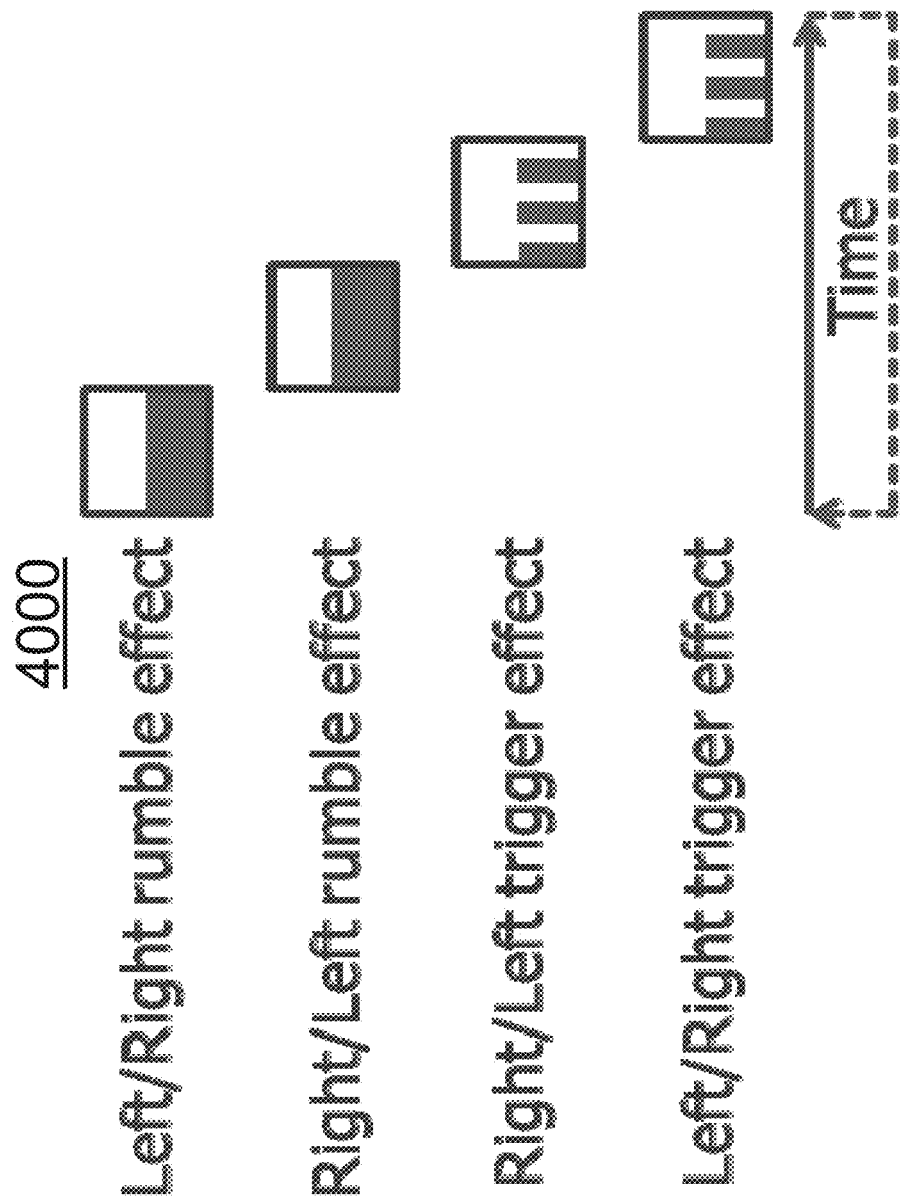
FIG. 40 illustrates an example spatialization haptic effect, according to another embodiment of the invention.

FIG. 40 illustrates an example spatialization haptic effect 4000, according to another embodiment of the invention. Spatialization haptic effect 4000 involves outputting a haptic effect at multiple rumble and/or trigger actuators of a peripheral device with a small delay (e.g., approximately 50-100 ms) in a clockwise or counter-clockwise order, based on a spatialization haptic effect definition. Spatialization haptic effect 400 can effectively convey movement, such as rotational movement. In certain embodiments, a trigger actuator can be replaced with a targeted actuator that is operably coupled to a user input element.

Thus, in one embodiment, a location of a haptic effect can be conveyed by playing the haptic effect on only a left trigger, or only on a right trigger, based on a spatialization haptic effect definition. Further, in another embodiment, short-effect (e.g., approximately 50-200 ms) movement can be conveyed by playing the haptic effect on different actuators with small delays (e.g., approximately 50-100 ms), based on a spatialization haptic effect definition. Even further, in another embodiment, long-effect (e.g., approximately greater than 200 ms) movement can be conveyed by inversely ramping the haptic effect on different actuators, based on a spatialization haptic effect definition. Further, in the aforementioned embodiments, an identical haptic effect is played at the different actuators based on a spatialization haptic effect definition. However, in an alternate embodiment, distinct haptic effects can be played at the different actuators based on a spatialization haptic effect definition.

In one embodiment, a distance of a spatialization haptic effect can be conveyed by a spatialization engine using: (1) attenuation; (2) "spreading" or "scattering"; and/or (3) timing. Regarding attenuation, a spatialization haptic effect definition can define different haptic attenuation characteristics depending on a number of dimensions (e.g., one dimension, two dimensions, or three dimensions) in which the haptic effect travels. For example, a haptic effect that travels through a rail or rod can travel through one dimension. As another example, a haptic effect that travels through a floor or a table can travel through two dimensions. As another example, a haptic effect that travels through the ground can travel through three dimensions. Further, different frequencies of a haptic effect can attenuate differently. For example, higher frequencies can attenuate more rapidly. Regarding "spreading" or "scattering," a haptic effect can be diminished over distance due to the magnitude, or strength, of the haptic effect dissipating over multiple dimensions, where the reduction of magnitude may be frequency-dependent. A spatialization engine can mix a window of previous force values to diminish the haptic effect. A window size may depend on a distance of a haptic effect. Regarding timing, a haptic effect that is a vibrotactile haptic effect that travels through solid media (e.g., ground) can travel faster than sound through air. For example, a distant explosion within a game can be felt as a vibration within the peripheral device before the audio of the explosion is heard.

An attenuation of a spatialization haptic effect is now described in greater detail. In accordance with an embodiment, a haptic effect can have a position within a gaming application or other type of software application. The position of the haptic effect can be an absolute position, where a user of a peripheral device can also have a position within the gaming application or other type of software application. Alternatively, the position of the haptic effect can be a relative position, where the position of the haptic effect is relative to a position of a user of a peripheral device within the gaming application or other type of software application. Further, a haptic effect can lose magnitude, or strength, over a distance because the haptic effect can be "absorbed" by other objects or surfaces within the gaming application or other type of software application. Further, a haptic effect can also attenuate due to "spreading" or "scattering." Examples of such haptic effects can include: explosions; footsteps; stampedes; distance heavy rolling vehicles (e.g., trains, buses, trucks, tanks); distant traffic; indirect crashes; or general indirect impacts.

In one embodiment, the attenuation of a haptic effect can be one-dimensional. In one-dimensional attenuation of a haptic effect, there is no "spreading" or "scattering." A haptic effect can lose a certain fraction of magnitude, or strength, per unit distance due to absorption based on the following formula:

$$y = xF^{-r/D}$$

where "y" is an attenuated magnitude, or strength, of a haptic effect; "x" is an original (i.e., un-attenuated) magnitude, or strength, of the haptic effect; "F" is an absorption factor over a reference absorption distance (i.e., a haptic effect attenuates by 1/F over a reference absorption distance); "r" is a distance over which the haptic effect travels; and "D" is a reference absorption distance.

Examples of one-dimension attenuation of a haptic effect can include: a vibrotactile haptic effect from a large and wide underground source; or a haptic effect traveling through a rail or rod.

In another embodiment, the attenuation of a haptic effect can be two-dimensional. In two-dimensional attenuation of a haptic effect, there is additional attenuation as compared to one-dimensional attenuation due to the magnitude, or strength, of the haptic effect "spreading" or "scattering" within two dimensions. A haptic effect can lose a certain fraction of magnitude, or strength, per unit distance due to absorption and spreading based on the following formula:

$$y = \begin{cases} x & \text{if } r \leq R \\ xF^{(R-r)/D}\left(\frac{R}{r}\right) & \text{if } r > R \end{cases}$$

where "y" is an attenuated magnitude, or strength, of a haptic effect; "x" is an original (i.e., un-attenuated) magnitude, or strength, of the haptic effect; "F" is an absorption factor over a reference absorption distance (i.e., a haptic effect attenuates by 1/F over a reference absorption distance); "r" is a distance over which the haptic effect travels; "D" is a reference absorption distance; and "R" is a radius of the haptic effect.

Examples of two-dimension attenuation of a haptic effect can include: a haptic effect traveling across a floor or a table; a vibrotactile haptic effect originating from highway traffic, a passing train, a convey, a stampede, or from some other long ground-level source; or a vibrotactile haptic effect from a long and narrow underground source.

In another embodiment, the attenuation of a haptic effect can be three-dimensional. In three-dimensional attenuation of a haptic effect, there is additional attenuation as compared to two-dimensional attenuation due to the magnitude, or strength, of the haptic effect "spreading" or "scattering" within three dimensions. A haptic effect can lose a certain fraction of magnitude, or strength, per unit distance due to absorption and spreading based on the following formula:

$$y = \begin{cases} x & \text{if } r \leq R \\ xF^{(R-r)/D}\left(\frac{R}{r}\right)^2 & \text{if } r > R \end{cases}$$

where "y" is an attenuated magnitude, or strength, of a haptic effect; "x" is an original (i.e., un-attenuated) magnitude, or strength, of the haptic effect; "F" is an absorption factor over a reference absorption distance (i.e., a haptic effect attenuates by 1/F over a reference absorption distance); "r" is a distance over which the haptic effect travels; "D" is a reference absorption distance; and "R" is a radius of the haptic effect.

An example of a three-dimensional attenuation of a haptic effect includes a haptic effect traveling through a ground from a small source (e.g., point).

According to an embodiment, general attenuation can be represented using the following formula:

$$y = \begin{cases} x & \text{if } r \leq R \\ xF^{(R-r)/D}\left(\frac{R}{r}\right)^P & \text{if } r > R \end{cases}$$

where "y" is an attenuated magnitude, or strength, of a haptic effect; "x" is an original (i.e., un-attenuated) magnitude, or strength, of the haptic effect; "F" is an absorption factor over a reference absorption distance (i.e., a haptic effect attenuates by 1/F over a reference absorption distance); "r" is a distance over which the haptic effect travels; "D" is a reference absorption distance; "R" is a radius of the haptic effect; and where "P" is a spreading power (e.g., 0 for one-dimensional spreading; 1 for two-dimensional spreading; 2 for three-dimensional spreading; etc.).

A flow of a spatialization haptic effect is now described in greater detail. In accordance with an embodiment, a spatialization haptic effect can have a velocity (i.e., a speed and direction). The velocity of the spatialization haptic effect can be identified as a "flow." In one embodiment, an overall haptic effect can be generated, where the haptic effect includes multiple haptic effect components, where each haptic effect component corresponds to an actuator of multiple actuators for a peripheral device. Each haptic effect component can be played by each actuator to generate the overall haptic effect, where the overall haptic effect conveys a "flow." One example of a spatialization haptic effect is a "whizzing" haptic effect, which is a haptic effect that moves from one set of actuators to another. Examples of whizzing haptic effects can include: a nearby passing vehicle; a nearby whizzing bullet; a general nearby passing object. Another example of a spatialization haptic effect is a "bouncing" haptic effect, which is a haptic effect that bounces repeatedly between two sets of actuators. Examples of bouncing haptic effects can include: a magic spell buildup; or an energy buildup. Yet another example of a spatialization haptic effect is a "spinning" haptic effect, which is a haptic effect that spins clockwise or counter-clockwise within a controller, gamepad, or other peripheral device, or around a user within a game. Examples of spinning haptic effects can include: a magic spell buildup; an energy buildup; a "spin-o-rama"; or a vortex.

Figure 41:
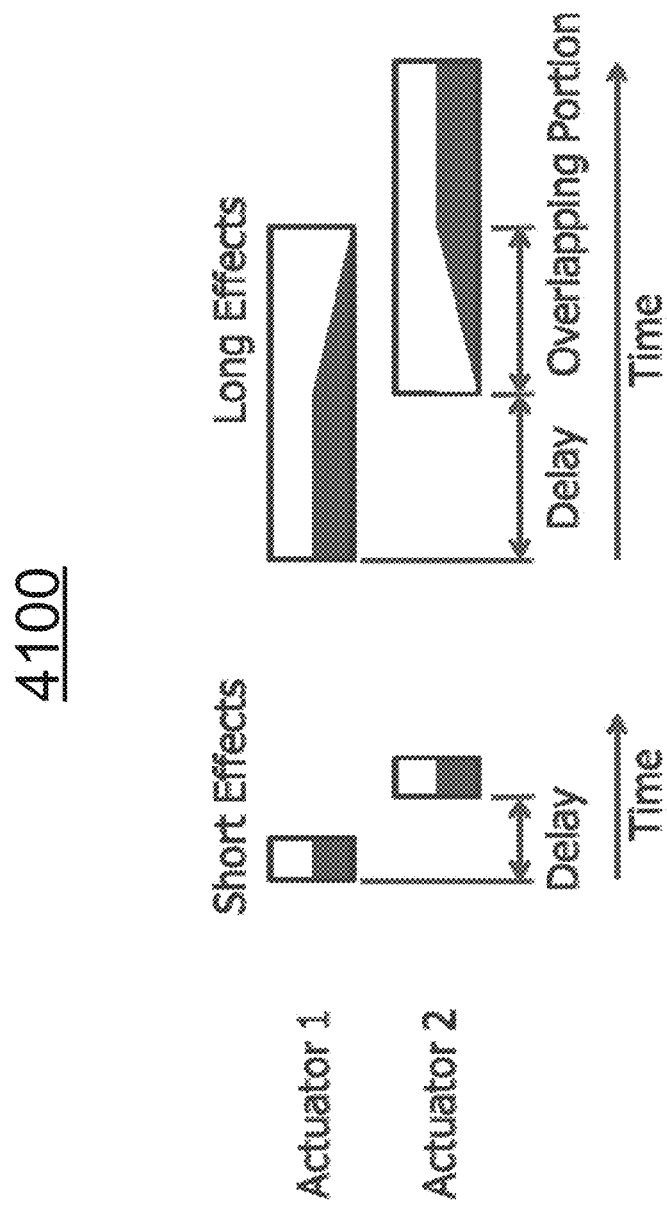
FIG. 41 illustrates an example spatialization haptic effect, according to another embodiment of the invention.

FIG. 41 illustrates an example spatialization haptic effect 4100, according to another embodiment of the invention. Spatialization haptic effect 4100 involves outputting distinct haptic effects that corresponds to distinct haptic effect components at multiple actuators of a peripheral device, where a playback of a haptic effect that corresponds to the haptic effect component at an actuator can be delayed, based on a spatialization haptic effect definition. Further, portions of the haptic effects that correspond to the haptic effect components that overlap can be ramped at the respective actuators. A speed can determine a delay based on the following formula:

$$delay = \frac{delay\_factor}{speed}$$

In accordance with an embodiment, a spatialization haptic effect can have a direction. A direction can determine which actuators to use to generate the spatialization haptic effect.

Figure 42:
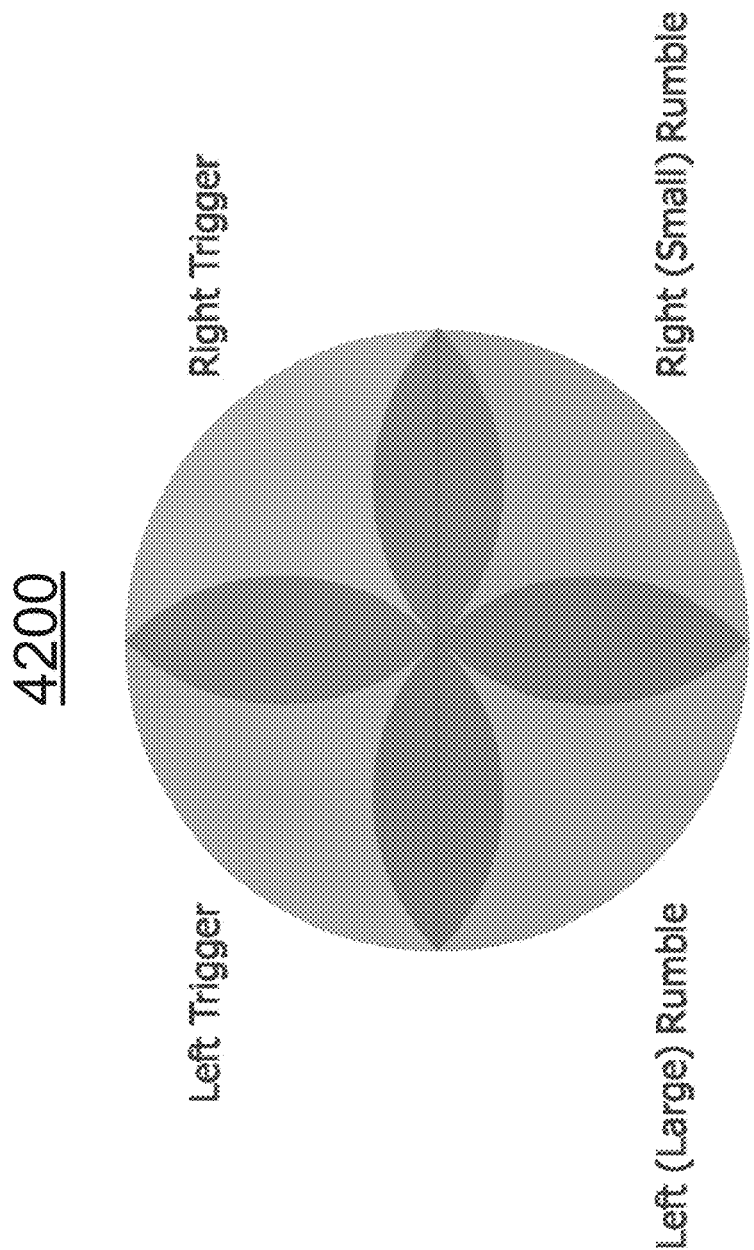
FIG. 42 illustrates an example of distributing a haptic effect among actuators based on a direction of the haptic effect, according to an embodiment of the invention.

FIG. 42 illustrates an example of distributing a haptic effect 4200 among actuators based on a direction of haptic effect 4200, according to an embodiment of the invention. According to the embodiment, haptic effect 4200 can be distributed across multiple actuators (e.g., a left trigger actuator; a right trigger actuator; a left (large) rumble actuator; and a right (small) actuator), based on a spatialization haptic effect definition, where the spatialization haptic effect definition can define a direction of haptic effect 4200. For example, if the spatialization haptic effect definition defines a right direction, or "east" direction, haptic effect 4200 can be played at the right (small) rumble actuator and the right trigger actuator. If the spatialization haptic effect definition defines an upper right direction, or "northeast" direction, haptic effect 4200 can be played only at the right trigger actuator. If the spatialization haptic effect definition defines an up direction, or "north" direction, haptic effect 4200 can be played at the left trigger actuator and the right trigger actuator. If the spatialization haptic effect definition defines an upper left direction, or "northwest" direction, haptic effect 4200 can be played only at the left trigger actuator. If the spatialization haptic effect definition defines a left direction, or "west" direction, haptic effect 4200 can be played at the left (large) rumble actuator and the left trigger actuator. If the spatialization haptic effect definition defines a lower left direction, or "southwest" direction, haptic effect 4200 can be played only at the left (large) rumble actuator. If the spatialization haptic effect definition defines a down direction, or "south" direction, haptic effect 4200 can be played at the left (large) rumble actuator and the right (small) rumble actuator. If the spatialization haptic effect definition defines a lower right direction, or "southeast" direction, haptic effect 4200 can be played only at the right (small) rumble actuator. Further, if the spatialization haptic effect definition defines a direction in between one of the eight aforementioned directions, haptic effect 4200 can be played at two actuators, but where a magnitude of haptic effect 4200 is diminished at one of the actuators. For example, if the spatialization haptic effect defines a direction between an up direction and an upper left direction, i.e., a "north-northwest direction", haptic effect 4200 can be played at the left trigger actuator and the right trigger actuator, where a magnitude of haptic effect 4200 is diminished at the right trigger actuator.

Further, in one embodiment, a spatialization engine can target spatialization haptic effects at a left trigger actuator or a right trigger actuator at run-time. Examples of such spatialization haptic effects include experiencing left or right rumble strips in a racing game; or experiencing a left punch or a right punch in a boxing game.

Figure 43:
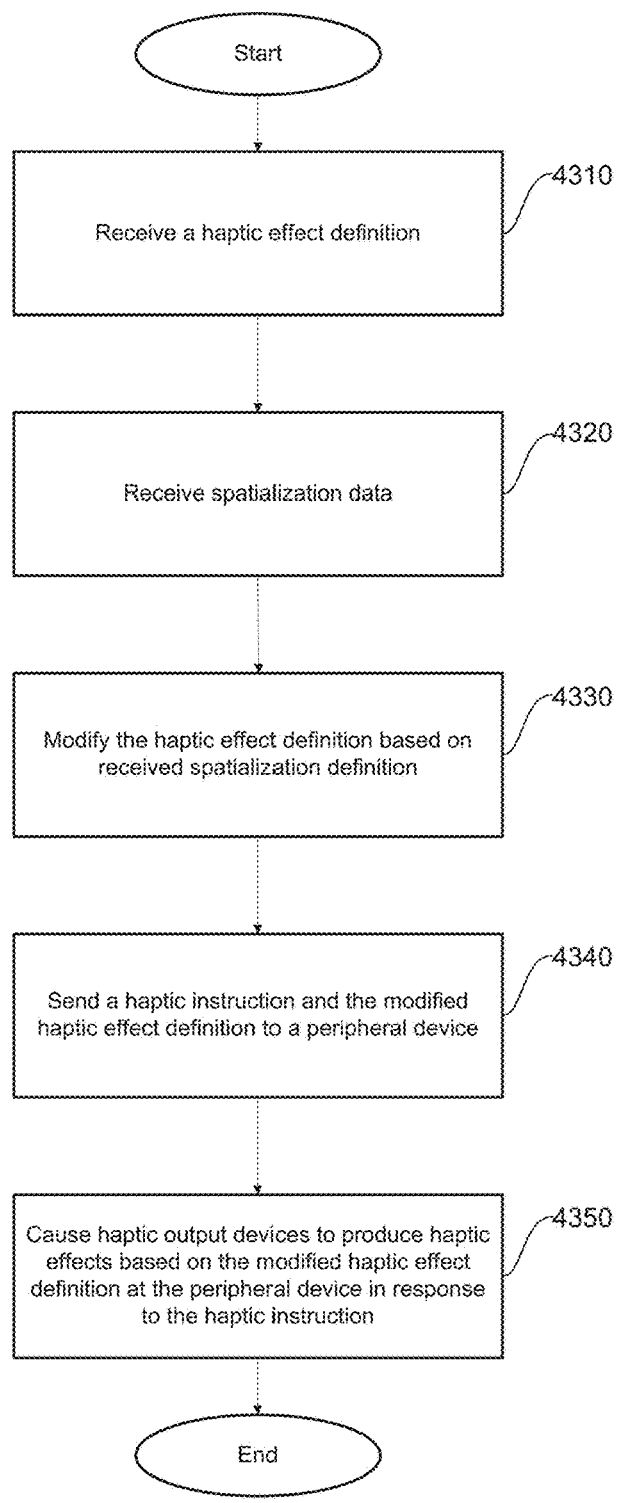
FIG. 43 illustrates a flow diagram of the functionality of a haptic spatialization module, according to an embodiment of the invention.

FIG. 43 illustrates a flow diagram of the functionality of a haptic spatialization module (such as haptic spatialization module 16 of FIG. 1), according to an embodiment of the invention. In one embodiment, the functionality of FIG. 43 is implemented by software stored in memory or other computer-readable or tangible media, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 4310. At 4310, a haptic effect definition is received. The haptic effect definition includes haptic data. The flow then proceeds to 4320.

At 4320, spatialization data is received. The spatialization data can include one or more spatialization parameters. The one or more spatialization parameters can include at least one of: a position of a haptic effect; a distance of the haptic effect; a velocity of the haptic effect; a direction of the haptic effect; or a flow of the haptic effect. The flow then proceeds to 4330.

At 4330, the haptic effect definition is modified based on the received spatialization data. In certain embodiments, the haptic effect definition can be divided into one or more haptic effect definition components. In some of these embodiments, at least one of the following can be scaled or attenuated based on the spatialization data: a magnitude of the haptic data of at least one haptic effect definition component; a frequency of the haptic data of at least one haptic effect definition component; or a duration of the haptic effect data of the at least one haptic effect definition component. In other embodiments, at least one haptic output device can be caused to delay a playback of at least one haptic effect based on the spatialization data. In certain embodiments, the one or more haptic effect definition components can be distinct. In other embodiments, the one or more haptic effect definition components can be identical. In certain embodiments, a motion, change in position, or change in orientation of the peripheral device can be detected, the spatialization data can be modified based on the detected motion, and the modified haptic effect definition can be subsequently modified based on the modified spatialization data. The flow then proceeds to 4340.

At 4340, a haptic instruction and the modified haptic effect definition are sent to a peripheral device. In certain embodiments, the one or more haptic effect definition components can also be sent to the peripheral device. In certain embodiments, the peripheral device can be a controller or gamepad. In embodiments where the modified haptic effect definition is subsequently modified, the subsequently modified haptic effect definition can be sent to the peripheral device. The flow then proceeds to 4350.

At 4350, the haptic instruction causes one or more haptic output devices to produce one or more haptic effects based on the modified haptic effect definition at the peripheral device. In certain embodiments, the haptic instruction can cause the one or more haptic output device to produce one or more haptic effects based on the one or more haptic effect definition components. Further, in certain embodiments, the haptic instruction can cause the one or more haptic output device to produce the one or more haptic effects at one or more user input elements of the peripheral device. In certain embodiments, at least one user input element can be one of: a digital button; an analog button; a bumper; a directional pad; an analog or digital stick; a driving wheel; or a trigger. Further, in certain embodiments, at least one haptic output device can be an actuator. In embodiments where the modified haptic effect definition is subsequently modified, the haptic instruction causes the one or more haptic output devices to produce one or more modified haptic effects based on the subsequently modified haptic effect definition at the peripheral device In certain embodiments, the haptic instruction can cause a plurality of actuators to output the one or more haptic effects at multiple distinct attenuations based on the modified haptic effect definition. In other embodiments, the haptic instruction can cause a plurality of actuators to output the one or more haptic effects by inversely ramping attenuation based on the modified haptic effect definition. In other embodiments, the haptic instruction can cause a plurality of rumble actuators and targeted actuators to output the one or more haptic effects by inversely ramping attenuation from a rumble actuator to a targeted actuator based on the modified haptic effect definition. In other embodiments, the haptic instruction can cause a plurality of rumble actuators and targeted actuators to output the one or more haptic effects by inversely ramping attenuation from a targeted actuator to a rumble actuator based on the modified haptic effect definition. In other embodiments, the haptic instruction can cause a plurality of actuators to output the one or more haptic effects with a delay based on the modified haptic effect definition. In other embodiments, the haptic instruction can cause a plurality of rumble actuators and trigger actuators to output the one or more haptic effects with a delay from a rumble actuator to a targeted actuator based on the modified haptic effect definition. In other embodiments, the haptic instruction can cause a plurality of rumble actuators and trigger actuators to output the one or more haptic effects with a delay from a targeted actuator to a rumble actuator based on the modified haptic effect definition. In other embodiments, the haptic instruction can cause a plurality of actuators to output the one or more haptic effects with a delay in a clockwise or counter-clockwise order based on the modified haptic effect definition. The flow then ends.

Thus, in one embodiment, a system can provide spatialization haptic effects that are experienced at a peripheral device, such as a controller or gamepad. By generating a spatialization haptic effect, the system can generate a haptic effect that can be either scaled or delayed at each motor or actuator of the peripheral device, so that the spatialization haptic effect includes a sense of distance, directionality and/or flow. By incorporating spatialized haptic feedback experienced at a peripheral device, and in particular, spatialized haptic feedback experienced at a user input element of the peripheral device, such as a trigger, into a gaming application that is executed by the system, a more realistic and immersive gaming experience can be provided.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A system for controlling a spatialization haptic effect that is experienced at a first peripheral device and a second peripheral device, the system comprising:
   a memory configured to store a spatialization haptic effect definition; and
   a processor configured to execute the spatialization haptic effect definition, including instructions for:
   dividing the spatialization haptic effect definition into a first spatialization haptic effect definition component and a second spatialization haptic effect definition component;

applying a first drive signal to a first actuator of the first peripheral device to produce a first haptic effect according to the first spatialization haptic effect definition component; and applying a second drive signal to a second actuator of the second peripheral device to produce a second haptic effect according to the second spatialization haptic effect definition component, wherein the first haptic effect and the second haptic effect render the spatialization haptic effect.

2. The system according to claim 1, wherein the spatialization haptic effect definition includes one or more parameters including: a position, a distance, a velocity, a direction, or a flow.

3. The system according to claim 2, wherein at least one parameter of the spatialization haptic effect definition is modified based on a detected motion or a position of at least one of the first peripheral device or the second peripheral device.

4. The system according to claim 1, wherein the first haptic effect or the second haptic effect is scaled, attenuated, or delayed.

5. The system according to claim 4, wherein at least one of the scaling, attenuating, or delaying is based on a position of a user within a gaming application.

6. The system according to claim 1, wherein the spatialization haptic effect definition includes spatialization data that includes one or more positions of one or more hands of a user located on the first peripheral device or the second peripheral device.

7. The system according to claim 1, wherein each of the first peripheral device and the second peripheral device comprises a controller.

8. A non-transitory computer readable medium having instructions stored thereon that, when executed by a processor, cause the processor to provide a spatialization haptic effect that is experienced at a first peripheral device and a second peripheral device, the instructions comprising:

dividing a spatialization haptic effect definition into a first spatialization haptic effect definition component and a second spatialization haptic effect definition component;

applying a first drive signal to a first actuator of the first peripheral device to produce a first haptic effect according to the first spatialization haptic effect definition component; and applying a second drive signal to a second actuator of the second peripheral device to produce a second haptic effect according to the second spatialization haptic effect definition component, wherein the first haptic effect and the second haptic effect render the spatialization haptic effect.

9. The non-transitory computer readable medium according to claim 8, wherein the spatialization haptic effect definition includes one or more parameters including: a position, a distance, a velocity, a direction, or a flow.

10. The non-transitory computer readable medium according to claim 9, wherein at least one parameter of the spatialization haptic effect definition is modified based on a detected motion or a position of at least one of the first peripheral device or the second peripheral device.

11. The non-transitory computer readable medium according to claim 8, wherein the first haptic effect or the second haptic effect is scaled, attenuated, or delayed.

12. The non-transitory computer readable medium according to claim 11, wherein at least one of the scaling, attenuating, or delaying is based on a position of a user within a gaming application.

13. The non-transitory computer readable medium according to claim 8, wherein the spatialization haptic effect definition includes spatialization data that includes one or more positions of one or more hands of a user located on the first peripheral device or the second peripheral device.

14. The non-transitory computer readable medium according to claim 8, wherein each of the first peripheral device and the second peripheral device comprises a controller.

15. A computer-implemented method for providing a spatialization haptic effect that is experienced at a first peripheral device and a second peripheral device, the computer-implemented method comprising:

dividing a spatialization haptic effect definition into a first spatialization haptic effect definition component and a second spatialization haptic effect definition component;

applying a first drive signal to a first actuator of the first peripheral device to produce a first haptic effect according to the first spatialization haptic effect definition component; and applying a second drive signal to a second actuator of the second peripheral device to produce a second haptic effect according to the second spatialization haptic effect definition component, wherein the first haptic effect and the second haptic effect render the spatialization haptic effect.

16. The computer-implemented method according to claim 15, wherein the spatialization haptic effect definition includes one or more parameters including: a position, a distance, a velocity, a direction, or a flow.

17. The computer-implemented method according to claim 16, wherein at least one parameter of the spatialization haptic effect definition is modified based on a detected motion or a position of at least one of the first peripheral device or the second peripheral device.

18. The computer-implemented method according to claim 15, wherein the first haptic effect or the second haptic effect is scaled, attenuated, or delayed.

19. The computer-implemented method according to claim 18, wherein the spatialization haptic effect definition includes spatialization data that includes one or more positions of one or more hands of a user located on the first peripheral device or the second peripheral device.

20. The computer-implemented method according to claim 15, wherein spatialization haptic effect definition includes spatialization data that includes one or more positions of one or more hands of a user located on controller.

* * * * *